US010965803B2

(12) United States Patent
Li et al.

(10) Patent No.: US 10,965,803 B2
(45) Date of Patent: Mar. 30, 2021

(54) VIBRATION ALERTING METHOD FOR MOBILE TERMINAL AND MOBILE TERMINAL

(71) Applicant: Huawei Technologies Co., Ltd., Shenzhen (CN)

(72) Inventors: Zhan Li, Beijing (CN); Changwei Tang, Beijing (CN); Guangyuan Gao, Beijing (CN); Xiaoxiao Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/618,493

(22) PCT Filed: Aug. 31, 2017

(86) PCT No.: PCT/CN2017/099887
§ 371 (c)(1),
(2) Date: Dec. 2, 2019

(87) PCT Pub. No.: WO2018/223535
PCT Pub. Date: Dec. 13, 2018

(65) Prior Publication Data
US 2020/0374381 A1 Nov. 26, 2020

(30) Foreign Application Priority Data
Jun. 7, 2017 (CN) .......................... 201710424278.5

(51) Int. Cl.
*H04M 1/725* (2021.01)
*G08B 6/00* (2006.01)
(52) U.S. Cl.
CPC .......... *H04M 1/72519* (2013.01); *G08B 6/00* (2013.01)

(58) Field of Classification Search
CPC .. G08B 6/00; H04M 1/0266; H04M 1/72519; H04M 1/03; A61H 31/006; A61H 23/02;
(Continued)

(56) References Cited

U.S. PATENT DOCUMENTS

2009/0315488 A1 12/2009 Shyu et al.
2010/0001849 A1 1/2010 Lee et al.
(Continued)

FOREIGN PATENT DOCUMENTS

CN 101399861 A 4/2009
CN 101552822 A 10/2009
(Continued)

OTHER PUBLICATIONS

Machine Translation and Abstract of Chinese Publication No. CN101399861, Apr. 1, 2009, 15 pages.
(Continued)

*Primary Examiner* — Thanh C Le
(74) *Attorney, Agent, or Firm* — Conley Rose, P.C.

(57) ABSTRACT

A vibration alerting mobile terminal configured to adjust an amplitude parameter and a frequency parameter of a vibration alerting mode, to implement diverse vibration alerting modes to meet vibration requirements of the mobile terminal in different environments. The terminal provides for: displaying a first interface, wherein the first interface includes an amplitude adjustment control, a frequency adjustment control, and a vibration mode adjustment control; responding to an adjustment operation for at least one of the amplitude adjustment control, the frequency adjustment control, and the vibration mode adjustment control; generating a first vibration alerting mode; and alerting a user according to the first vibration alerting mode.

20 Claims, 32 Drawing Sheets

(58) Field of Classification Search
CPC ......... G06F 3/041; G06F 3/016; B06B 1/161; A01K 27/001
See application file for complete search history.

(56) References Cited

U.S. PATENT DOCUMENTS

| | | | |
|---|---|---|---|
| 2010/0148942 A1 | 6/2010 | Oh et al. | |
| 2010/0164894 A1 | 7/2010 | Kim et al. | |
| 2013/0006483 A1* | 1/2013 | Ries | B06B 1/161 701/50 |
| 2016/0074278 A1* | 3/2016 | Muench | A61H 23/02 601/46 |
| 2016/0100552 A1* | 4/2016 | So | A01K 27/001 119/719 |

FOREIGN PATENT DOCUMENTS

| | | |
|---|---|---|
| CN | 101610599 A | 12/2009 |
| CN | 102024481 A | 4/2011 |
| CN | 103763425 A | 4/2014 |
| CN | 103809911 A | 5/2014 |
| CN | 105791571 A | 7/2016 |
| CN | 105827505 A | 8/2016 |
| CN | 106657679 A | 5/2017 |
| EP | 2549726 A1 | 1/2013 |
| JP | 2002305564 A | 10/2002 |
| KR | 101604814 B1 | 3/2016 |

OTHER PUBLICATIONS

Machine Translation and Abstract of Chinese Publication No. CN101552822, Oct. 7, 2009, 14 pages.
Machine Translation and Abstract of Chinese Publication No. CN102024481, Apr. 20, 2011, 16 pages.
Machine Translation and Abstract of Chinese Publication No. CN103763425, Apr. 30, 2014, 5 pages.
Machine Translation and Abstract of Chinese Publication No. CN103809911, May 21, 2014, 13 pages.
Machine Translation and Abstract of Chinese Publication No. CN105791571, Jul. 20, 2016, 14 pages.
Machine Translation and Abstract of Chinese Publication No. CN105827505, Aug. 3, 2016, 17 pages.
Machine Translation and Abstract of Chinese Publication No. CN106657679, May 10, 2017, 7 pages.
Foreign Communication From a Counterpart Application, Chinese Application No. 201780035347.1, Chinese Office Action dated Oct. 29, 2019, 12 pages.
Foreign Communication From a Counterpart Application, PCT Application No. PCT/CN2017/099887, English Translation of International Search Report dated Feb. 28, 2018, 3 pages.
Foreign Communication From a Counterpart Application, PCT Application No. PCT/CN2017/099887, English Translation of Written Opinion dated Feb. 28, 2018, 4 pages.

* cited by examiner

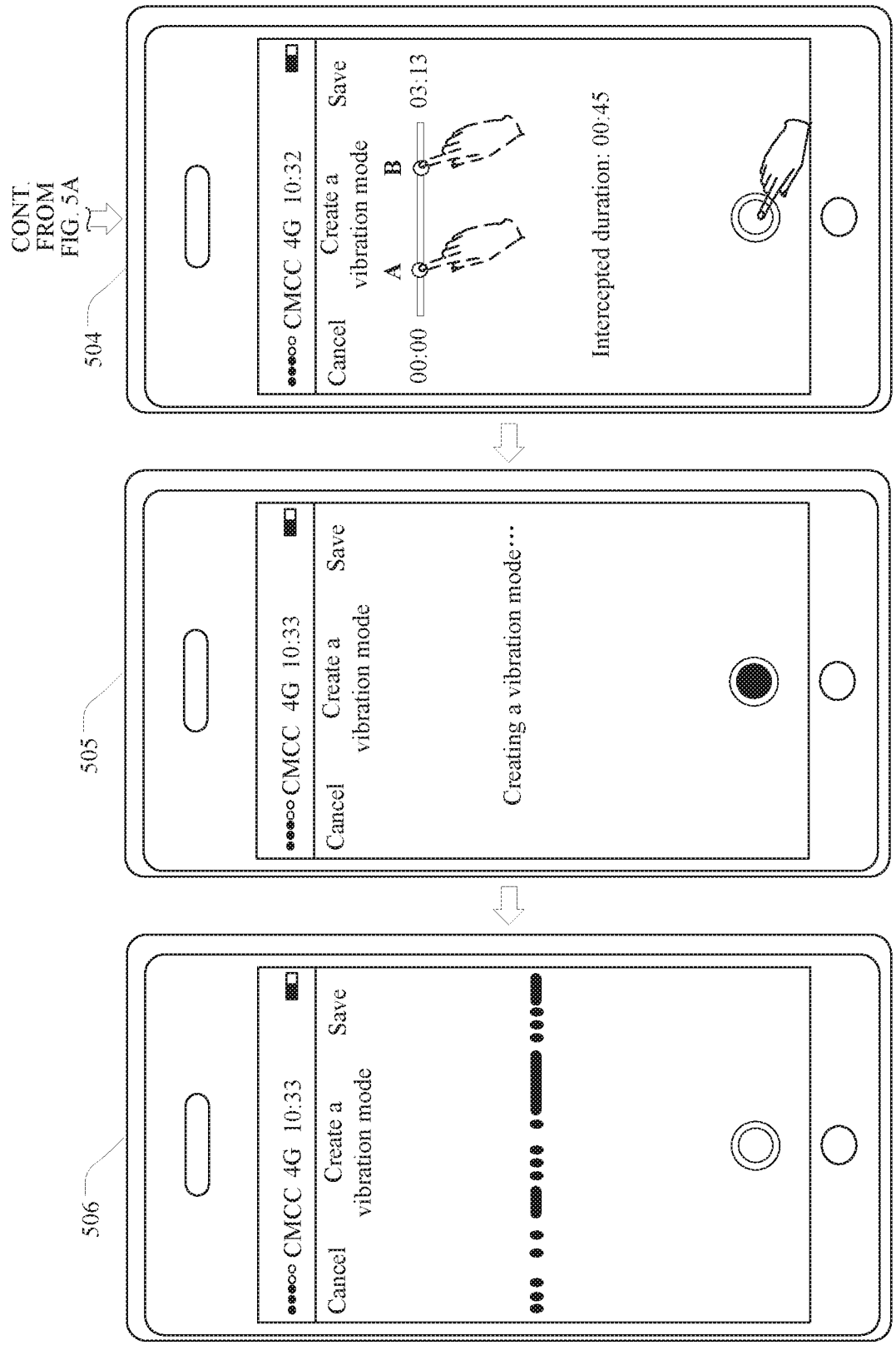

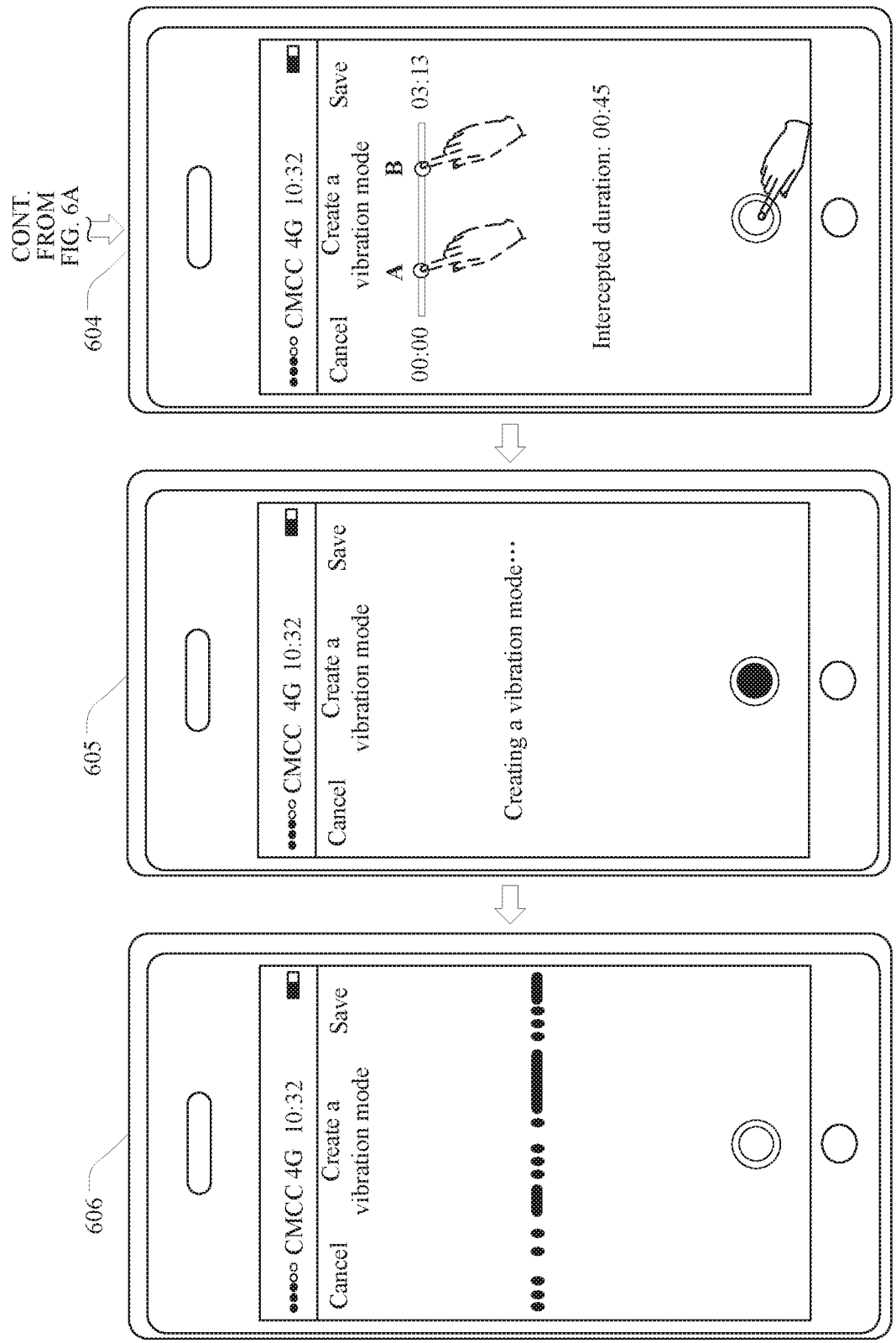

VIBRATION ALERTING METHOD FOR MOBILE TERMINAL AND MOBILE TERMINAL

CROSS-REFERENCE TO RELATED APPLICATIONS

This application is a national stage of International Application No. PCT/CN2017/099887, filed on Aug. 31, 2017, which claims priority to Chinese Patent Application No. 201710424278.5, filed on Jun. 7, 2017. Both of the aforementioned applications are hereby incorporated by reference in their entireties.

TECHNICAL FIELD

This application relates to the terminal field, and in particular, to a vibration alerting method for a mobile terminal and a mobile terminal.

BACKGROUND

Currently, a vibration apparatus is usually built in a mobile terminal device such as a mobile phone. After a user sets a mobile phone to a vibration alerting mode, when an event such as an incoming call, a new SMS message, new information, or an alarm happens, the mobile phone vibrates to alert the user. Usually, the vibration of the mobile phone is implemented by using a motor. A prior-art motor usually has two states: on and off. In other words, the motor has only a fixed amplitude and frequency. As a result, vibration requirements of a terminal cannot be met in different environments.

SUMMARY

Embodiments of this application provide a vibration alerting method for a mobile terminal and a mobile terminal, to adjust an amplitude parameter, a frequency parameter, and a vibration mode of a vibration alerting mode, so as to implement diversity of vibration alerting modes of the mobile terminal, and meet vibration requirements of the mobile terminal in different environments.

A first aspect of the embodiments of this application provides a vibration alerting method for a mobile terminal, including:

displaying a first interface by using a display of the mobile terminal, where the first interface includes an amplitude adjustment control, a frequency adjustment control, and a vibration mode adjustment control; and responding to, by the mobile terminal, an adjustment operation performed by a user for the amplitude adjustment control, the frequency adjustment control, and the vibration mode adjustment control, displaying an adjusted related parameter in the first interface, and generating a first vibration alerting mode; and alerting, by the mobile terminal, the user according to the first vibration alerting mode.

In the embodiments of this application, the amplitude adjustment control is displayed in the first interface in a manner of a slider bar, and then the amplitude is adjusted by adjusting a sliding block on the slider bar. The amplitude adjustment control may be displayed in the first interface in another manner, and this is not specifically limited. Likewise, the frequency adjustment control may be also implemented by using a solution same as that of the amplitude adjustment control. In actual application, the adjustment operation may be a touch operation performed by the user on a display screen of the mobile terminal, or may be a key operation performed by the user by using a physical adjustment key of the mobile terminal, or may be an operation performed by the mobile terminal for setting an amplitude parameter according to a preset parameter. This is not specifically limited. The vibration mode adjustment control is used to adjust a vibration mode in the vibration alerting mode. In the embodiments, the vibration mode is used to indicate a change trend of the vibration amplitude and/or a change trend of the vibration frequency. The change trend of the vibration amplitude includes that the vibration amplitude remains unchanged, the vibration amplitude ascends and descends intermittently, the vibration amplitude descends, or the vibration amplitude ascends. The change trend of the vibration frequency includes that the vibration frequency remains unchanged, the vibration frequency ascends and descends intermittently, the vibration amplitude descends, or the vibration amplitude ascends.

According to the technical solution provided in the embodiments of this application, the mobile terminal adjusts the amplitude parameter, the frequency parameter, and the vibration mode of the vibration alerting mode by adjusting the amplitude adjustment control, the frequency adjustment control, and the vibration mode adjustment control of the mobile terminal. This implements diversity of vibration alerting modes of the mobile terminal, and meets vibration requirements of the mobile terminal in different environments.

Optionally, the first interface of the mobile terminal may further include a ringing adjustment control. In this case, the mobile terminal displays an adjusted ringing volume in the first interface in response to an adjustment operation for the ringing adjustment control.

In the embodiments of this application, the ringing adjustment control is displayed in the first interface in a manner of a slider bar, and then a volume is adjusted by adjusting a sliding block on the slider bar. The ringing adjustment control may be displayed in the first interface in another manner, and this is not specifically limited.

According to the technical solution provided in the embodiments of this application, the first interface also includes the ringing adjustment control, and can adjust both the vibration alerting mode and a ringing alerting mode, to facilitate in setting a profile mode of the mobile terminal by the user.

Optionally, when the first interface is a setting interface of a first application installed on the mobile terminal, after the first application records a first event and a second event, the first interface displays the first event and the second event. In addition, the first event and the second event each are corresponding to a vibration mode adjustment control. The mobile terminal displays, in the first interface, an adjusted vibration mode corresponding to the first event in response to an adjustment operation for the vibration mode adjustment control corresponding to the first event. The mobile terminal displays, in the first interface, an adjusted vibration mode corresponding to the second event in response to an adjustment operation for the vibration mode adjustment control corresponding to the second event.

In the embodiments of this application, the first event and the second event are not limited to being recorded in a same application, and the first event and the second event may alternatively be events recorded in different applications. This is not specifically limited herein.

According to the technical solution provided in the embodiments of this application, the mobile terminal can set different vibration alerting modes for different events, thereby ensuring that the mobile terminal meets requirements in different environments, and improving user experience.

Optionally, in addition to the first interface, the mobile terminal can also display a second interface. The second interface is a setting interface of a second application installed on the mobile terminal. The second interface includes an amplitude adjustment control, a frequency adjustment control, and a vibration mode adjustment control. The mobile terminal generates a second vibration alerting mode in response to an adjustment operation for at least one of the amplitude adjustment control, the frequency adjustment control, and the vibration mode adjustment control.

According to the technical solution provided in the embodiments of this application, the mobile terminal can set different vibration alerting modes for different events, thereby ensuring that the mobile terminal meets requirements in different environments, and improving user experience.

Optionally, the second interface of the mobile terminal further includes a ringing adjustment control. The mobile terminal may display an adjusted volume in the second interface in response to an adjustment operation for the ringing adjustment control.

In the embodiments of this application, the ringing adjustment control is displayed in the second interface in a manner of a slider bar, and then a volume is adjusted by adjusting a sliding block on the slider bar. The ringing adjustment control may be displayed in the second interface in another manner, and this is not specifically limited.

According to the technical solution provided in the embodiments of this application, the second interface also includes the ringing adjustment control, and can adjust both a vibration alerting mode and a ringing alerting mode, to facilitate in setting a profile mode of the mobile terminal by the user.

Optionally, the vibration mode adjustment control may be displayed in a manner of a function selection icon on the mobile terminal. In this case, the mobile terminal displays a third interface in response to an adjustment operation for the function selection icon. The third interface includes a selection icon of a vibration mode, and then the mobile terminal displays a selected vibration mode in the first interface in response to a selection operation for the selection icon of the vibration mode.

Optionally, the vibration mode adjustment control may be displayed in a manner of a function button icon on the mobile terminal. In this case, the mobile terminal displays a selected vibration mode in the first interface in response to an adjustment operation for the function button icon.

According to the technical solution provided in the embodiments of this application, the vibration mode adjustment control is displayed in a plurality of manners, thereby implementing diversity of vibration mode adjustment.

Optionally, before the mobile terminal displays the first interface, the mobile terminal needs to obtain a trigger instruction. The trigger instruction is at least one of: the user performs an adjustment operation, a current moment meets a preset trigger time, a current geographic location meets a preset trigger geographic location, or a current action mode meets a preset trigger action mode. The preset trigger time includes a preset time period and a preset moment.

In the embodiments of this application, the preset time period in the preset trigger time may be a preset nap period, a preset meeting period, a preset learning period, a preset exercise period, a preset working period, or the like. The preset moment may be a preset alarm moment, a preset event alerting moment, or the like. The preset geographic location may be an office, a library, a shopping mall, a classroom, or the like. The preset trigger action mode may be a running posture, a walking posture, a sleeping posture, or the like.

According to the technical solution provided in the embodiments of this application, the mobile terminal adjusts the vibration alerting mode according to different trigger instructions, to ensure that the mobile terminal can meet requirements in different environments.

According to a second aspect, an embodiment of this application provides a mobile terminal. The mobile terminal has functions of implementing operations of the mobile terminal in the foregoing method. The function may be implemented by using hardware or by executing corresponding software by hardware. The hardware or software includes one or more modules corresponding to the functions.

In one possible implementation, the mobile terminal includes:

a display module, configured to display a first interface, where the first interface includes an amplitude adjustment control, a frequency adjustment control, and a vibration mode adjustment control; and a processing module, configured to: generate a first vibration alerting mode in response to an adjustment operation for at least one of the amplitude adjustment control, the frequency adjustment control, and the vibration mode adjustment control; and alert a user according to the first vibration alerting mode.

In another possible implementation, the mobile terminal includes:

one or more processors, a memory, and a display, where the memory is configured to store a program; and the processor is configured to execute a program to specifically perform the following steps:

controlling the display to display a first interface, where the first interface includes an amplitude adjustment control, a frequency adjustment control, and a vibration mode adjustment control;

responding to an adjustment operation for at least one of the amplitude adjustment control, the frequency adjustment control, and the vibration mode adjustment control, and generating a first vibration alerting mode; and alerting a user according to the first vibration alerting mode.

According to a third aspect, an embodiment of this application provides a vibration alerting method for a mobile terminal, including:

obtaining, by the mobile terminal, a first adjustment operation, adjusting at least one vibration parameter for a first event according to the first adjustment operation, and generating a first vibration alerting mode, where the vibration parameter includes a vibration amplitude, a vibration frequency, and a vibration mode, and the vibration mode is used to indicate a change trend of the vibration amplitude and/or a change trend of the vibration frequency; obtaining, by the mobile terminal, a second adjustment operation, adjusting at least one vibration parameter for a second event according to the second adjustment operation, and generating a second vibration alerting mode; alerting a user according to the first vibration alerting mode when executing the first event; and alerting the user according to the second vibration alerting mode when executing the second event.

In this embodiment of this application, the change trend of the vibration amplitude includes that the vibration amplitude remains unchanged, the vibration amplitude ascends and descends intermittently, the vibration amplitude descends, or the vibration amplitude ascends. The change trend of the vibration frequency includes that the vibration frequency remains unchanged, the vibration frequency ascends and descends intermittently, the vibration amplitude descends, or the vibration amplitude ascends.

According to the technical solution provided in this embodiment of this application, the mobile terminal can set different vibration alerting modes for different events, thereby ensuring that the mobile terminal meets requirements in different environments, and improving user experience.

Optionally, after the mobile terminal sets vibration alerting modes for different events, in a process of executing the first event and the second event by the mobile terminal, if the first event and the second event conflict with each other, the mobile terminal compares priorities of the first event and the second event. If a priority of the first event is higher than a priority of the second event, in the process of executing the first event and the second event, the mobile terminal alerts the user according to the first vibration alerting mode. If a priority of the first event is lower than a priority of the first event, in the process of executing the first event and the second event, the mobile terminal alerts the user according to the second vibration alerting mode. If a priority of the first event is the same as a priority of the second event, the mobile terminal may arbitrarily select the first vibration alerting mode or the second vibration alerting mode to alert the user.

In this embodiment of this application, when the priority of the first event is the same as the priority of the second event, the mobile terminal may alternatively determine a final vibration alerting mode according to another condition. For example, the mobile terminal may determine the final vibration alerting mode according to a geographic location, an action mode, and the like, and this is not specifically limited.

In this embodiment of this application, the mobile terminal determines, based on a priority of an event, a vibration alerting mode used during event execution, to adapt to an environment requirement more effectively, and improve user experience.

Optionally, the mobile terminal may further implement conversion to a vibration mode based on a song or a record, and specific operations are as follows.

In one possible implementation, the mobile terminal selects a target song from a local song list or determines a being-played song as a target song; then the mobile terminal determines a to-be-converted song based on the target song, where duration of the to-be-converted song may be whole duration of the target song or partial duration of the target song; and finally the mobile terminal performs conversion to a vibration amplitude in a customized vibration mode based on a tone of the to-be-converted song, and performs conversion to a vibration frequency in the customized vibration mode based on a rhythm of the to-be-converted song.

In another possible implementation, the mobile terminal selects a target record from a local record list, determines a target record in a recording process, or determines a being-played record as a target record; then the mobile terminal determines a to-be-converted record based on the target record, where duration of the to-be-converted record may be whole duration of the target record or partial duration of the target record; and finally the mobile terminal performs conversion to a vibration amplitude in a customized vibration mode based on a tone of the to-be-converted record, and performs conversion to a vibration frequency in the customized vibration mode based on a rhythm of the to-be-converted record.

In this embodiment of this application, the customized vibration mode is a vibration mode generated for the user based on a material resource, instead of a vibration mode built in the mobile terminal.

According to the technical solution provided in this embodiment of this application, the mobile terminal provides diversified vibration modes, thereby improving user experience.

According to a fourth aspect, an embodiment of this application provides a mobile terminal. The mobile terminal has functions of implementing operations of the mobile terminal in the foregoing method. The function may be implemented by using hardware or by executing corresponding software by hardware. The hardware or software includes one or more modules corresponding to the functions.

In one possible implementation, the mobile terminal includes:

an input module, configured to obtain a first adjustment operation; and a processing module, configured to: adjust at least one vibration parameter for a first event according to the first adjustment operation, and generate a first vibration alerting mode, where the vibration parameter includes a vibration amplitude, a vibration frequency, and a vibration mode, and the vibration mode is used to indicate a change trend of the vibration amplitude and/or a change trend of the vibration frequency, where the input module is configured to obtain a second adjustment operation; and the processing module is configured to: adjust at least one vibration parameter for a second event according to the second adjustment operation, and generate a second vibration alerting mode; and alert a user according to the first vibration alerting mode when executing the first event, and alert the user according to the second vibration alerting mode when executing the second event.

In another possible implementation, the mobile terminal includes:

one or more processors, a memory, and a display, where the memory is configured to store a program; and the processor is configured to execute a program to specifically perform the following steps:

obtaining a first adjustment operation by using the display;

adjusting at least one vibration parameter for a first event according to the first adjustment operation, and generating a first vibration alerting mode, where the vibration parameter includes a vibration amplitude, a vibration frequency, and a vibration mode, and the vibration mode is used to indicate a change trend of the vibration amplitude and/or a change trend of the vibration frequency;

obtaining a second adjustment operation by using the display; and adjusting at least one vibration parameter for a second event according to the second adjustment operation, and generating a second vibration alerting mode; and alerting a user according to the first vibration alerting mode when executing the first event, and alerting the user according to the second vibration alerting mode when executing the second event.

According to a fifth aspect, an embodiment of this application provides a vibration alerting method for a mobile terminal, including:

obtaining, by the mobile terminal, a first adjustment operation adjusting, according to the first adjustment operation, at least one vibration parameter corresponding to a first application, and generating a first vibration alerting mode, where the vibration parameter includes a vibration amplitude, a vibration frequency, and a vibration mode, the vibration mode is used to indicate a change trend of the vibration amplitude and/or a change trend of the vibration frequency, and the first application is an application installed on the mobile terminal; obtaining, by the mobile terminal, a second adjustment operation, adjusting, according to the second adjustment operation, at least one vibration parameter corresponding to a second application, and generating a second vibration alerting mode, where the second application is an application installed on the mobile terminal; alerting a user according to the first vibration alerting mode when executing the first application; and alerting the user according to the second vibration alerting mode when executing the second application.

In this embodiment of this application, the change trend of the vibration amplitude includes that the vibration amplitude remains unchanged, the vibration amplitude ascends and descends intermittently, the vibration amplitude descends, or the vibration amplitude ascends. The change trend of the vibration frequency includes that the vibration frequency remains unchanged, the vibration frequency ascends and descends intermittently, the vibration amplitude descends, or the vibration amplitude ascends.

According to the technical solution provided in this embodiment of this application, the mobile terminal can set different vibration alerting modes for different applications, thereby ensuring that the mobile terminal meets requirements in different environments, and improving user experience.

Optionally, the mobile terminal may set the vibration alerting modes for the first application and the second application in a setting interface of a vibration alerting mode of the mobile terminal or in setting interfaces corresponding to the applications. No limitation is imposed on a specific manner herein.

According to the technical solution provided in this embodiment of this application, the mobile terminal can set a vibration alerting mode for an application in different setting interfaces, thereby improving user experience.

Optionally, the mobile terminal may further implement conversion to a vibration mode based on a song or a record, and specific operations are as follows.

In one possible implementation, the mobile terminal selects a target song from a local song list or determines a being-played song as a target song; then the mobile terminal determines a to-be-converted song based on the target song, where duration of the to-be-converted song may be whole duration of the target song or partial duration of the target song; and finally the mobile terminal performs conversion to a vibration amplitude in a customized vibration mode based on a tone of the to-be-converted song, and performs conversion to a vibration frequency in the customized vibration mode based on a rhythm of the to-be-converted song.

In another possible implementation, the mobile terminal selects a target record from a local record list, determines a target record in a recording process, or determines a being-played record as a target record; then the mobile terminal determines a to-be-converted record based on the target record, where duration of the to-be-converted record may be whole duration of the target record or partial duration of the target record; and finally the mobile terminal performs conversion to a vibration amplitude in a customized vibration mode based on a tone of the to-be-converted record, and performs conversion to a vibration frequency in the customized vibration mode based on a rhythm of the to-be-converted record.

In this embodiment of this application, the customized vibration mode is a vibration mode generated for the user based on a material resource, instead of a vibration mode built in the mobile terminal.

According to the technical solution provided in this embodiment of this application, the mobile terminal provides diversified vibration modes, thereby improving user experience.

According to a sixth aspect, an embodiment of this application provides a mobile terminal. The mobile terminal has functions of implementing operations of the mobile terminal in the foregoing method. The function may be implemented by using hardware or by executing corresponding software by hardware. The hardware or software includes one or more modules corresponding to the functions.

In one possible implementation, the mobile terminal includes:

an input module, configured to obtain a first adjustment operation; and a processing module, configured to adjust, according to the first adjustment operation, at least one vibration parameter corresponding to a first application, and generate a first vibration alerting mode, where the vibration parameter includes a vibration amplitude, a vibration frequency, and a vibration mode, the vibration mode is used to indicate a change trend of the vibration amplitude and/or a change trend of the vibration frequency, and the first application is an application installed on the mobile terminal, where the input module is configured to obtain a second adjustment operation; and the processing module is configured to: adjust, according to the second adjustment operation, at least one vibration parameter corresponding to a second application, and generate a second vibration alerting mode, where the second application is an application installed on the mobile terminal; and alert a user according to the first vibration alerting mode when executing an application corresponding to the first application, and alert the user according to the second vibration alerting mode when executing an application corresponding to the second application.

In another possible implementation, the mobile terminal includes:

one or more processors, a memory, and a display, where the memory is configured to store a program; and the processor is configured to execute a program to specifically perform the following steps:

obtaining a first adjustment operation by using the display;

adjusting, according to the first adjustment operation, at least one vibration parameter corresponding to a first application, and generating a first vibration alerting mode, where the vibration parameter includes a vibration amplitude, a vibration frequency, and a vibration mode, the vibration mode is used to indicate a change trend of the vibration amplitude and/or a change trend of the vibration frequency, and the first application is an application installed on the mobile terminal;

obtaining a second adjustment operation by using the display; and adjusting, according to the second adjustment operation, at least one vibration parameter corresponding to a second application, and generating a second vibration alerting mode, where the second application is an application installed on the mobile terminal; and alerting a user according to the first vibration alerting mode when executing an application corresponding to the first application, and alerting the user according to the second vibration alerting mode when executing an application corresponding to the second application.

According to a seventh aspect, an embodiment of this application provides a computer readable storage medium, including an instruction. When the instruction runs on a computer, the computer executes the foregoing methods.

According to an eighth aspect, an embodiment of this application provides a computer program product including an instruction. When the computer program product runs on a computer, the computer executes the foregoing methods.

According to a ninth aspect, an embodiment of this application provides a system on chip, where the system on chip is applied to a mobile terminal, and the system on chip includes:

at least one processor, a memory, an interface circuit, and a bus;

the at least one processor, the memory, and the interface circuit are coupled by using the bus: and the system on chip interacts with the terminal by using the interface circuit, the memory stores a program instruction, and the at least one processor invokes the program instruction stored in the memory to perform operations of the mobile terminal in the foregoing methods.

According to the technical solutions provided in the embodiments of this application, the mobile terminal adjusts the amplitude parameter, the frequency parameter, and the vibration mode of the vibration alerting mode by adjusting the amplitude adjustment control, the frequency adjustment control, and the vibration mode adjustment control of the mobile terminal. This implements diversity of vibration alerting modes of the mobile terminal, and meets vibration requirements of the mobile terminal in different environments.

BRIEF DESCRIPTION OF DRAWINGS

FIG. 5A to FIG. 5C are a schematic interface diagram of an embodiment for generating a customized vibration mode according to an embodiment of this application;

FIG. 6A to FIG. 6C are a schematic interface diagram of another embodiment for generating a customized vibration mode according to an embodiment of this application;

DESCRIPTION OF EMBODIMENTS

Figure 1:
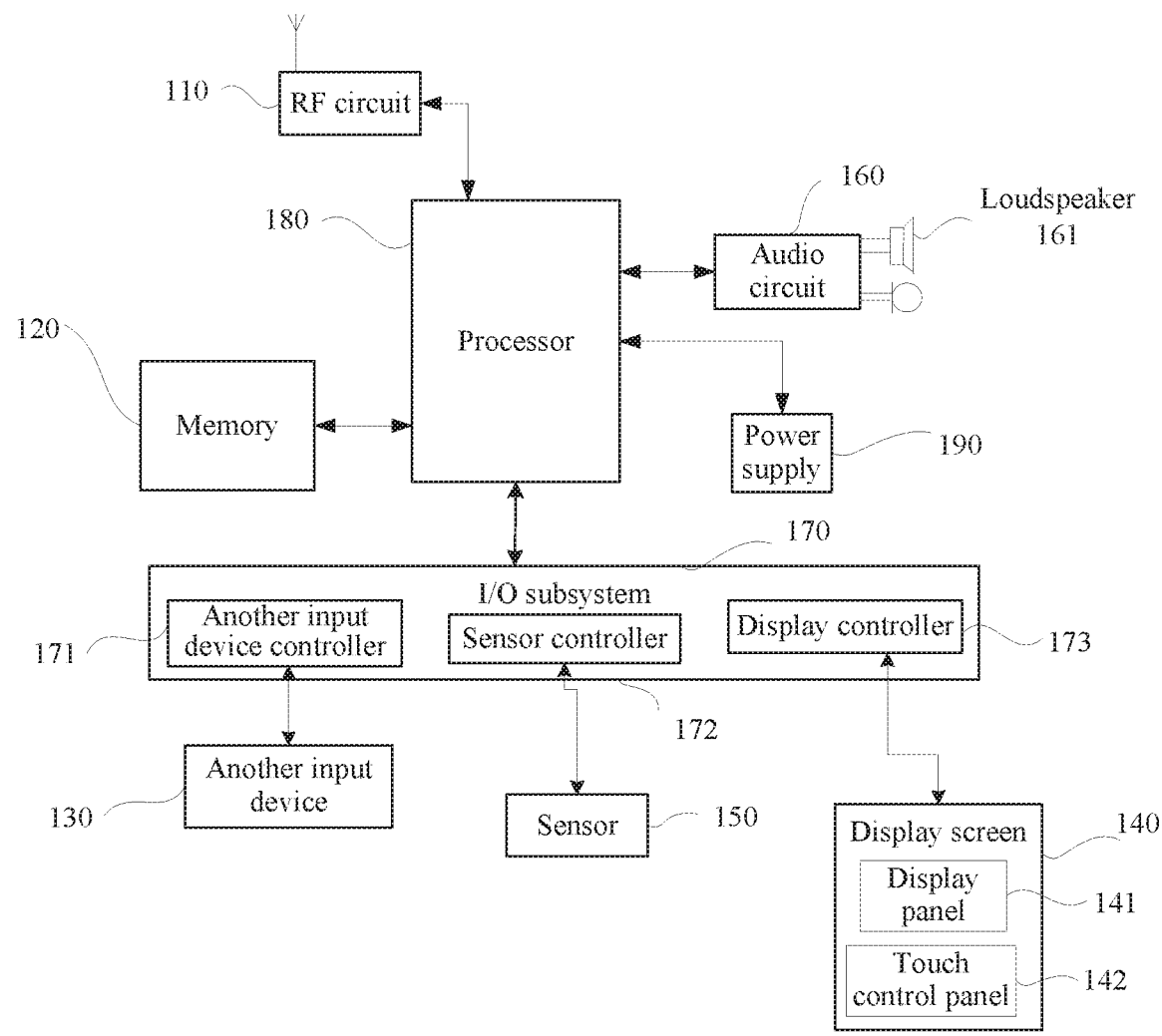
FIG. 1 is a schematic diagram of a mobile phone used as a mobile terminal according to an embodiment of this application.

The embodiments of this application provide a vibration alerting method for a mobile terminal and a mobile terminal, to adjust an amplitude parameter, a frequency parameter, and a vibration mode of a vibration alerting mode so as to implement diversity of vibration alerting modes of the mobile terminal, and meet vibration requirements of the mobile terminal in different environments.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

At present, alerting modes of a mobile terminal include ringing, vibrating when the mobile terminal rings, vibrating, and a silent mode. At present, when using the mobile terminal, a user usually needs to set different alerting modes according to different environments. For example, in a quiet scenario (such as in an office or a library), the user sets the mobile terminal to be in a mode of vibrating only; in a meeting scenario or in a sleeping period, the user sets the mobile terminal to be in a silent mode; and during outdoor activities, the user sets the mobile terminal to be in a mode of vibrating when the mobile terminal rings.

When the mobile terminal is set to be in the silent mode, the user may miss some important information, and therefore a vibration mode is preferred.

Because a current vibration mode is that no vibration is produced at the beginning and then vibration reaches a maximum strength (that is, if information comes, the vibration directly reaches the maximum strength), the user may be shocked when the information is received. As a result, user experience is poor.

To resolve this problem, the embodiments of this application provide the following technical solutions: A mobile terminal displays a first interface by using a display of the mobile terminal, where the first interface includes an amplitude adjustment control, a frequency adjustment control, and a vibration mode adjustment control; the mobile terminal displays an adjusted related parameter in the first interface, and generates a first vibration alerting mode in response to an adjustment operation performed by a user for the amplitude adjustment control, the frequency adjustment control, and the vibration mode adjustment control; and the mobile terminal alerts the user according to the first vibration alerting mode.

The terminal device 100 in the embodiments of this application may include a mobile phone, a tablet computer, a PDA (Personal Digital Assistant, personal digital assistant), a POS (Point of Sales, point of sale), an in-vehicle computer, a TV, a wearable device, an AR, a YR device, and the like.

An example in which the mobile terminal 100 is a mobile phone is used. FIG. 1 is a block diagram of a partial structure of the mobile phone 100 related to the embodiments of this application. Referring to FIG. 1, the mobile phone 100 includes components such as an RF (Radio Frequency, radio frequency) circuit 110, a memory 120, another input device 130, a display screen 140, a sensor 150, an audio circuit 160, an I/O subsystem 170, a processor 180, and a power supply 190. Persons skilled in the art may understand that the mobile phone structure shown in FIG. 1 does not constitute any limitation on the mobile phone, and the mobile phone may include components more or fewer than those shown in the figure, a combination of some components, a part of some components, or components disposed differently. Persons skilled in the art may understand that the display screen 140 is a user interface (UI, User Interface), and the mobile phone 100 may include user interfaces more or fewer user interfaces than those shown in the figure.

The following describes each constituent part of the mobile phone 100 in detail with reference to FIG. 1.

The RF circuit 110 may be configured to receive and send information, or receive and send signals during a call, and particularly, receive downlink information from a base station, and then send the downlink information to the processor 180 for processing. In addition, the RF circuit 110 sends related uplink data to the base station. Generally, the RF circuit includes but is not limited to an antenna, at least one amplifier, a transceiver, a coupler, an LNA (Low Noise Amplifier, low noise amplifier), a duplexer, and the like. In addition, the RF circuit 110 may also communicate with a network and another device through wireless communication. The wireless communication may use any communications standard or protocol, including but not limited to GSM (Global System of Mobile communication, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), an email, SMS (Short Messaging Service, short message service), and the like.

The memory 120 may be configured to store a software program and a module. The processor 180 executes various function applications of the mobile phone 100 and processes data by running the software program and the module stored in the memory 120. The memory 120 may mainly include a program storage area and a data storage area. The program storage area may store an operating system, an application program required for at least one function (such as an audio playback function or an image playback function), and the like. The data storage area may store data (such as audio data and a phone book) created based on usage of the mobile phone 100, and the like. In addition, the memory 120 may include a high-speed random access memory, or may further include a non-volatile memory such as at least one disk storage device, a flash memory device, or another volatile solid-state storage device.

The another input device 130 may be configured to receive entered numeral or character information, and generate key signal input related to user setting and function control of the mobile phone 100. Specifically, the another input device 130 may include but are not limited to one or more of a physical keyboard, a function key (such as a volume control key or an on/off key), a trackball, a mouse, a joystick, or an optical mouse (the optical mouse is an extension of a touch-sensitive surface that does not display a visual output, or an extension of a touch-sensitive surface formed by a touchscreen). The another input device 130 is connected to another input device controller 171 of the I/O subsystem 170, and perform signal exchange with the processor 180 wider control of the another input device controller 171.

The display screen 140 may be configured to display information entered by a user or information provided to the user and various menus of the mobile phone 100, and may also receive user input. Specifically, the display screen 140 may include a display panel 141 and a touch control panel 142. The display panel 141 may be configured in a form of an LCD (Liquid Crystal Display, liquid crystal display), an OLED (Organic Light-Emitting Diode, organic light-emitting diode), or the like. The touch control panel 142, also referred to as a touchscreen, a touch-sensitive screen, or the like, may collect a touch operation or a non-touch operation (such as an operation performed by the user on the touch control panel 142 or near the touch control panel 142 by using a finger, a stylus, or any suitable object or accessory, or a somatosensory operation the operation includes a single-point control operation, a multi-point control operation, and other types of operations) of the user on or near the touch control panel 142 and drive a corresponding connected apparatus according to a preset program. Optionally, the touch control panel 142 may include two parts: a touch detection apparatus and a touch controller. The touch detection apparatus detects a touch position and a posture of the user, detects a signal generated by a touch operation, and transfers the signal to the touch controller. The touch controller receives touch information from the touch detection apparatus, converts the touch information to information that can be processed by the processor, and sends the information to the processor 180, and can receive and execute a command sent by the processor 180. In addition, the touch control panel 142 may be implemented in a plurality of types, such as a resistive type, a capacitive type, an infrared type, and a surface acoustic wave type, or the touch control panel 142 may be implemented by using any technology developed in the future. Further, the touch control panel 142 may cover the display panel 141. The user may perform, based on content (the displayed content includes but is not limited to a soft keyboard, a virtual mouse, a virtual key, an icon, and the like) displayed on the display panel 141, an operation on or near the touch control panel 142 that covers the display panel 141. After detecting a touch operation on or near the touch control panel 142, the touch control panel 142 transfers information about the touch operation to the processor 180 by using the I/O subsystem 170, to determine a type of a touch application to determine user input. Then, the processor 180 provides, by using the I/O subsystem 170, corresponding visual output on the display panel 141 based on the type of the touch application and the user input. In FIG. 1, the touch control panel 142 and the display panel 141 are used as two independent components to implement input and input functions of the mobile phone 100. However, in some embodiments, the touch control panel 142 and the display panel 141 may be integrated to implement the input and output functions of the mobile phone 100.

The mobile phone 100 may further include at least one sensor 150, such as a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the mobile phone 100 moves close to an ear. As a type of motion sensor, an accelerometer sensor can detect magnitudes of accelerations in all directions (usually three axes) of the mobile phone, can detect a magnitude and a direction of gravity when the mobile phone is in a static state, and can be applied to an application recognizing a mobile phone posture (such as screen switching between a portrait mode and a landscape mode, a related game, and magnetometer posture calibration), a function related to vibration recognition (such as a pedometer or tapping), and the like. For another sensor that may also be configured in the mobile phone 100, such as a gyroscope, a barometer, a hygrometer, a thermometer, or an infrared sensor, details are not described herein.

The audio circuit 160, a loudspeaker 161, and a microphone 162 may provide an audio interface between the user and the mobile phone 100. The audio circuit 160 may transmit, to the loudspeaker 161, a signal converted from received audio data. The loudspeaker 161 converts the signal to an audio signal and outputs the audio signal. In addition, the microphone 162 converts the collected audio signal to a signal. The audio circuit 160 receives the signal, converts the signal to audio data, and then outputs the audio data to the RF circuit 108, to send the audio data to, for example, another mobile phone, or outputs the audio data to the memory 120 for further processing.

The I/O subsystem 170 is configured to control an input/output external device, and may include the another input device controller 171, a sensor controller 172, and a display controller 173. Optionally, one or more other input device controllers 171 receive a signal from the another input device 130 and/or send a signal to the another input device 130. The another input device 130 may include a physical button (a push button, a rocker button, or the like), a dial, a slide switch, a joystick, a click scroll wheel, and an optical mouse (the optical mouse is an extension of a touch-sensitive surface that does not display a visual output, or an extension of a touch-sensitive surface formed by a touchscreen). It should be noted that the another input device controller 171 may be connected to any one or more of the foregoing devices. The display controller 173 in the I/O subsystem 170 receives a signal from the display screen 140 and/or sends a signal to the display screen 140. After the display screen 140 detects user input, the display controller 173 converts the detected user input to interaction with a user interface object displayed on the display screen 140, that is, implements a man-machine interaction. The sensor controller 172 may receive a signal from one or more sensors 150 and/or send a signal to the one or more sensors 150.

The processor 180 is a control center of the mobile phone 100, connects various parts of the mobile phone by using various interfaces and lines, and performs various functions and data processing of the mobile phone 100 by running or executing the software program and/or the module stored in the memory 120 and invoking data stored in the memory 120, so as to perform overall monitoring on the mobile phone. Optionally, the processor 180 may include one or more processing units. Preferably, an application processor and a modem processor may be integrated into the processor 180. The application processor mainly processes an operating system, a user interface, an application program, and the like. The modem processor mainly processes wireless communication. It may be understood that the modem processor may not be integrated into the processor 180.

The mobile phone 100 further includes the power supply 190 (such as a battery) that supplies power to the components. Preferably, the power supply may be logically connected to the processor 180 by using a power supply management system, so that functions such as charging, discharging and power consumption management are implemented by using the power supply management system.

Although not shown, the mobile phone 100 may further include a camera, a Bluetooth module, and the like. Details are not described herein.

Figure 2A:
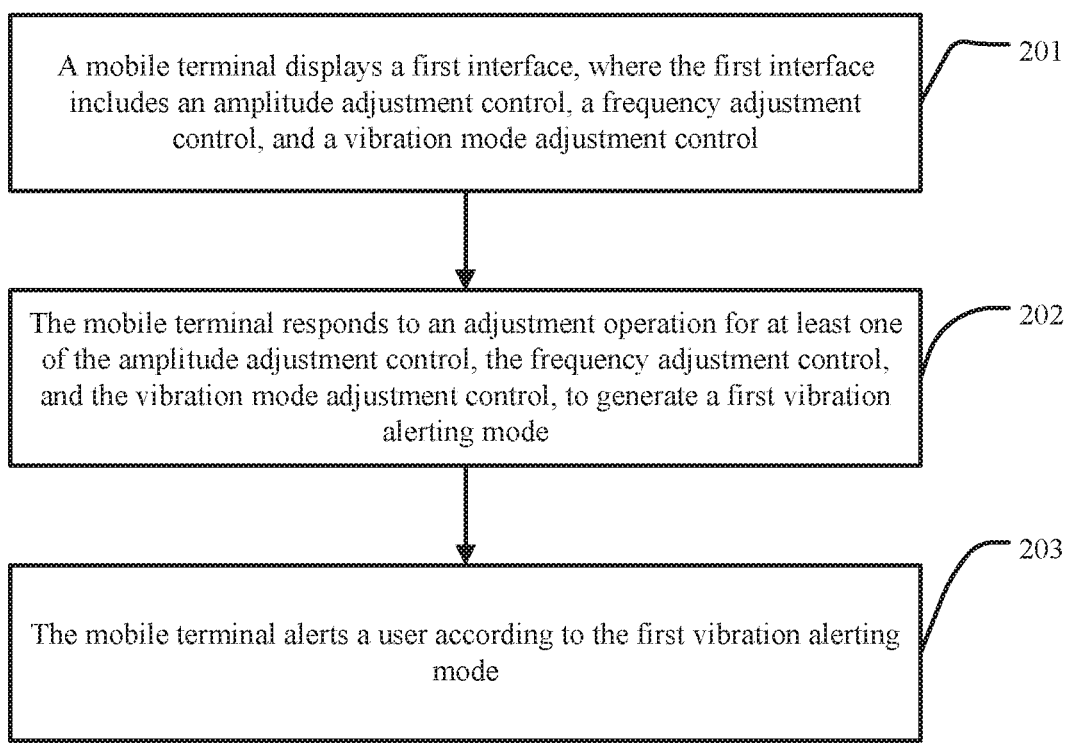
FIG. 2a is a schematic diagram of an embodiment of a vibration alerting method for a mobile terminal according to an embodiment of this application.

As shown in FIG. 2a, an embodiment of a vibration alerting mode of a mobile terminal according to an embodiment of this application specifically includes the following steps.

201. A mobile terminal displays a first interface, where the first interface includes an amplitude adjustment control, a frequency adjustment control, and a vibration mode adjustment control.

When receiving a trigger instruction, the mobile terminal displays the first interface by using a display screen of the mobile terminal. The first interface includes adjustment controls for setting a vibration alerting mode, such as an amplitude adjustment control, a frequency adjustment control, and a vibration mode adjustment control.

Optionally, the instruction may be a touch operation performed by a user on the display screen of the mobile terminal, a press operation performed by the user on a function key of the mobile terminal, that a current moment meets a preset trigger time, that a current geographic location meets a preset trigger geographic location, or that a current action mode meets a preset trigger action mode. The preset trigger time may be a preset time period or a preset moment. For example, the user taps an icon "Settings" on the display screen of the mobile terminal, the user enters the icon "Settings" by using a volume tuning key, and the mobile terminal is located in a library currently.

In this embodiment, the first interface is a setting interface of a vibration alerting mode of the mobile terminal, and the first interface further includes various icons of applications installed on the mobile terminal.

Optionally, in actual application, the first interface may further be a profile mode setting interface of the mobile terminal. In this case, the first interface further includes a ringing adjustment control. The mobile terminal displays an adjusted volume in the first interface in response to an adjustment operation for the ringing adjustment control.

202. The mobile terminal generates a first vibration alerting mode in response to an adjustment operation for at least one of the amplitude adjustment control, the frequency adjustment control, and the vibration mode adjustment control.

The mobile terminal displays an adjusted vibration parameter in the first interface in response to the adjustment operation for the at least one of the amplitude adjustment control, the frequency adjustment control, and the vibration mode adjustment control. The first vibration alerting mode includes the adjusted vibration parameter.

In this embodiment, an application layer of the mobile terminal is used as an on/off entrance to the vibration alerting mode, and the application layer transfers setting information to a kernel layer of an operating system kernel of the mobile terminal by using a mobile terminal system and a customized developed API interface, then the kernel layer obtains a corresponding value based on component information, and starts a motor component to adjust a vibration amplitude and a vibration frequency.

In this embodiment, the amplitude adjustment control and the frequency adjustment control each are displayed in the first interface in a form of a slider bar. The vibration mode adjustment control is in a one-to-one correspondence to an application installed on the mobile terminal.

203. The mobile terminal alerts a user according to the first vibration alerting mode.

When the mobile terminal receives an incoming call, an SMS message, or an event alert, the mobile terminal may alert the user according to the first vibration alerting mode.

According to this embodiment, the mobile terminal adjusts an amplitude parameter, a frequency parameter, and a vibration mode of the vibration alerting mode by adjusting the amplitude adjustment control, the frequency adjustment control, and the vibration mode adjustment control of the mobile terminal. This implements diversity of vibration alerting modes of the mobile terminal, and meets vibration requirements of the mobile terminal in different environments.

Figure 2B:
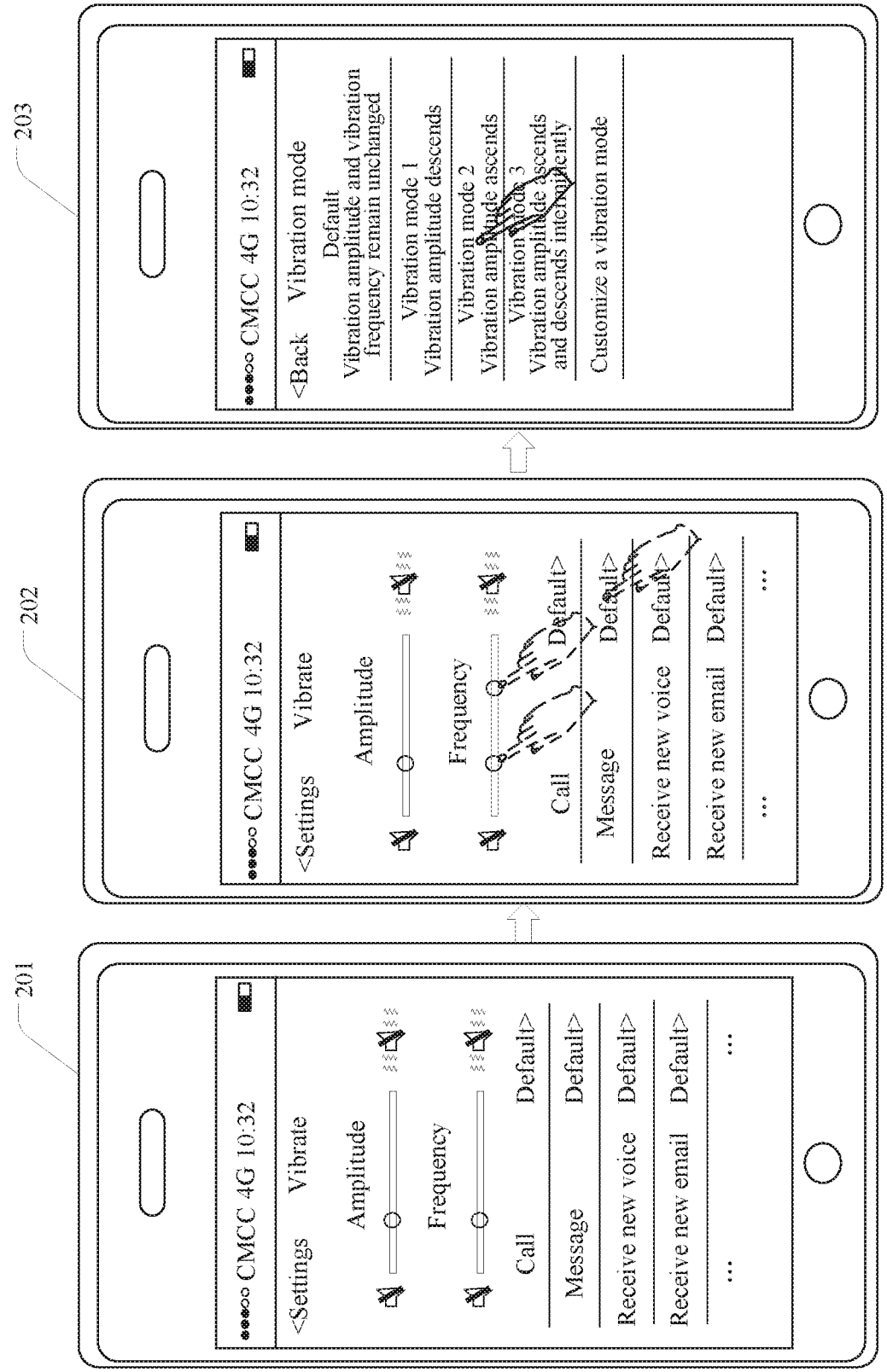
FIG. 2bA and FIG. 2bB are a schematic interface diagram of an embodiment in a vibration alerting method for a mobile terminal according to an embodiment of this application.
Figure 2B:
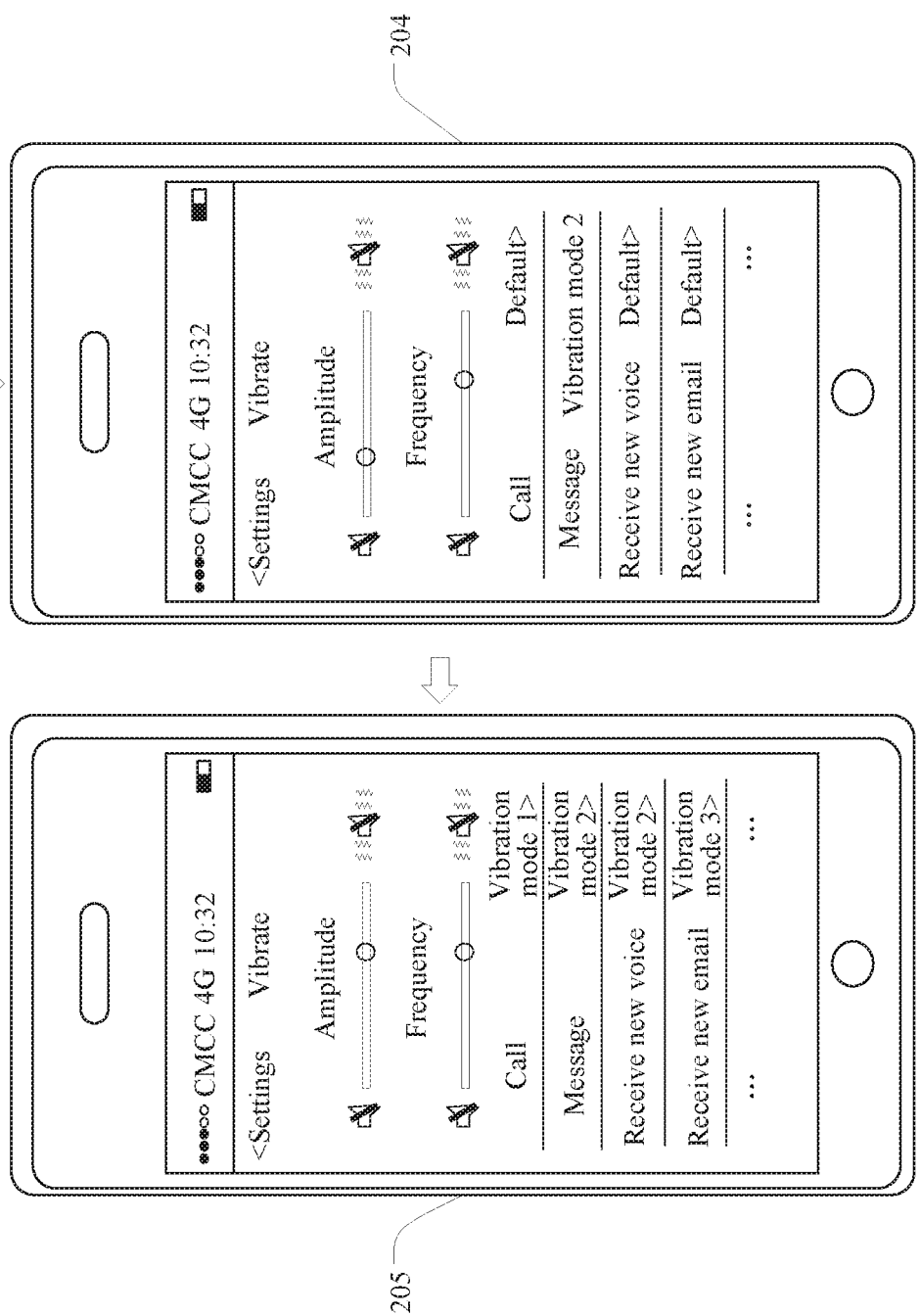

FIG. 2bA and FIG. 2bB show user interfaces of the mobile terminal according to a possible implementation of this application shown in FIG. 2a.

As shown in FIG. 2bA and FIG. 2bB, an interface 201 is a setting interface of a vibration alerting mode. There are two slider bars in the setting interface. One slider bar is used to set a vibration amplitude, and the other slider bar is used to set a vibration frequency. In the interface 201, a vibration mode corresponding to each software application app on the mobile terminal is initially default. In this embodiment, it is assumed that a tunable range of the vibration amplitude is from 0 to 100, and a tunable range of the vibration frequency is from 0 to 100. Both the tunable range of the vibration amplitude and the tunable range of the vibration frequency herein are quantized tunable ranges. For example, the tunable range of the vibration amplitude is from 0 to 100, and a change range of the vibration amplitude is essentially from 0 to 20 millimeters. A correspondence between the tunable range of the vibration amplitude and an essential change range of the vibration amplitude is preset, and this is not specifically limited herein.

In this embodiment, the vibration amplitude is a maximum displacement for which a motor of the mobile terminal deviates from a balancing location of the motor in a vibration process. The vibration frequency is a quantity of vibration times of the motor per unit of time, and is measured in Hertz. The apps on the mobile terminal include but are not limited to those shown in the interface 201, and are not specifically limited.

As shown in an interface 202, the user drags a sliding block on the slider bar to adjust the vibration amplitude or the vibration frequency. If the user needs to set a vibration mode corresponding to an app on the mobile terminal, the user taps a vibration mode selection button (for example, taps "Default" shown in the interface 202), then the interface jumps to a vibration mode selection interface shown in an interface 203, and the user selects one vibration mode from a vibration mode list. As shown in the interface 202, if the user needs to set a vibration mode corresponding to an SMS message application, the user taps "Default" corresponding to the SMS message application to enter the interface 203, and then selects a vibration mode 2 from the vibration mode list as the vibration mode corresponding to the SMS message application. After the user selects the vibration mode, the user interface jumps to an interface 204, and it can be seen that the vibration mode corresponding to the SMS message application is the vibration mode 2.

In this embodiment, each vibration mode in the vibration mode list is used to indicate a change trend of a vibration amplitude and/or a vibration frequency at which the mobile terminal vibrates. As shown in the interface 203, a default mode indicates that, when the mobile terminal alerts the user through vibration, the vibration frequency and the vibration amplitude remain unchanged; a vibration mode 1 indicates that, when the mobile terminal alerts the user through vibration, the vibration frequency remains unchanged, and the vibration amplitude descends; the vibration mode 2 indicates that, when the mobile terminal alerts the user through vibration, the vibration frequency remains unchanged, and the vibration amplitude ascends; and a vibration mode 3 indicates that, when the mobile terminal alerts the user through vibration, the vibration frequency remains unchanged, and the vibration amplitude ascends and descends intermittently (that is, the vibration amplitude becomes strong sometimes and becomes weak sometimes). It may be understood that the vibration modes shown in the interface 203 are merely some possible cases. The vibration modes further include the following possible cases: both the vibration amplitude and the vibration frequency descend; both the vibration amplitude and the vibration frequency ascend; both the vibration amplitude and the vibration frequency ascend and descend intermittently; the vibration amplitude remains unchanged, and the vibration frequency descends; the vibration amplitude remains unchanged, and the vibration frequency ascends; and the vibration amplitude remains unchanged, and the vibration frequency ascend and descend intermittently.

In a setting process, if the user sets both the vibration amplitude and the vibration frequency, and sets a vibration mode for each app, a final presentation result may be shown in an interface 205. It may be understood that, the interface 205 is merely a possible setting result, and a specific setting result is not limited herein. An amplitude strength may change within a range of the vibration amplitude and/or a range of the vibration frequency that are/is set by the user, or a maximum tunable range of the vibration amplitude and/or a maximum tunable range of the vibration frequency that are/is preset based on a system. For example, it is assumed that, as shown in the interface 205, the maximum tunable range of the vibration amplitude is from 0 to 100, and the maximum tunable range of the vibration frequency is from 0 to 100. The range of the vibration amplitude and the range of the vibration frequency that are set by the user are from 0 to 70 and from 0 to 90, respectively. A call application is used as an example. A vibration mode corresponding to the call application is the vibration mode 1. To be specific, when the mobile terminal is called, the vibration frequency remains unchanged, and the vibration amplitude descends. It can be learned from the foregoing that, when the mobile terminal is called, a change trend of the vibration strength includes the following solutions: The vibration amplitude changes from 70 to 0, and the vibration frequency remains unchanged; and the vibration amplitude changes from 100 to 0, and the vibration frequency remains unchanged.

Figure 3:
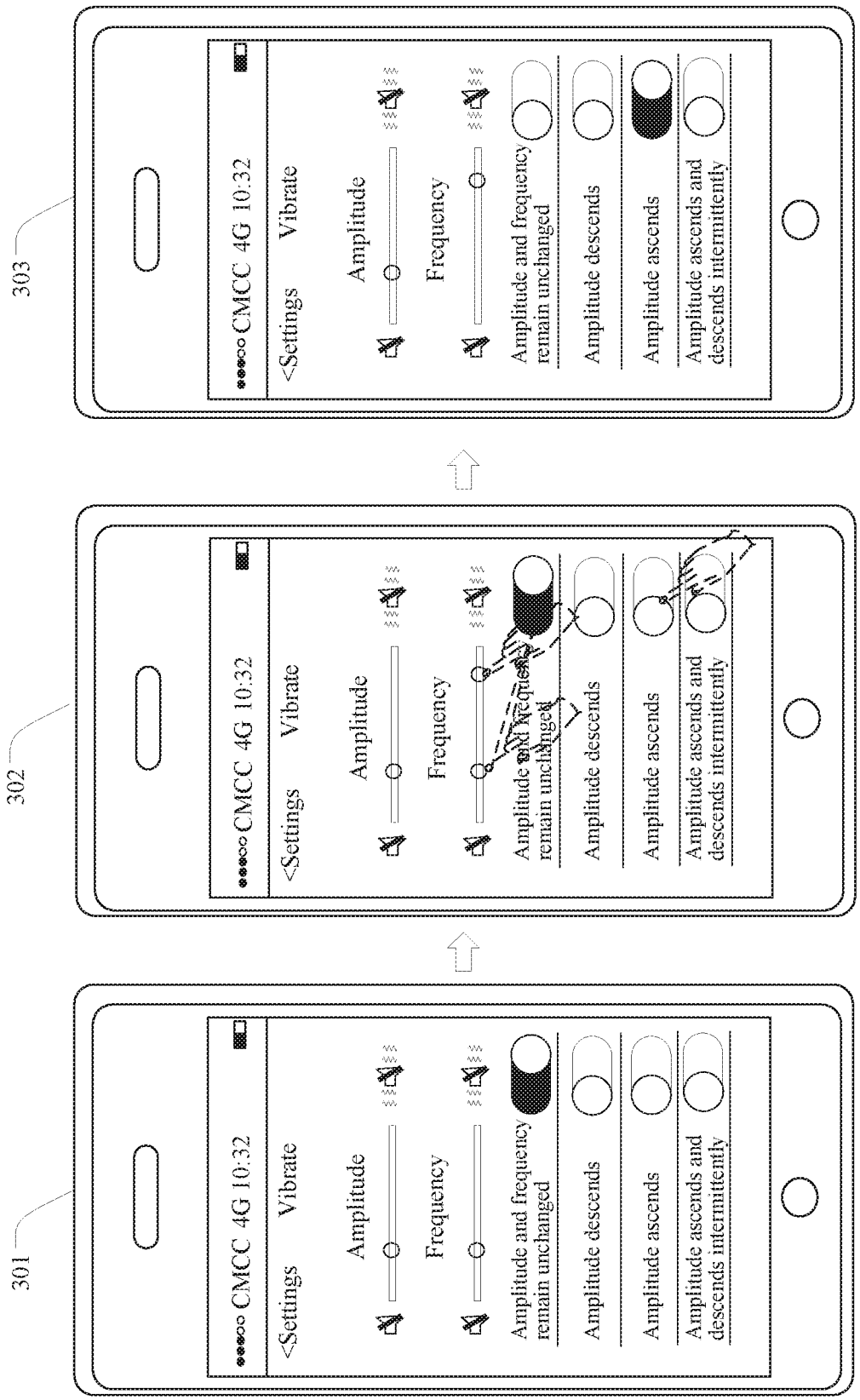
FIG. 3 is a schematic interface diagram of another embodiment in a vibration alerting method for a mobile terminal according to an embodiment of this application.

FIG. 3 shows user interfaces of a mobile terminal provided in a possible implementation according to an embodiment of this application.

As shown in FIG. 3, an interface 301 is a default setting interface. The interface 301 includes a function button used to indicate turning on a specific vibration mode, and a user can determine to select a specific vibration mode by manipulating the function button. In an interface 302, the user sets a vibration amplitude and a vibration frequency by using a slider bar. In this embodiment, for the mobile terminal, same setting of the mobile terminal is implemented in the setting interface, but each app cannot be set individually. An interface 303 is a possible selling result in this embodiment, a specific setting result is determined by the user, and this is not limited herein.

It may be understood that function buttons each used to indicate a vibration mode that are presented in FIG. 3 are merely some possible implementations, and this is not specifically limited herein.

Figure 4A:
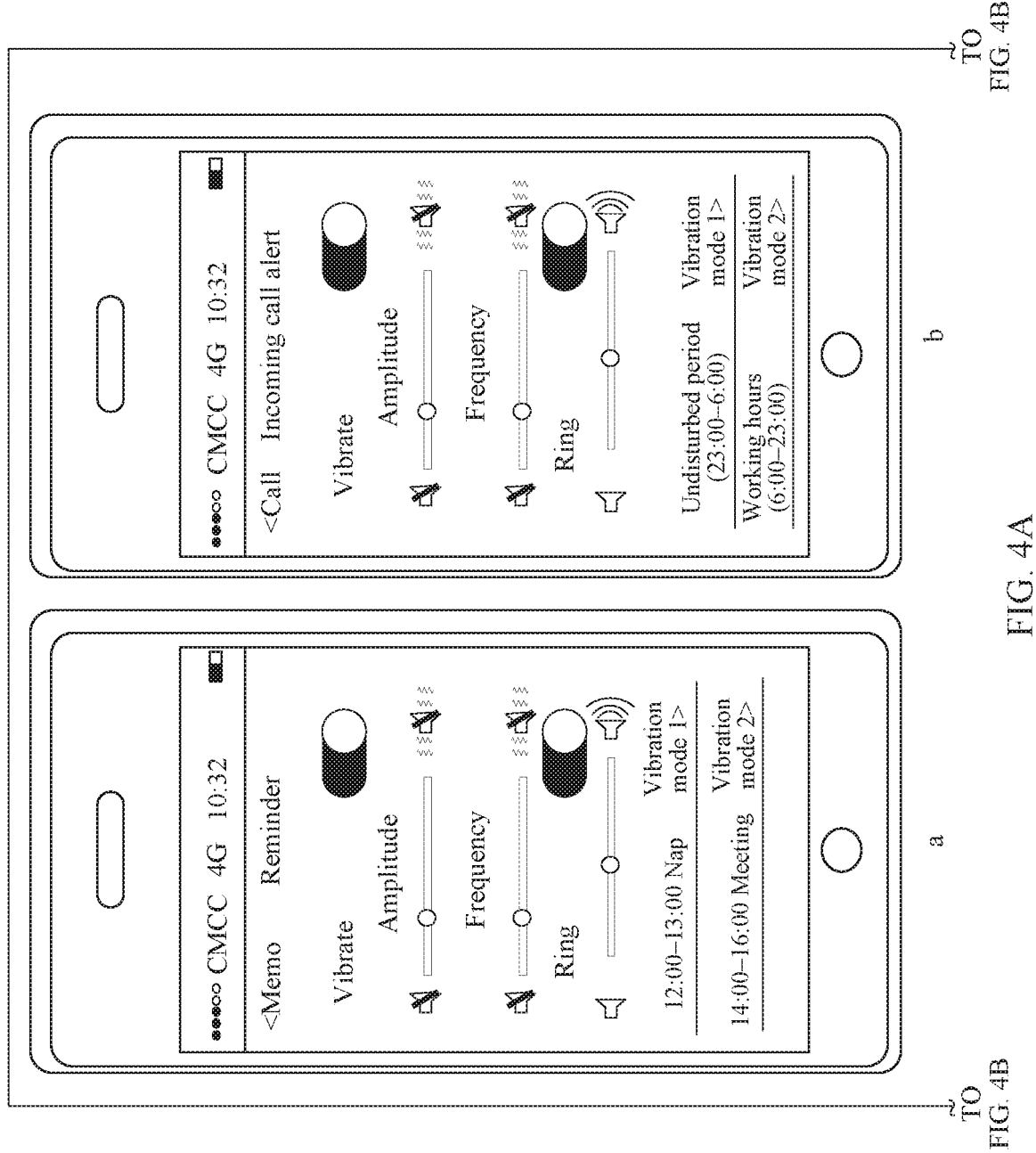
FIG. 4A and FIG. 4B are a schematic interface diagram of another embodiment in a vibration alerting method for a mobile terminal according to an embodiment of this application.
Figure 4B:
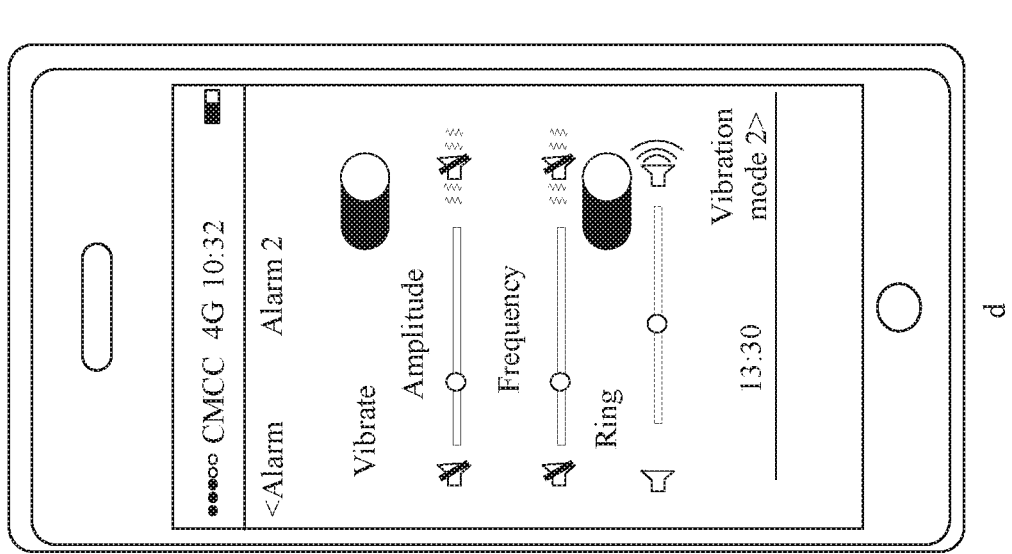
Figure 4B:
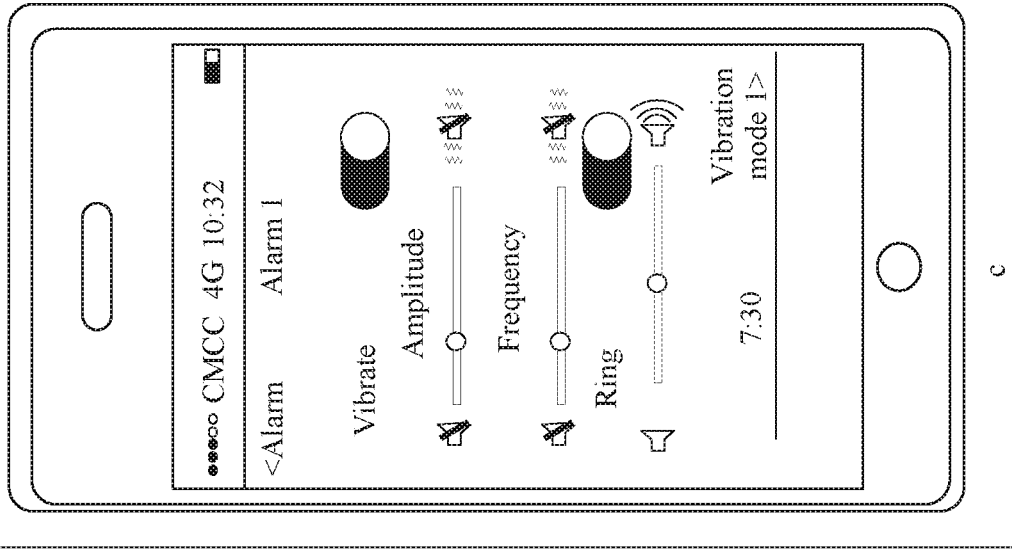

FIG. 4A and FIG. 4B show user interfaces of a mobile terminal provided in a possible implementation according to an embodiment of this application.

An interface a to an interface c in FIG. 4A and FIG. 4B are schematic diagrams of setting interfaces of alerting anodes of apps. As shown in the interface a to the interface c, in each of a setting interface of a reminder in a memo of the mobile terminal, a setting interface of an incoming call alert of the mobile terminal, and a setting interface of an alarm of the mobile terminal, there are on/off options for a vibration alerting mode and for a ringing alerting mode, a slider bar for adjusting a vibration amplitude, a slider bar for adjusting a vibration frequency, and a slider bar for adjusting a ringing volume. A user sets, according to a requirement of the user, whether to turn on the vibration alerting mode and the ringing alerting mode.

In the interface a, for a reminder in the memo, the user may set different vibration modes for different reminders. For example, the user turns on an on/off option of a vibration alerting mode and an on/off option of a ringing alerting mode, and sets an alerting mode for a reminder in a calendar application or a memo application. The user may set a vibration amplitude, a vibration frequency, and a ringing volume by using corresponding slider bars. Agendas recorded on the mobile terminal include: "12:00-13:00 Nap" and "14:00-16:00 Meeting". A vibration mode corresponding to the agenda "12:00-13:00 Nap" is set to a vibration mode 1, and a vibration mode corresponding to the agenda "14:00-16:00 Meeting" is set to a vibration mode 2.

In the interface b, for an incoming call alert, the user may set different vibration modes for different incoming call moments or set different vibration modes for different incoming call objects. The user may turn on an on/off option of a vibration alerting mode and an on/off option of a ringing alerting mode, to specifically set an alerting mode for an incoming call alert. The user may set a vibration amplitude, a vibration frequency, and a ringing volume by using corresponding slider bars. For example, the user sets an undisturbed period and a working period on the mobile terminal. The undisturbed period is from 23:00 to 6:00, and the working period is from 6:00 to 23:00. The user sets a vibration mode corresponding to the undisturbed period to the vibration mode 1, and sets a vibration mode corresponding to the working period to the vibration mode 2. For example, for a contact A, the user sets incoming call alerting of the contact A to the vibration mode 1, and for a contact B, the user sets incoming call alerting of the contact B to the vibration mode 2.

In the interface c and the interface d, for alarm alerting, the user may set different vibration modes for different alarming moments. The user may turn on an on/off option of a vibration alerting mode and an on/off option of a ringing alerting mode, to specifically set alerting modes for different alarm moments. The user may set a vibration amplitude, a vibration frequency, and a ringing volume by using corresponding slider bars. As shown in the interface c, the user sets that an alerting moment of an alarm 1 on the mobile terminal is 7:30 am, and the user sets a vibration mode to the vibration mode 1. As shown in the interface d, the user sets that an alerting moment of an alarm 2 on the mobile terminal is 13:30, and the user sets a vibration mode to the vibration mode 2.

In actual application, the mobile terminal may further intelligently adjust the alerting mode of the mobile terminal according to specific application scenarios. For example, during the nap period and the meeting period shown in the interface a, the mobile terminal may automatically turn off the ringing alerting mode.

It may be understood that in this embodiment, the setting method shown in FIG. 2bA and FIG. 2bB and the setting method shown in FIG. 4A and FIG. 4B can coexist. However, a setting result implemented by using the setting method shown in FIG. 4A and FIG. 4B is preferably implemented. For example, it is assumed that in a setting interface of a vibration alerting mode of the mobile terminal, a vibration amplitude is 40 and a vibration frequency is 40 in the vibration alerting mode set by the user, and a vibration mode corresponding to a call application is the vibration mode 1. In a setting interface of an incoming call alert of the mobile terminal, a vibration amplitude is 50 and a vibration frequency is 50 in a vibration alerting mode set by the user. When the mobile terminal is called in an ordinary occasion, in the vibration alerting mode corresponding to the incoming call alert, the vibration amplitude is 50, the vibration frequency is 50, and the vibration mode is the vibration mode 1.

Figure 5A:
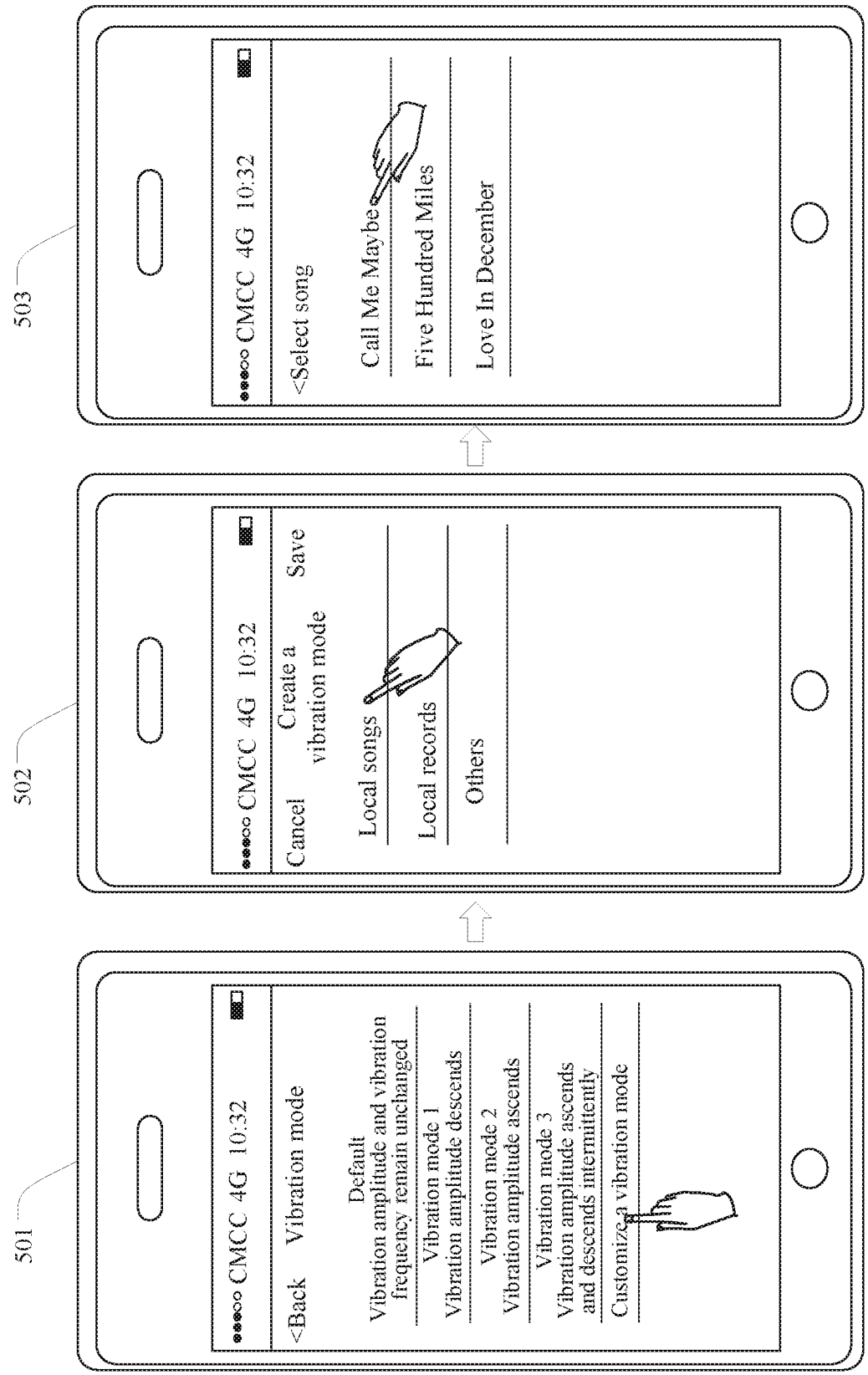
Figure 5C:
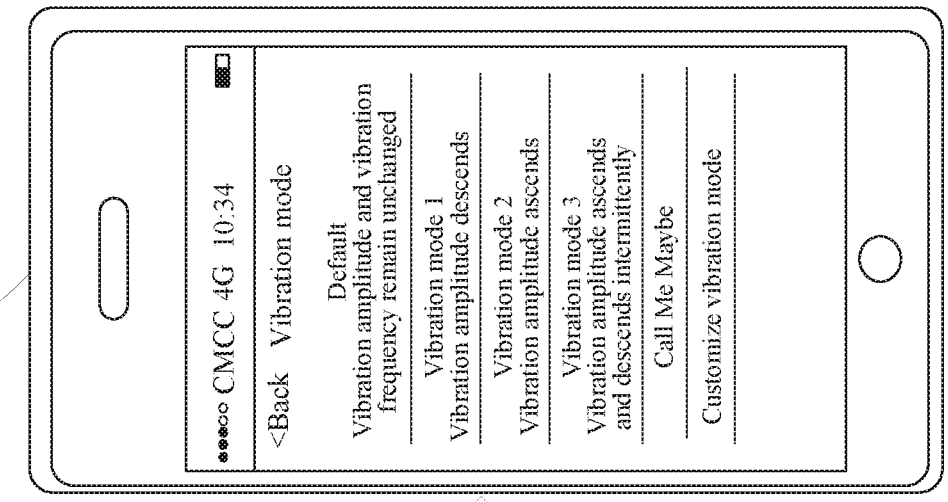
Figure 5C:
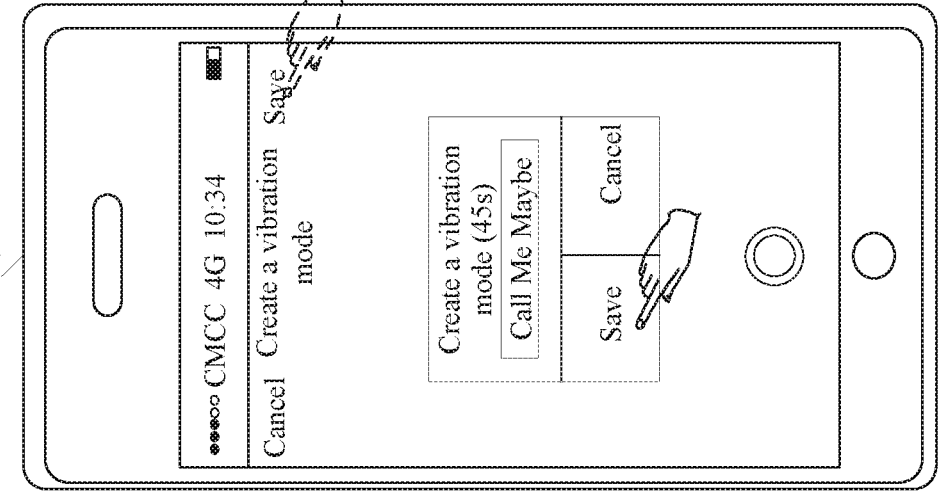

FIG. 5A to FIG. 5C show user interfaces of a mobile terminal in a possible implementation according to an embodiment of this application. An interface 501 to an interface 508 in FIG. 5A to FIG. 5C present a process of creating a vibration mode based on a local song by the mobile terminal. In this embodiment, creating a vibration mode on the mobile terminal is that a user can set a vibration mode by the user.

In the user interface 501 of a vibration mode list of the mobile terminal, the user taps "Customize a vibration mode" to start a process of customizing the vibration mode. In this embodiment, the user may tap an option icon "Customize a vibration mode" in any of the following manners: single tap, double tap, touch and hold, and press and hold, provided that the mobile terminal can obtain a start request. This is not specifically limited herein.

After obtaining the start request for starting the process of customizing the vibration mode, the mobile terminal presents the user interface 502 presenting "Create a vibration mode". The user interface 502 is used to present sources of vibration materials of the newly created vibration mode. In this embodiment, the user may generate the vibration mode through conversion based on a local song or a local record. In this embodiment, the user taps "Local songs".

A song list is presented in the interface 503. The user selects a to-be-converted song according to a preference of the user. In the interface 503, the song list includes "Call Me Maybe", "Five Hundred Miles", and "Love In December". In this embodiment, the user taps "Call Me Maybe".

In the interface 504, a duration progress bar of the song selected by the user is presented, then the user taps two points (for example, points A and B shown in the interface 504) on the progress bar to determine a part of the to-be-converted song, and finally taps a start button. In this embodiment, song duration determined by the two points A and B is 45 seconds. Optionally, the mobile terminal may alternatively generate the vibration mode according to whole duration of the song.

In the interface 505, a generation progress diagram "Creating a vibration mode . . . " is presented. In actual application, the mobile terminal may prompt a generation progress in the interface 505 by using words, or may prompt a generation progress by using a progress bar. A specific manner is not limited.

In the interface 506, a vibration mode generated through conversion is presented. In this embodiment, a point represents vibration, and a spacing between points represents a vibration interval.

After obtaining a storage instruction triggered by the user, the mobile terminal presents a naming interface 507, and then stores a name of the newly created vibration mode. In this embodiment, the user may name the vibration mode generated through conversion based on the song "Call Me Maybe" as "Call Me Maybe", and then tap "Save".

After the mobile terminal stores the newly created vibration mode, in the interface 508, the newly created vibration mode is displayed in the vibration mode list. In this embodiment, the vibration mode "Call Me Maybe" is added to the vibration mode list.

In a process of converting to the vibration mode based on the song, a vibration amplitude in the vibration mode is obtained through conversion based on a tone of the song, and a vibration frequency in the vibration mode is obtained through conversion based on a rhythm of the song. In this embodiment, only a possible presentation manner of the newly generated vibration mode is presented in a user interface. In actual application, there are a plurality of presentation manners, and a specific manner is not limited. In addition, the user may customize any name for the vibration mode generated through conversion based on the song "Call Me Maybe", and this is not specifically limited.

Figure 6A:
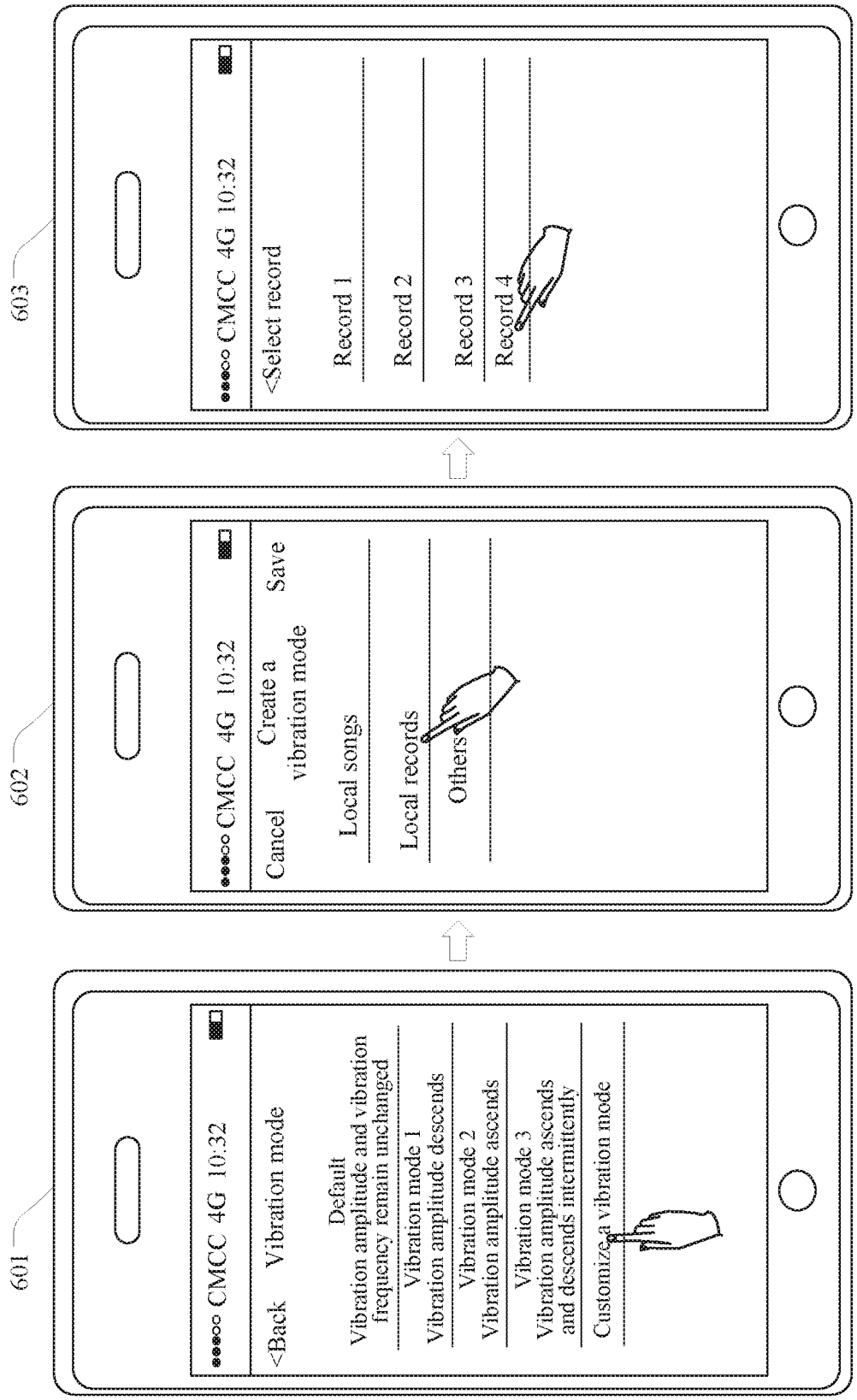
Figure 6C:
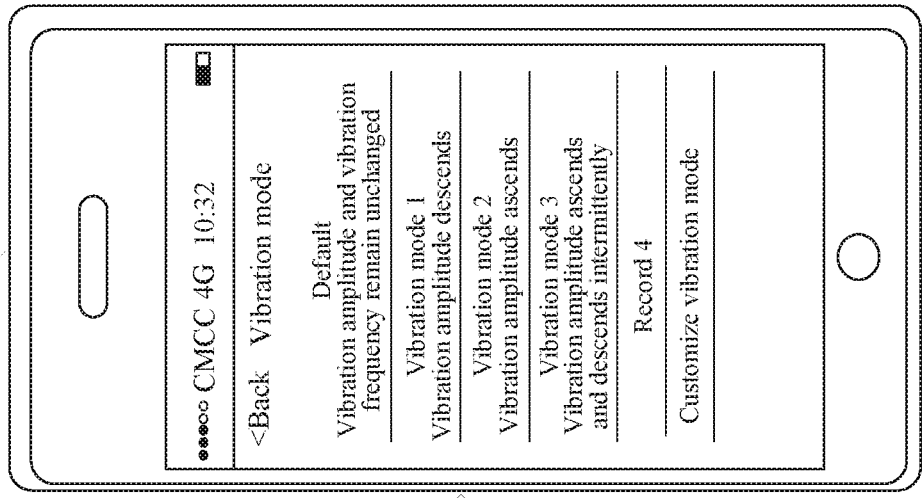
Figure 6C:
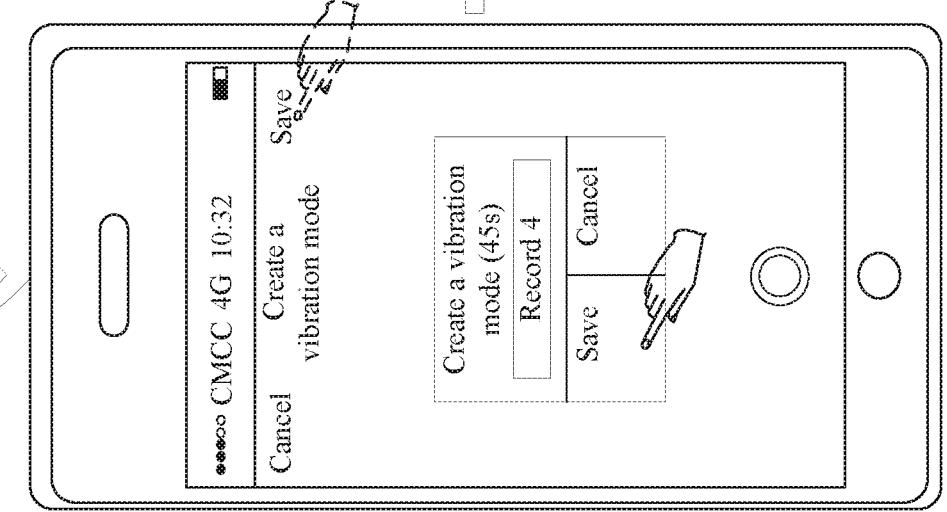

FIG. 6A to FIG. 6C show user interfaces of a mobile terminal in a possible implementation according to an embodiment of this application. An interface 601 to an interface 608 in FIG. 6A to FIG. 6C present a process of creating a vibration mode based on a local record by the mobile terminal. In this embodiment, customizing a vibration mode on the mobile terminal is that a user can set a vibration mode by the user.

In the user interface 601 of a vibration mode list of the mobile terminal, the user taps "Customize a vibration mode" to create the vibration mode.

After obtaining a start request for starting a process of creating the vibration mode, the mobile terminal presents the user interface 602 presenting "Create a vibration mode". The user interface 602 is used to present sources of vibration materials of the newly created vibration mode. In this embodiment, the user may generate the vibration mode through conversion based on a local song or a local record. In this embodiment, the user taps "Local records".

A record list is presented in the interface 603. The user selects a to-be-converted record according to a preference of the user. In the interface 603, the record list includes "Record 1", "Record 2", "Record 3", and "Record 4". In this embodiment, the user taps "Record 4".

In the interface 604, a duration progress bar of the record selected by the user is presented, then the user taps two points (for example, points A and B shown in the interface 604) on the duration progress bar to determine a part of the to-be-converted record, and finally taps a start button. In this embodiment, recording duration determined by the two points A and B is 45 seconds. Optionally, the mobile terminal may alternatively generate the vibration mode according to whole duration of the record.

In the interface 605, a generation progress diagram "Creating a vibration mode . . . " is presented.

In actual application, the mobile terminal may prompt a generation progress by using words, or may prompt a generation progress by using a progress bar. A specific manner is not limited.

In the interface 606, a vibration mode generated through conversion is presented. In this embodiment, a point represents vibration, and a spacing between points represents a vibration interval.

After obtaining a storage instruction triggered by the user, the mobile terminal presents a naming interface 607, and then stores a name of the newly created vibration mode. In this embodiment, the user may name the vibration mode generated through conversion based on "Record 4" as "Record 4", and then tap "Save".

After the mobile terminal stores the newly created vibration mode, in the interface 608, the newly created vibration mode is displayed in the vibration mode list. In this embodiment, the vibration mode "Record 4" is added to the vibration mode list.

In a process of converting to the vibration mode based on the record, a vibration amplitude in the vibration mode is obtained through conversion based on a tone of the record, and a vibration frequency in the vibration mode is obtained through conversion based on a rhythm of the record. In this embodiment, only a possible presentation manner of the newly generated vibration mode is presented in a user interface. In actual application, there are a plurality of presentation manners, and a specific manner is not limited. In addition, the user may customize any name for the vibration mode generated through conversion based on the record "Record 4", and this is not specifically limited.

Figure 7A:
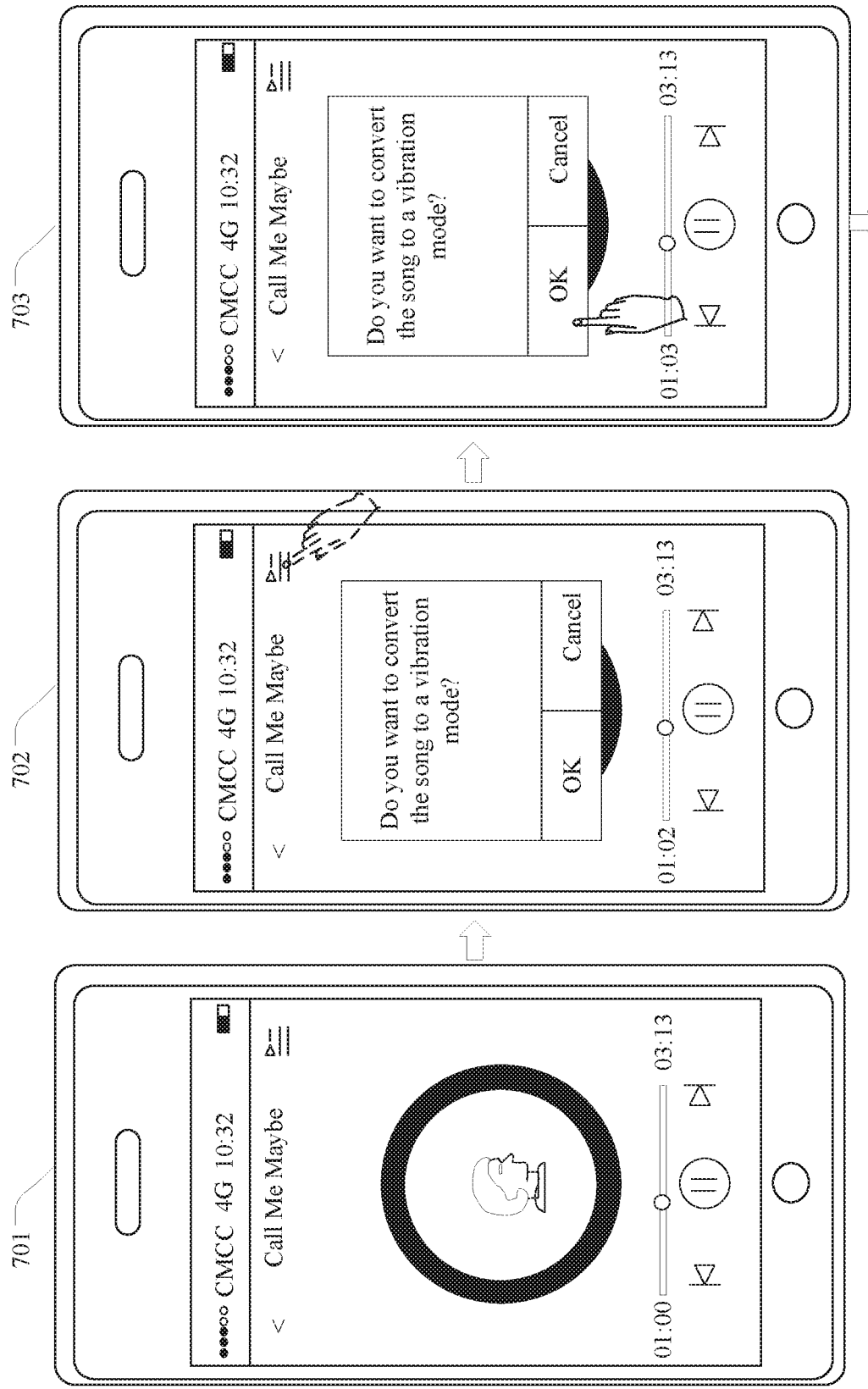
FIG. 7A to FIG. 7C are a schematic interface diagram of another embodiment for generating a customized vibration mode according to an embodiment of this application.
Figure 7B:
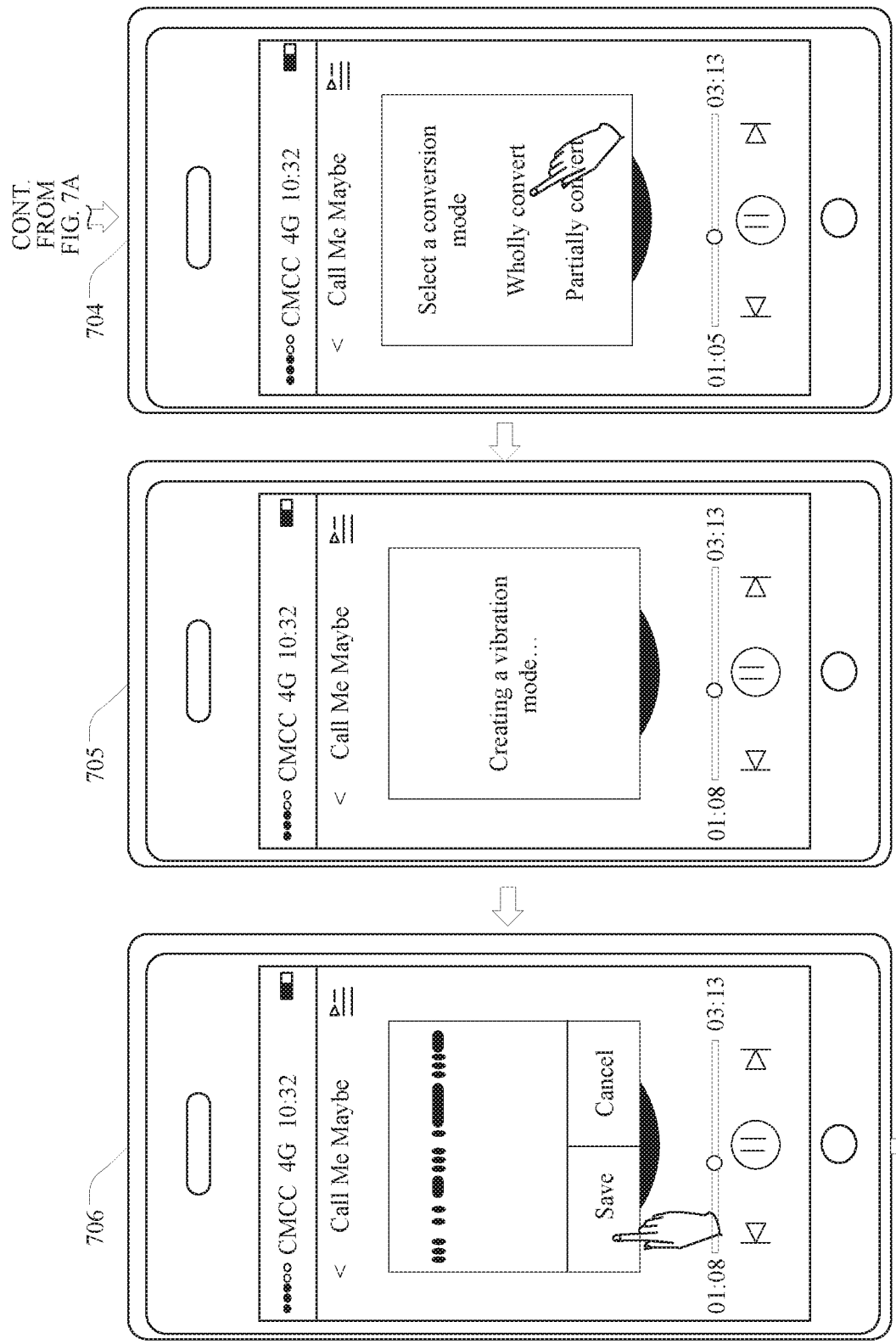
Figure 7C:
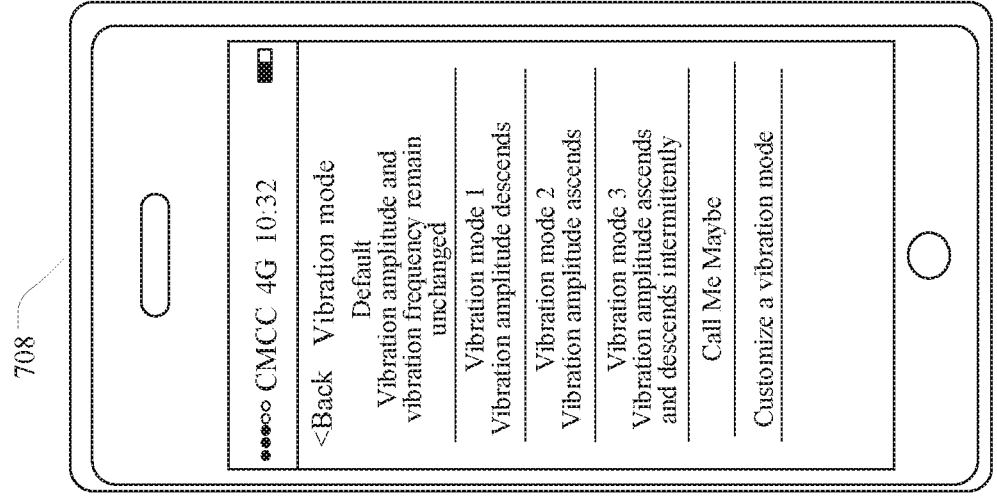
Figure 7C:
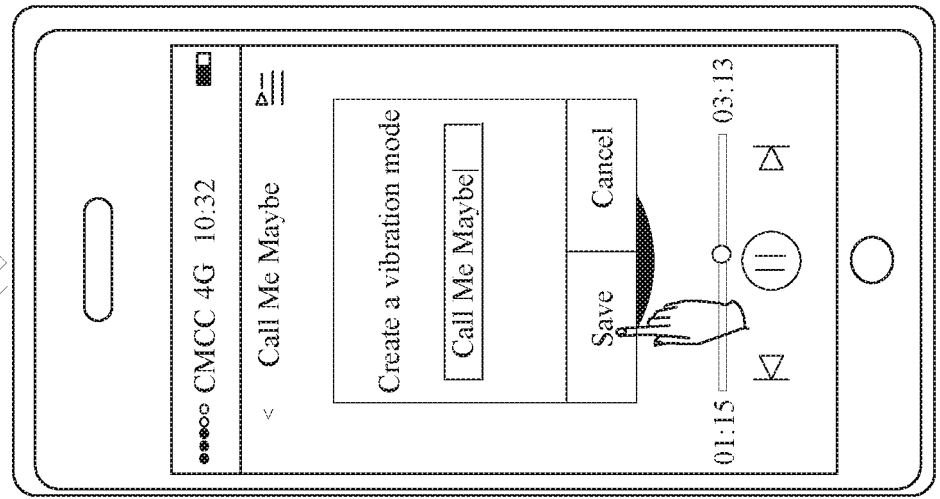

FIG. 7A to FIG. 7C show user interfaces of a mobile terminal in a possible implementation according to an embodiment of this application. An interface 701 to an interface 708 in FIG. 7A to FIG. 7C present a process of converting to a vibration mode based on a being-played song by the mobile terminal. The specific process is as follows.

In the interface 701, a song play interface is presented. A song "Call Me Maybe" is being played on the mobile terminal.

If a user wants to perform conversion to the vibration mode based on the being-played song, the user may tap a preset function button to call out a pop-up conversion window from the interface 702, to prompt the user whether to perform conversion to the vibration mode based on the song.

In actual application, a condition for the mobile terminal to call out the pop-up conversion window includes but is not limited to the following possible implementations.

In a possible implementation, the user presses a current screen for a period of time exceeding a preset time (for example, presses the screen for more than three seconds).

In another possible implementation, the user presses the current screen with a strength exceeding a preset pressure (for example, a strength of pressing the screen is categorized into five levels, and the press strength exceeds a level 3 herein).

In another possible implementation, the user slides on the current screen by using a preset gesture (for example, slides on the screen according to an S shape).

In another possible implementation, the user double-taps the current screen.

If the user wants to perform conversion to the vibration mode based on the song, the user taps a button "OK" in a pop-up conversion window in the interface 703. In this embodiment, after the user taps the button "OK", a selection interface is presented in the interface 704. The selection window is used by the user to select "Wholly convert" or "Partially convert". If the user taps "Partially convert", the user interface of the mobile terminal jumps to the user interface presenting "Create a vibration mode" shown in FIG. 5A to FIG. 5C. In this embodiment, the user selects "Wholly convert". A progress diagram "Creating a vibration mode . . . " is presented in a window in the interface 705. After conversion to the vibration mode based on the song completes, the converted-to vibration mode is presented in a window in the interface 706. The user taps a button "Save" in the window, and then a naming window is presented in the interface 707. After entering a name, the user taps a button "Save", and stores the newly created vibration mode in a vibration mode list, as shown in the interface 708.

Figure 8A:
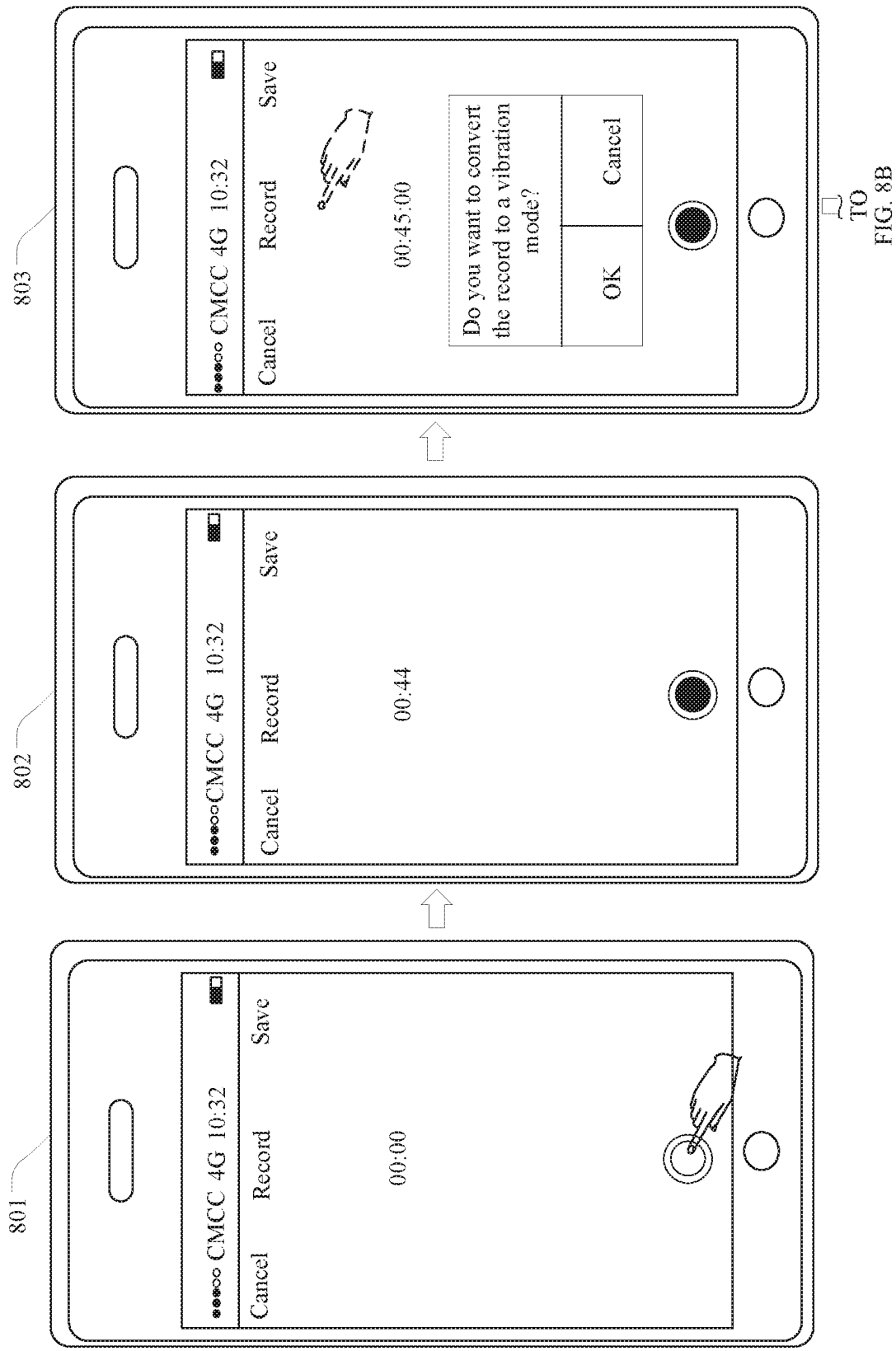
FIG. 8A to FIG. 8C are a schematic interface diagram of another embodiment for generating a customized vibration mode according to an embodiment of this application.
Figure 8B:
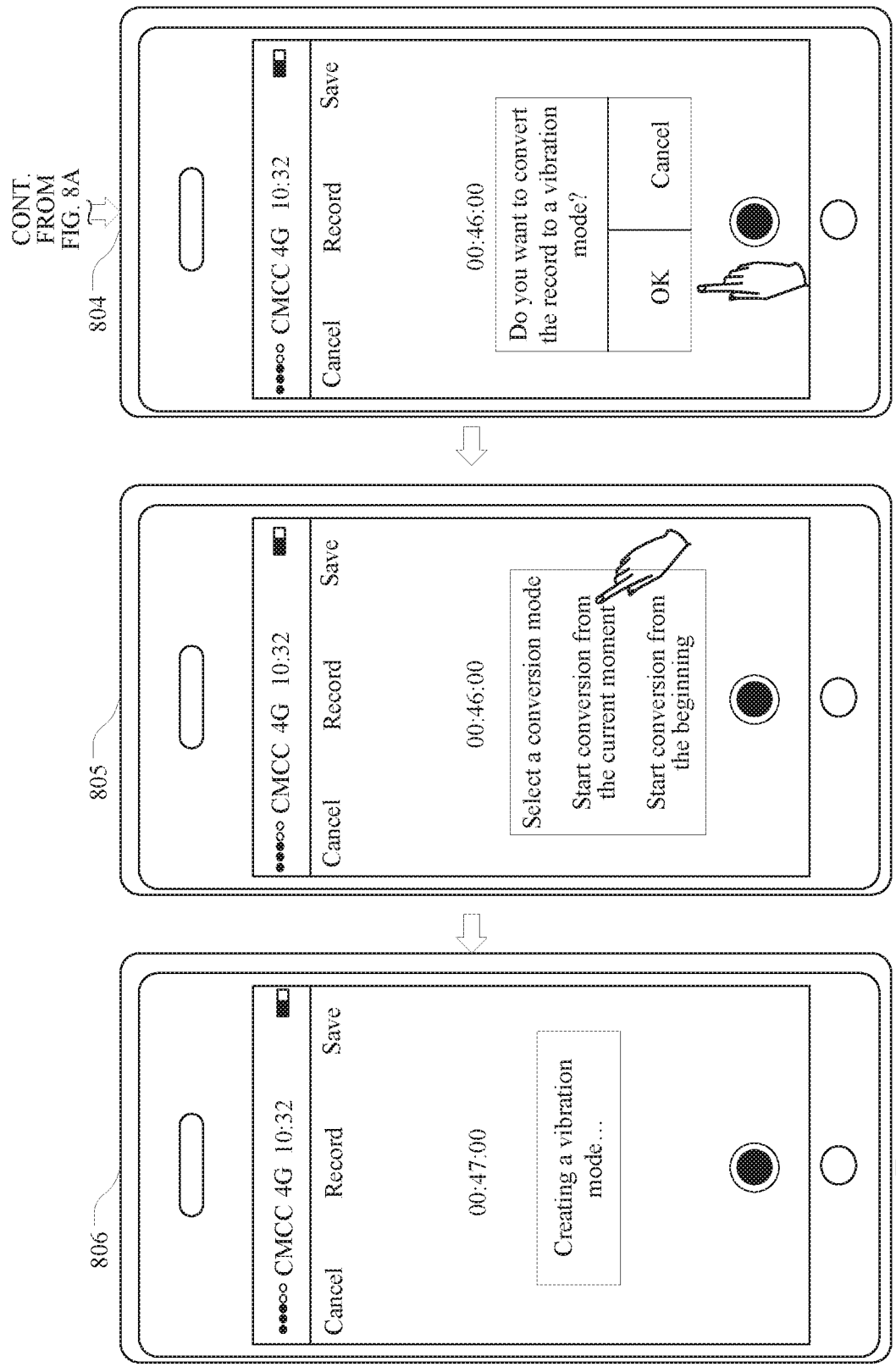
Figure 8C:
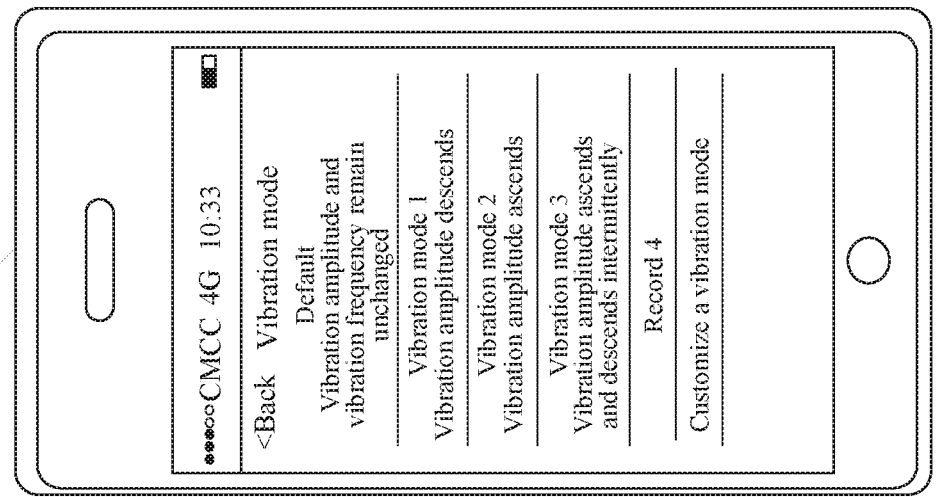
Figure 8C:
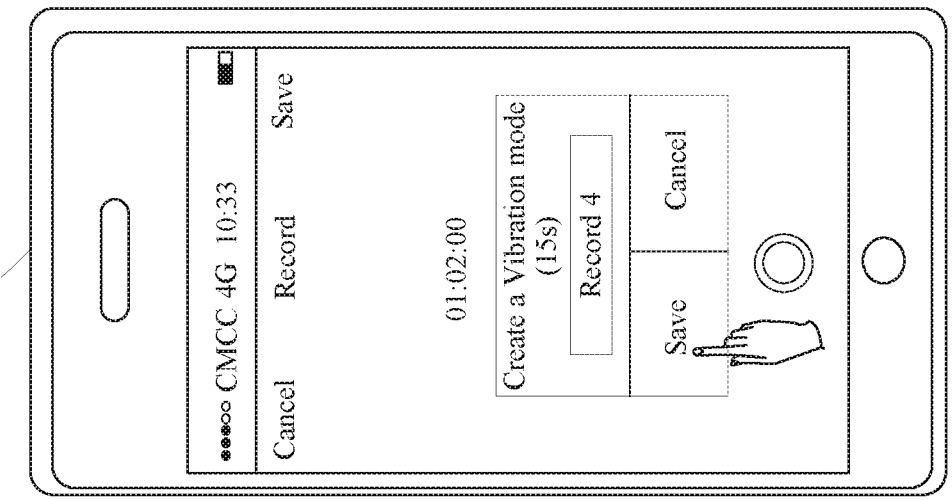
Figure 8C:
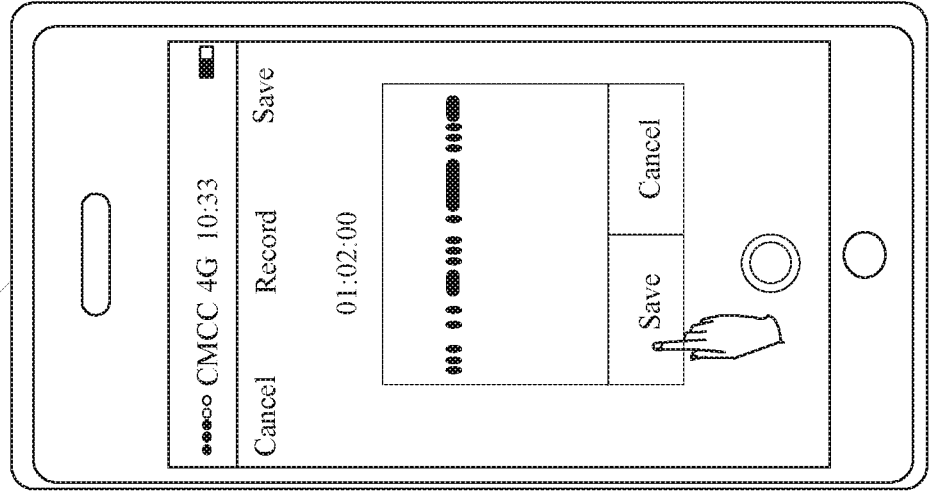

FIG. 8A to FIG. 8C show user interfaces of a mobile terminal in a possible implementation according to an embodiment of this application. An interface 801 to an interface 809 in FIG. 8A and FIG. 8C present a process of converting to a vibration mode based on a record in a recording process. The specific process is as follows.

In the interface 801, a recording interface in this embodiment is presented. After a user starts recording, a recording process shown in the interface 802 is started.

If the user determines to perform conversion to the vibration mode based on the record, a pop-up conversion window is called out from the interface 802. As shown in the interface 803, the user may tap a preset function button to call out the pop-up conversion window, to prompt the user whether to perform conversion to the vibration mode based on the record.

In actual application, a condition for the mobile terminal to call out the pop-up conversion window includes but is not limited to the following possible implementations.

In a possible implementation, the user presses a current screen for a period of time exceeding a preset time (for example, presses the screen for more than three seconds).

In another possible implementation, the user presses the current screen with a strength exceeding a preset pressure (for example, a strength of pressing the screen is categorized into five levels, and the press strength exceeds a level 3 herein).

In another possible implementation, the user slides on the current screen by using a preset gesture, for example, slides towards right.

In another possible implementation, the user double-taps the current screen.

If the user wants to perform conversion to the vibration mode based on the record, the user taps a button "OK" in a pop-up conversion window in the interface 804. In this embodiment, after the user taps the button "OK", a selection window shown in the interface 805 pops up. The selection window is used to instruct the user to select "Start conversion from the current moment" or "Start conversion from the beginning". If the user taps "Start conversion from the beginning", after recording for the record completes, the interface jumps to the user interface presenting "Create a vibration mode" shown in FIG. 6A to FIG. 6C. In this embodiment, the user selects "Start conversion from the current moment", and "Creating a vibration mode . . . " is presented in a window in the interface 806. In actual application, the process of performing conversion to the vibration mode based on the record by the mobile terminal is in a one-to-one correspondence to a recording process of the record (that is, a recording moment is corresponding to a conversion moment). When recording for the record completes, the process of performing conversion to the vibration mode based on the record also completes. The converted-to vibration mode is presented in a window in the interface 807. The user taps a button "Save" in the window in the interface 807, and then a naming window is presented in the interface 808. After entering a name, the user taps a button "Save", and stores the newly created vibration mode in a vibration mode list, as shown in the interface 809.

It may be understood that FIG. 5A to FIG. 8C show some possible implementations of performing conversion to a vibration mode by the mobile terminal based on a song or a record. In actual application, other possible implementations may be further included, and this is not specifically limited.

Figure 9:
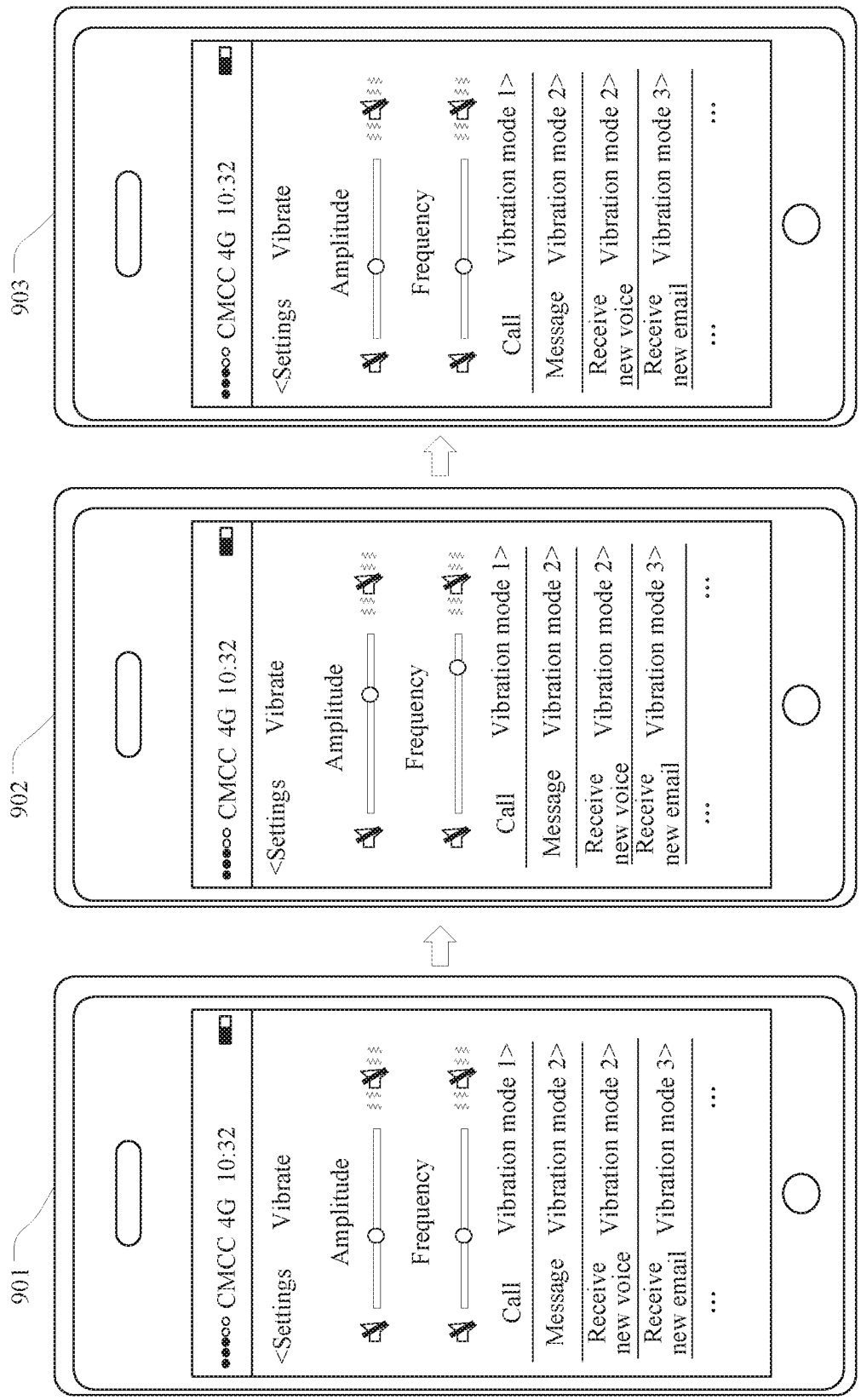
FIG. 9 is a schematic interface diagram of an embodiment for intelligently adjusting a vibration alerting mode by a mobile terminal according to an embodiment of this application.
Figure 10:
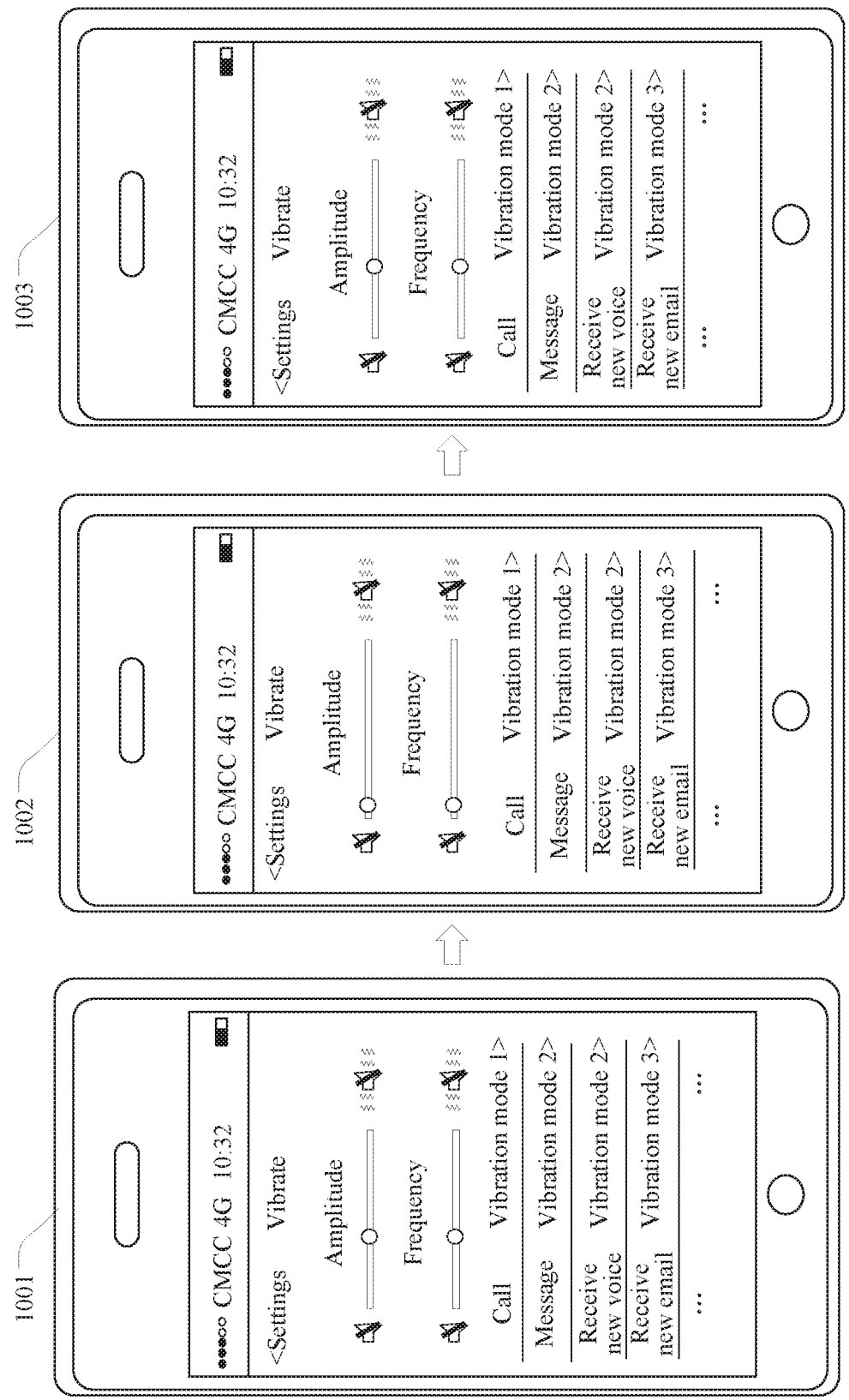
FIG. 10 is a schematic interface diagram of another embodiment for intelligently adjusting a vibration alerting mode by a mobile terminal according to an embodiment of this application.

FIG. 9 shows user interfaces of a mobile terminal in a possible implementation according to an embodiment of this application. An interface 901 and an interface 902 in FIG. 9 present a possible implementation of intelligently adjusting a vibration amplitude and a vibration frequency in a vibration alerting mode of the mobile terminal. A scenario shown in FIG. 9 is that the mobile terminal is taken into a noisy environment from a normal environment and then is taken back to a normal environment. The normal environment of the mobile terminal includes that the mobile terminal is located in a dwelling place during on hours, the mobile terminal is located at an office during off hours, or the like. The noisy environment includes that the mobile terminal is located in a shopping mall, the mobile terminal detects that a user is taking outdoor activities, or the like. The interface 901 shows an amplitude and a frequency in a vibration alerting mode that are set by the user. It is assumed that the amplitude is set to 40 and the frequency is set to 40 in this embodiment. After the user is in off hours, a location of the mobile terminal is changed from the office to the shopping mall, and the mobile terminal increases the amplitude and the frequency in the vibration alerting mode, as shown in the interface 902. In this embodiment, an adjusted amplitude is 70, and an adjusted frequency is 70. Finally, after the user goes back from the shopping mall to the dwelling place, the mobile terminal adjusts the vibration amplitude and the vibration frequency in the vibration alerting mode back to the state set by the user, as shown in the interface 903, that is, adjusts the vibration amplitude back to 40 and adjusts the vibration frequency back to 40. A scenario shown in FIG. 10 is that the mobile terminal is taken into a quiet environment from a normal environment and then is taken back to a normal environment. The normal environment of the mobile terminal includes that the mobile terminal is located in a dwelling place during on hours, the mobile terminal is located at an office during off hours, or the like. The quiet environment includes that the mobile terminal is located in a library, the mobile terminal is located in a meeting room, the mobile terminal detects that the user is having a rest, or the like. An interface 1001 shows an amplitude and a frequency in a vibration alerting mode that are set by the user. It is assumed that the amplitude is set to 40 and the frequency is set to 40 in this embodiment. After the user is in off hours, a location of the mobile terminal is changed from the office to a library, and the mobile terminal decreases the amplitude and the frequency in the vibration alerting mode, as shown in the interface 1002. In this embodiment, an adjusted amplitude is 10, and an adjusted frequency is 10. Finally, after the user goes back from the library to the dwelling place, the mobile terminal adjusts the vibration amplitude and the vibration frequency in the vibration alerting mode back to the state set by the user, as shown in the interface 903, that is, adjusts the vibration amplitude back to 40 and adjusts the vibration frequency back to 40.

In actual application, the mobile terminal may automatically adjust the vibration amplitude and the vibration frequency in the vibration alerting mode according to a preset correspondence. The correspondence includes but is not limited to a correspondence between a geographic location and the two aspects: an amplitude and a frequency, a correspondence between a noise value and the two aspects: an amplitude and a frequency, and a correspondence between a time period and the two aspects: an amplitude and a frequency. A specific case includes but is not limited to: an amplitude and a frequency that are corresponding to an office are 40, an amplitude and a frequency that are corresponding to a shopping mall are 70, an amplitude and a frequency that are corresponding to a dwelling place are 50, an amplitude and a frequency that are corresponding to environment noise at 40 decibel are 40, an amplitude and a frequency that are corresponding to environment noise at 80 decibel are 70, an amplitude and a frequency that are corresponding to on hours are 40, and an amplitude and a frequency that are corresponding to off hours are 20.

It may be understood that a process of adjusting the amplitude and the frequency may be a process in which the mobile terminal automatically performs adjustment according to different scenarios, or a process in which the mobile terminal prompts the user in different scenarios to manually perform adjustment, provided that a requirement of the user can be met. A specific implementation is not limited herein.

In this embodiment, after the mobile terminal is taken from a normal environment to a noisy environment, the vibration amplitude and/or the vibration frequency in the vibration alerting mode are/is automatically increased or manually increased by prompting the user, thereby effectively improving perception of the user for a vibration alert of the mobile terminal. After the mobile is taken from a normal environment to a quiet environment, the vibration amplitude and/or the vibration frequency in the vibration alerting mode are/is automatically decreased or manually decreased by prompting the user. This implements that a vibration alert is not produced abruptly on the premise that the user has high perception for the vibration alert of the mobile terminal, thereby improving user experience. The following describes a process of adjusting an amplitude and a frequency in a vibration alerting mode in an actual application scenario.

Figure 11A:
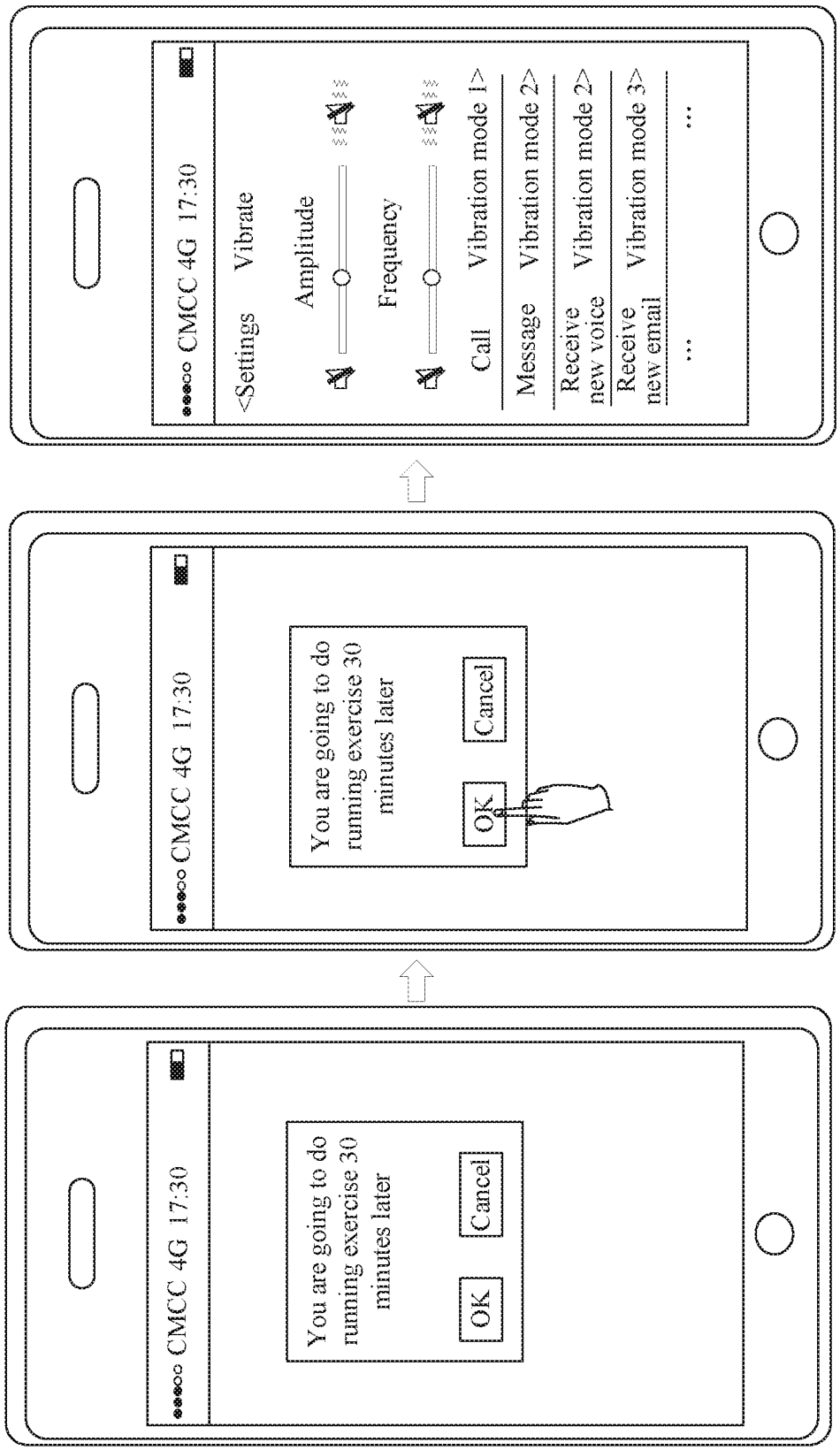
FIG. 11A and FIG. 11B are a schematic interface diagram of another embodiment for intelligently adjusting a vibration alerting mode by a mobile terminal according to an embodiment of this application.
Figure 11B:
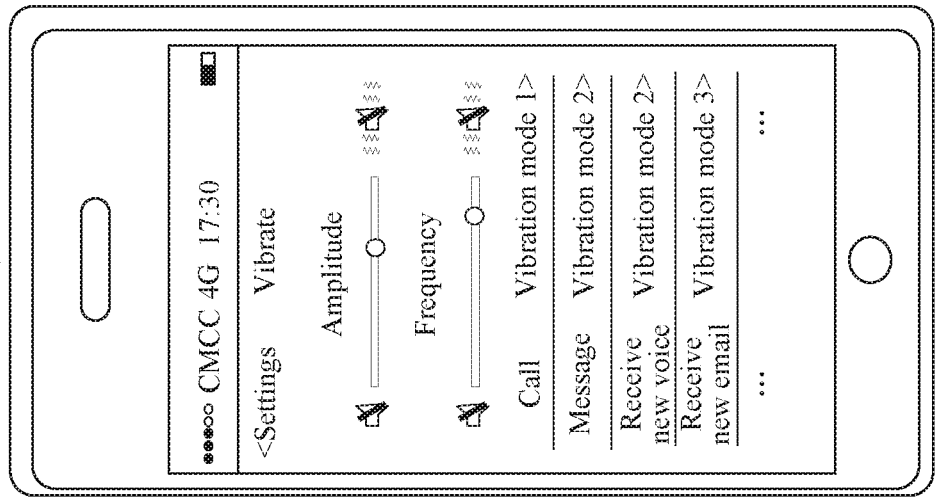

As shown in FIG. 11A and FIG. 11B, it is assumed that the mobile terminal learns, by collecting statistics of history records of a user, that the user does running exercise from 6:00 pm to 8:00 pm each day, and a pop-up window pops up on the mobile terminal at 17:30 to prompt the user that "You are going to do running exercise 30 minutes later, do you need to adjust a vibration alerting mode?". If the user determines that the user goes running at 6:00 pm, the user may tap "Yes", then the mobile terminal jumps to a vibration setting interface, and finally the user performs manual adjustment. In actual application, there may be a large quantity of other history records of the user. For example, the user does learning from 9:00 pm to 10:00 pm.

Figure 12:
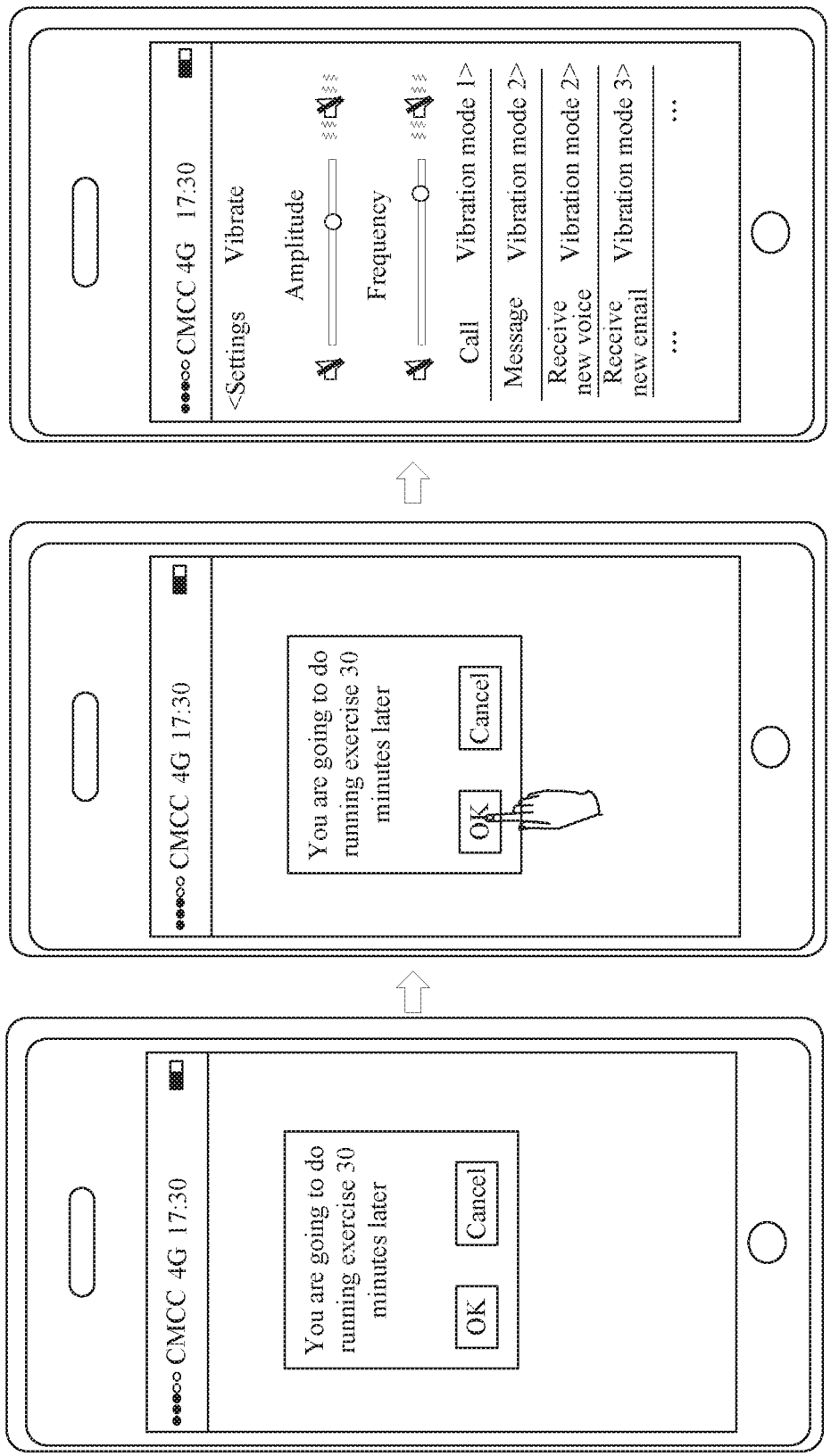
FIG. 12 is a schematic interface diagram of another embodiment for intelligently adjusting a vibration alerting mode by a mobile terminal according to an embodiment of this application.

As shown in FIG. 12, it is assumed that the mobile terminal learns, by collecting statistics of history records of a user, that the user does running exercise from 6:00 pm to 8:00 pm each day, and a pop-up window pops up on the mobile terminal at 17:30 to prompt the user that "You are going to do running exercise 30 minutes later, do you need to adjust a vibration alerting mode?". If the user determines that the user goes running at 6:00 pm, the user may tap "Yes", and then the mobile terminal directly presents an automatically adjusted vibration setting interface to the user.

In actual application, the mobile terminal may not present the automatically adjusted vibration setting interface to the user. A specific implementation is not limited herein.

In the following, the user is prompted, according to information about a current location of the mobile terminal, to adjust an amplitude and a frequency in a vibration alerting mode.

Figure 13A:
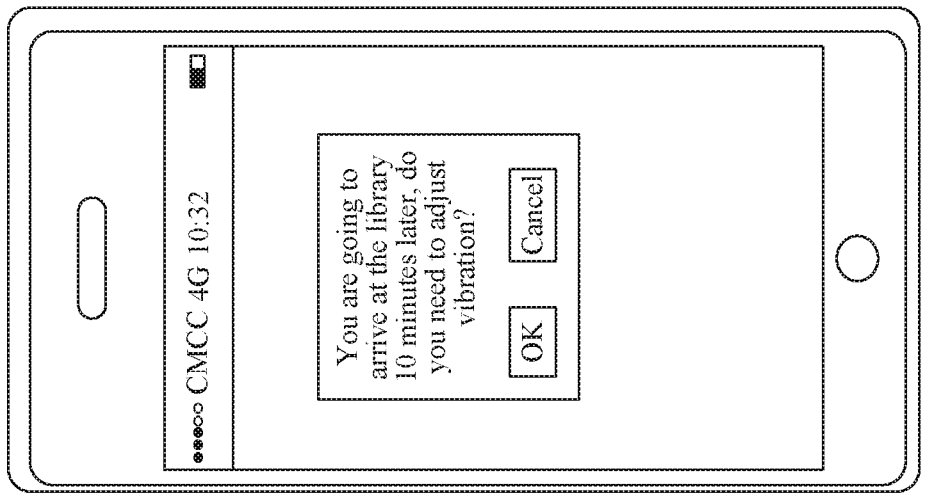
FIG. 13A and FIG. 13B are a schematic interface diagram of another embodiment for intelligently adjusting a vibration alerting mode by a mobile terminal according to an embodiment of this application.
Figure 13A:
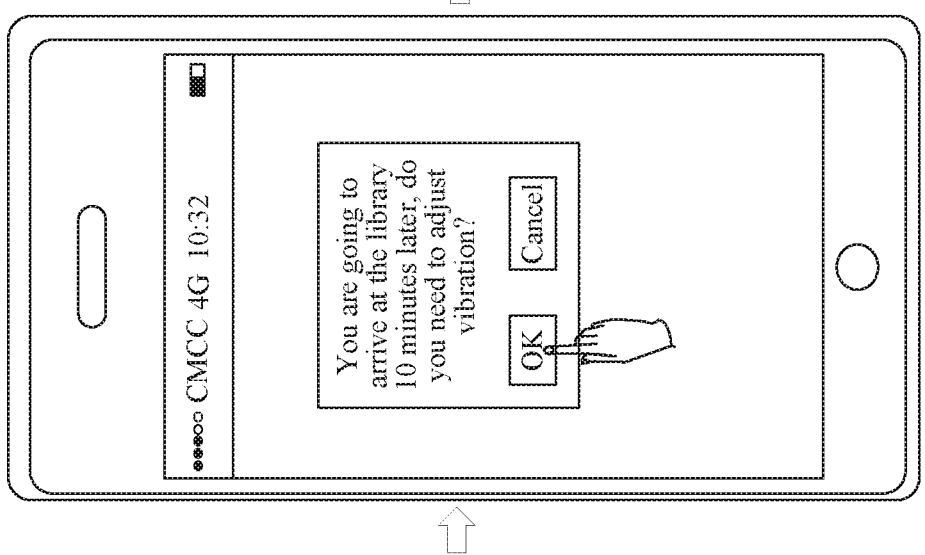
Figure 13A:
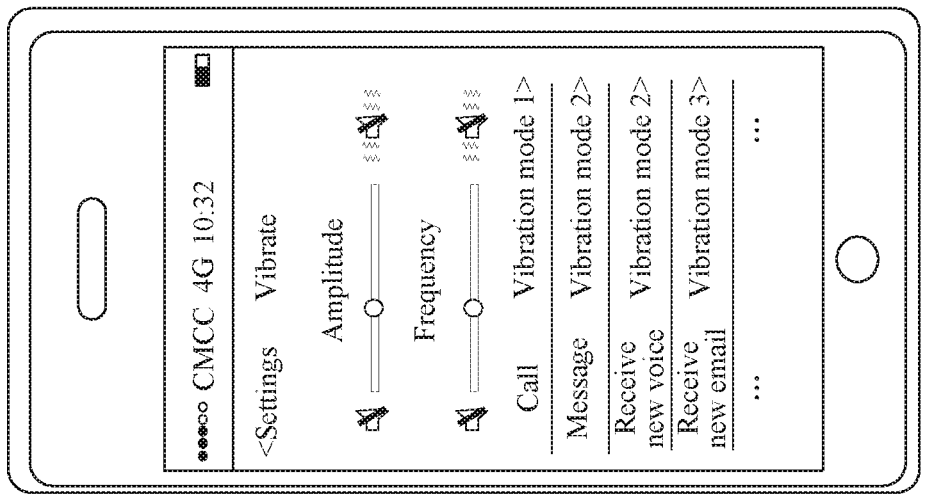
Figure 13B:
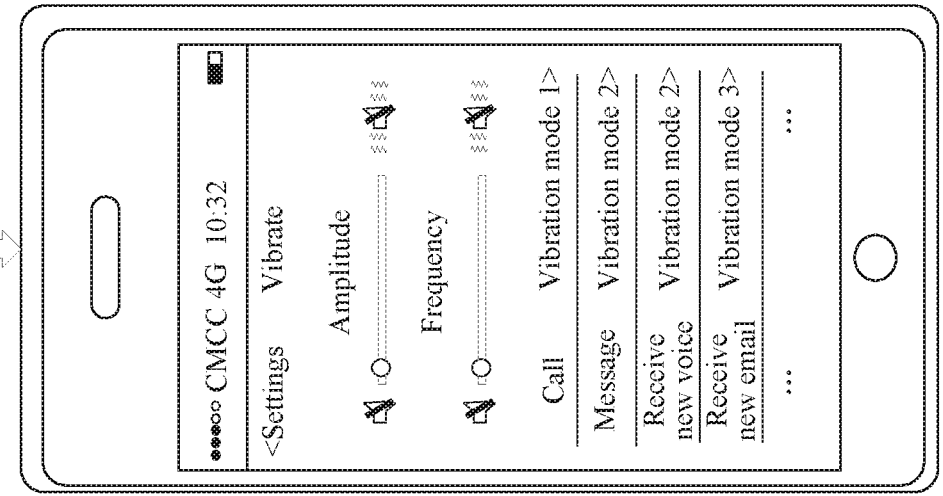

As shown in FIG. 13A and FIG. 13B, it is assumed that the mobile terminal determines, based on a current routine and a positioning system, that the user arrives at a library after 10 minutes. A pop-up window pops up on the mobile terminal, to prompt the user that "You are going to arrive at the library 10 minutes later, do you need to adjust a vibration alerting mode?" After the user determines to go to the library, the user may tap a "Yes" button in the pop-up window. The mobile terminal jumps to a vibration setting interface, and then the user manually adjusts a vibration amplitude and a vibration frequency in the vibration alerting mode.

Figure 14:
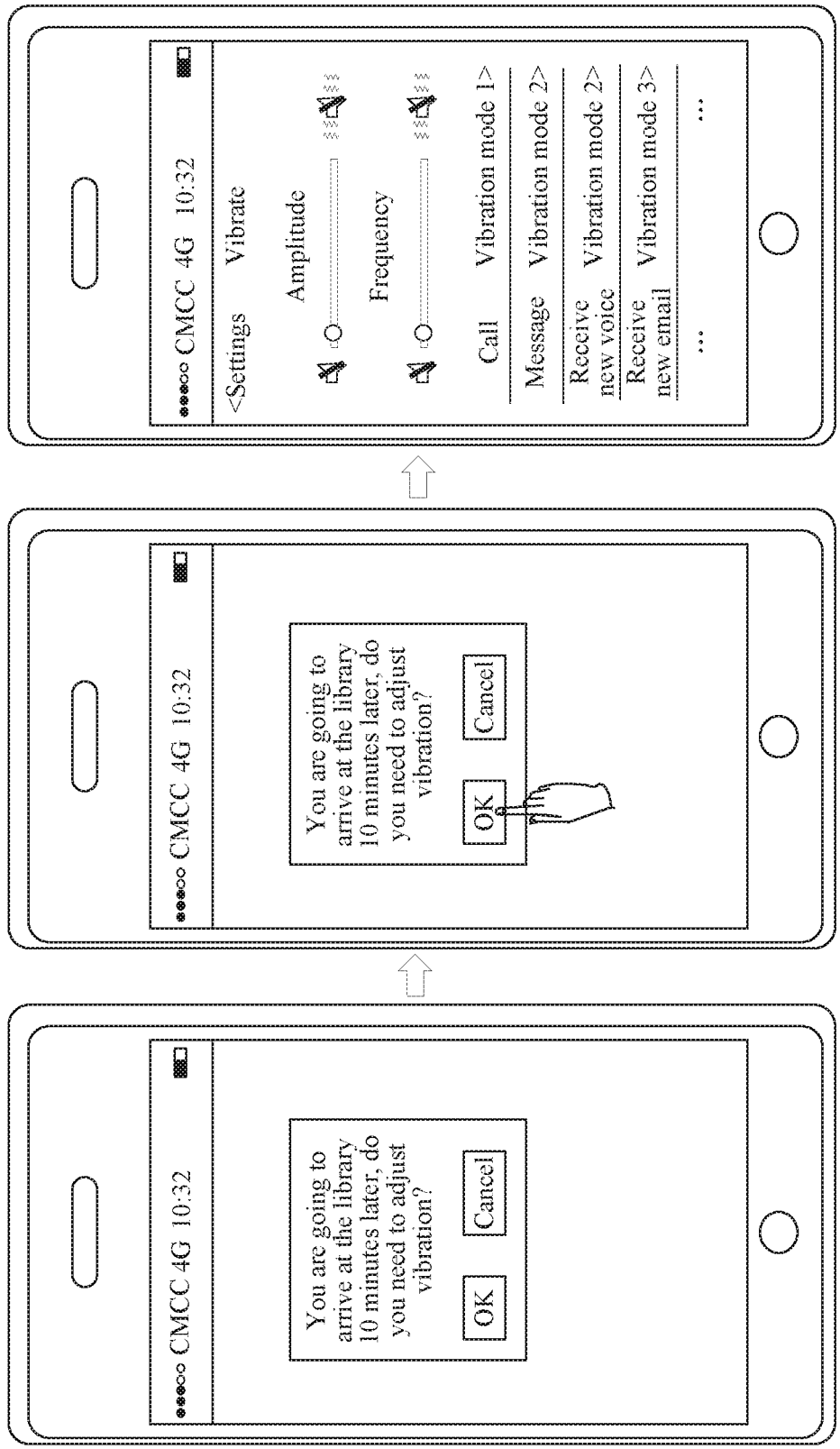
FIG. 14 is a schematic interface diagram of another embodiment for intelligently adjusting a vibration alerting mode by a mobile terminal according to an embodiment of this application.

As shown in FIG. 14, it is assumed that the mobile terminal determines, based on a current routine and a positioning system, that the user arrives at a library after 10 minutes. A pop-up window pops up on the mobile terminal, to prompt the user that "You are going to arrive at the library 10 minutes later, do you need to adjust a vibration alerting mode?" If the user determines to go to the library, the user may tap a "Yes" button in the pop-up window, and then the mobile terminal directly presents an automatically adjusted vibration setting interface to the user.

In implementation application, the mobile terminal may not present the automatically adjusted vibration setting interface to the user. A specific implementation is not limited herein.

In the foregoing embodiment, the mobile terminal notifies the user of an adjusted vibration amplitude and vibration frequency by presenting the vibration setting interface. In actual application, the mobile terminal may alternatively present the adjusted vibration amplitude and vibration frequency to the user by using prompt information. Presentation manners of the prompt information include but are not limited to the following manners.

Figure 15:
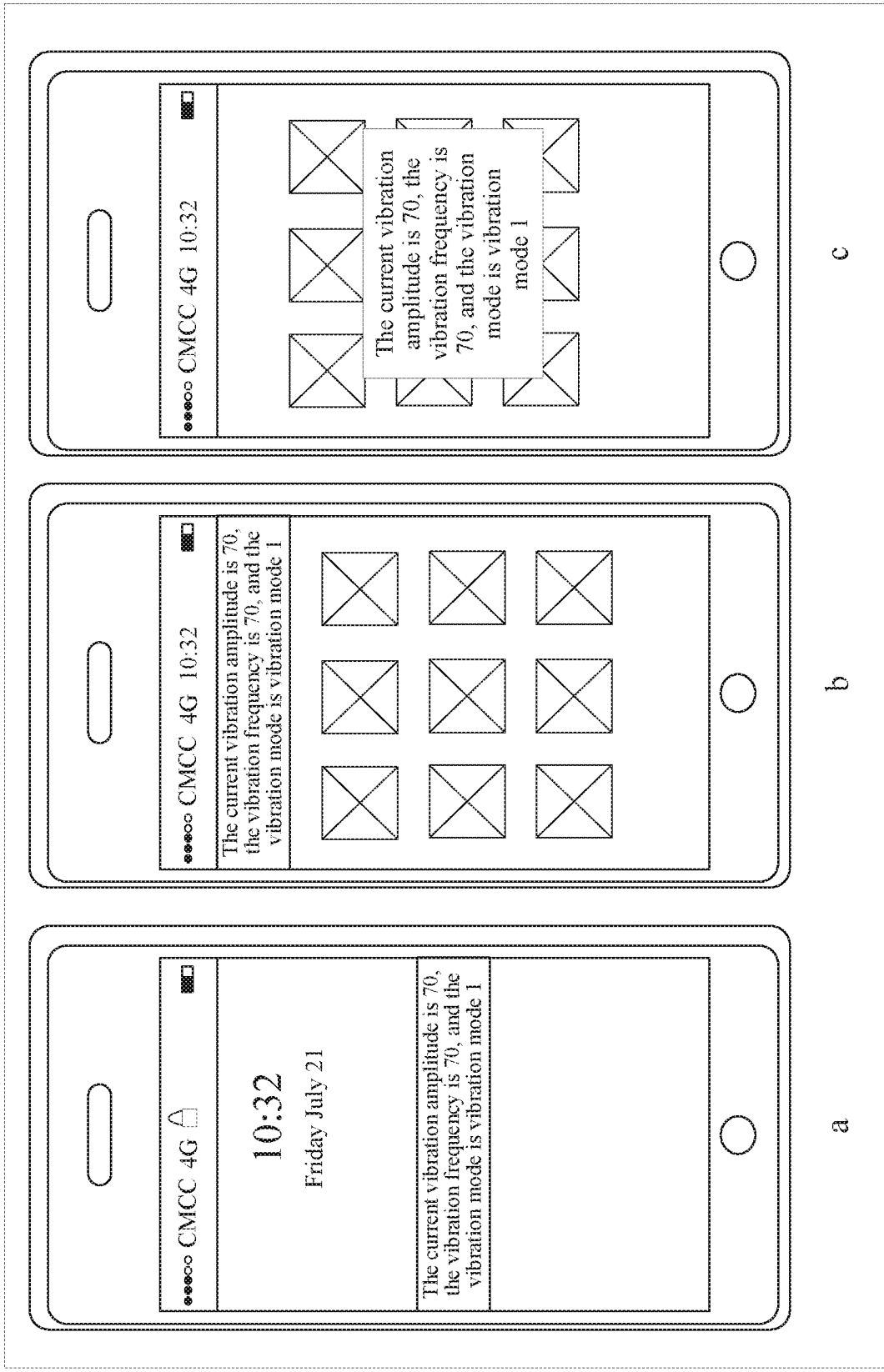
FIG. 15 is a schematic interface diagram of another embodiment for intelligently adjusting a vibration alerting mode by a mobile terminal according to an embodiment of this application.

In a possible implementation, as shown in an interface a in FIG. 15, when the prompt information is presented like a banner on a screen (in other words, the prompt information is presented on the screen, and is hidden up after being presented for fixed duration) when the mobile terminal is in a screen-on state and a screen unlocked state.

In another possible implementation, as shown in an interface b in FIG. 15, the prompt information is presented in the middle of the screen when the mobile terminal is in a screen locked state.

In another possible implementation, as shown in an interface c in FIG. 15 the prompt information is presented on the screen in a form of a pop-up window. The prompt information may be specifically presented in an upper part of the screen, in the middle of the screen, or in a lower part of the screen, provided that the pop-up window including the prompt information can be presented. A specific manner is not limited herein.

Optionally, in this embodiment of this application, in addition to presenting the prompt information to the user by using the foregoing user interfaces, the mobile terminal may further prompt, by using a voice, a light, a current, or another manner, the user that the mobile terminal has automatically adjusted a vibration amplitude and a vibration frequency in the vibration alerting mode. A specific manner is not limited herein.

Figure 16:
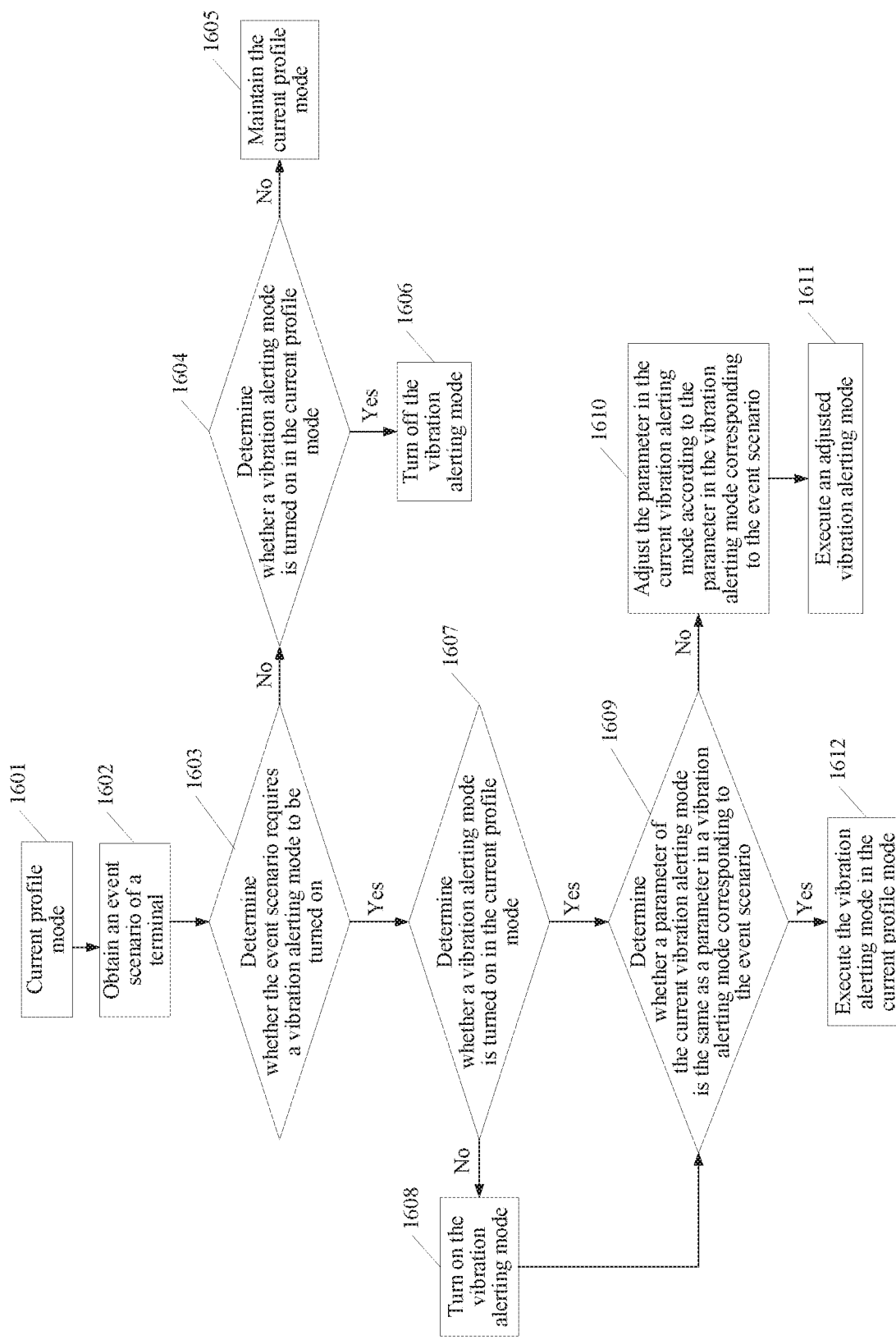
FIG. 16 is a schematic flowchart of intelligently adjusting a vibration alerting mode by a mobile terminal according to an embodiment of this application.

FIG. 16 is a flowchart of a possible implementation in which a mobile terminal adjusts a vibration alerting mode according to an actual scenario according to an embodiment of this application. As shown in the figure, the following steps are included.

1601. Before being used, the mobile terminal detects a current profile mode set by a user. The current profile mode includes a ringing alerting mode and/or a vibration alerting mode. For example, it is assumed that both the vibration alerting mode and the ringing alerting mode are turned on in the current profile mode. In the vibration alerting mode, a vibration amplitude is 50, a vibration frequency is 50, and a ringing volume is 50.

1602. The mobile terminal obtains a current application scenario.

In this embodiment, the application scenario includes information about a geographic location of the mobile terminal, a current behavior action of the user, a current moment, a current scenario, and the like. In actual application, the mobile terminal can detect the current behavior action of the user by using various sensors; the mobile terminal determines the information about the geographic location of the mobile terminal according to a positioning system; or the mobile terminal detects a reminder recorded in a memo or a calendar of the mobile terminal, or the like. For example, the mobile terminal records "June 3 is Keke's birthday" in the calendar, and records "There is a meeting from 2:00 pm to 4:00 pm" in the memo. A location scenario can be determined in real time by the mobile terminal by using the positioning system of the mobile terminal. For example, the determined location information of the mobile terminal is that the mobile terminal is in an office currently.

1603. The mobile terminal determines whether the application scenario requires a vibration alerting mode to be turned on, and if yes, performs step 1607, or if not, performs step 1604.

The mobile terminal detects whether the vibration alerting mode needs to be turned on for an alerting mode preset in the application scenario. If the application scenario requires the vibration alerting mode to be turned on, the mobile terminal performs step 1607, or if the application scenario does not require the vibration alerting mode to be turned on, the mobile terminal performs step 1604. For example, the application scenario is that there is a meeting from 2:00 pm to 4:00 pm, and an alerting mode for the meeting requires that the vibration alerting mode needs to be turned on. In the vibration alerting mode, an amplitude is 10, a frequency is 10, and a vibration mode is a vibration mode 2.

1604. The mobile terminal determines whether a vibration alerting mode is turned on in the current profile mode, and if yes, performs step 1606, or if not, performs step 1605.

If the mobile terminal determines that the application scenario does not require the vibration alerting mode to be turned on, the mobile terminal determines whether the vibration alerting mode is turned on in the current profile mode, and if yes, the mobile terminal performs step 1606, or if not, the mobile terminal performs step 1605.

1605. The mobile terminal maintains the current profile mode.

The mobile terminal remains an alerting mode in the current profile mode unchanged.

1606. The mobile terminal turns off the vibration alerting mode in the current profile mode.

The mobile terminal turns off the vibration alerting mode in the current profile mode.

1607. The mobile terminal determines whether a vibration alerting mode is turned on in the current profile mode, and if yes, performs step 1609, or if not, performs step 1608 and step 1609.

If the mobile terminal determines that the application scenario requires the vibration alerting mode to be turned on, the mobile terminal determines whether the vibration alerting mode is turned on in the current profile mode, and if yes, the mobile terminal performs step 1606, or if not, the mobile terminal performs step 1605.

1608. The mobile terminal turns on the vibration alerting mode.

The mobile terminal turns on the vibration alerting mode.

1609. The mobile terminal determines whether a parameter of the current vibration alerting mode is the same as a parameter in a vibration alerting mode corresponding to the application scenario, and if they are different, performs step 1610 and step 1611, or if they are the same, performs step 1612.

The mobile terminal determines whether an amplitude parameter in the current vibration alerting mode is the same as an amplitude parameter in the vibration alerting mode corresponding to the application scenario, whether a frequency parameter in the current vibration alerting mode is the same as a frequency parameter in the vibration alerting mode corresponding to the application scenario, and whether a vibration mode in the current vibration alerting mode is the same as a vibration mode in the vibration alerting mode corresponding to the application scenario. If all determining results are yes, the mobile terminal performs step 1612, or if at least one of all determining results is no, the mobile terminal performs step 1610 and step 1611.

1610. The mobile terminal adjusts the parameter in the vibration alerting mode in the current profile mode according to the parameter in the vibration alerting mode corresponding to the application scenario.

The mobile terminal adjusts the amplitude parameter in the current vibration alerting mode to the amplitude parameter in the vibration alerting mode corresponding to the application scenario, the mobile terminal adjusts the frequency parameter in the current vibration alerting mode to the frequency parameter in the vibration alerting mode corresponding to the application scenario, and the mobile terminal adjusts the vibration mode in the current vibration alerting mode to the vibration mode in the vibration alerting mode corresponding to the application scenario.

1611. The mobile terminal executes an adjusted vibration alerting mode.

When the mobile terminal obtains a condition instruction for triggering a vibration alert, the mobile terminal executes the adjusted vibration alerting mode.

1612. The mobile terminal executes the vibration alerting mode in the current profile mode.

The foregoing procedure merely shows that the mobile terminal intelligently adjusts the vibration alerting mode according to an application scenario. In actual application, the mobile terminal may alternatively intelligently adjust a ringing alerting mode according to an application scenario. A specific implementation method may be the same as the method for intelligently adjusting the vibration alerting mode by the mobile terminal.

Optionally, in this embodiment, the mobile terminal may further mark a priority for each application scenario. When the mobile terminal finds that the application scenarios conflict, the mobile terminal may execute a corresponding vibration alerting mode according to the priorities. When the mobile terminal determines that the application scenarios do not conflict, the mobile terminal sequentially executes vibration alerting modes corresponding to all the application scenarios. For example, the mobile terminal may set a priority of a meeting application to a first priority, set a priority of a scenario in which the mobile terminal is located in a library or in another quiet location to a second priority, set a priority of a nap application or another rest application to a third priority, and set a priority of a birthday alerting application or the like to a fourth priority. The priorities are sorted in descending order: the first priority, the second priority, the third priority, and the fourth priority For example, on the very day June 3, the mobile terminal learns that the mobile terminal has recorded a meeting application, that a time corresponding to the application is from 8:30 am to 10:30 am, and that in a corresponding vibration alerting mode set by the mobile terminal for the application, a vibration amplitude is 10, a vibration frequency is 10, and only the vibration alerting mode is turned on. In addition, on the same day, that "June 3 is Keke's birthday" is recorded in a calendar, an alerting time is 9:00 am, and in a corresponding vibration alerting mode corresponding to a birthday alerting application, a vibration amplitude is 50, a vibration frequency is 50, and both a ringing alerting mode and the vibration alerting mode are turned on. The mobile terminal may adjust, at 8:30 am, various parameters in a vibration alerting mode in an original profile mode to various parameters in the vibration alerting mode corresponding to the meeting application; and then determine, by comparing priorities of the meeting application and the birthday alerting application at 9:00 am, to keep the parameters in the vibration alerting mode corresponding to the meeting application. After the meeting ends, the mobile terminal may adjust a profile mode back to the original profile mode.

The foregoing mainly describes the solutions provided in the embodiments of this application from the perspective of interface display of the mobile terminal. It may be understood that, to implement the foregoing functions, the mobile terminal includes a corresponding hardware structure and/or software module for performing each of the functions. Persons skilled in the art should be easily aware that units and algorithm steps in the examples described with reference to the embodiments disclosed in this specification may be implemented in a form of hardware or in a form of a combination of hardware and computer software in this application. Whether the functions are performed by hardware or computer software driving hardware depends on particular applications and design constraints of the technical solutions. Persons skilled in the art may use different methods to implement the described functions for each particular application, but it should not be considered that the implementation goes beyond the scope of this application.

In the embodiments of this application, functional modules of the mobile terminal may be divided based on the foregoing method example. For example, each functional module may be divided according to each function, or two or more functions may be integrated into one processing module. The integrated module may be implemented in a form of hardware, or may be implemented in a form of a functional module of software. It should be noted that the module division in the embodiments of this application is an example, and is merely logical function division. There may be another division manner in an actual implementation.

Figure 17:
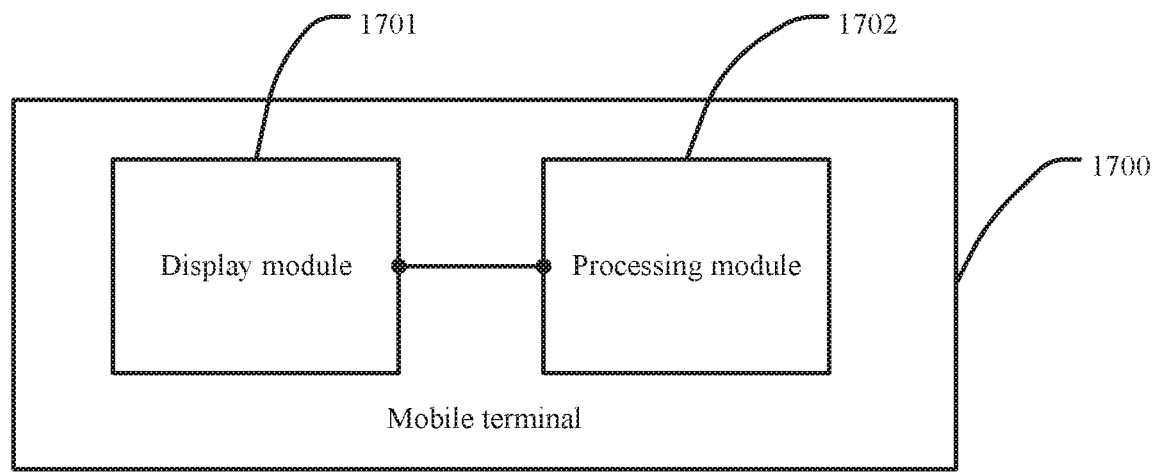
FIG. 17 is a schematic diagram of an embodiment of a mobile terminal according to an embodiment of this application.

Specifically referring to FIG. 17, an embodiment of a mobile terminal 1700 according to an embodiment of this application includes:

a display module 1701, configured to display a first interface, where the first interface includes an amplitude adjustment control, a frequency adjustment control, and a vibration mode adjustment control; and a processing module 1702, configured to: generate a first vibration alerting mode in response to an adjustment operation for at least one of the amplitude adjustment control, the frequency adjustment control, and the vibration mode adjustment control; and alert a user according to the first vibration alerting mode.

Optionally, the first interface displayed by the display module 1701 further includes a ringing adjustment control, and the processing module 1702 is further configured to: display an adjusted ringing volume in the first interface displayed by the display module 1701 in response to an adjustment operation for the ringing adjustment control.

Optionally, if the first interface displayed by the display module 1701 is a setting interface of a first application installed on the mobile terminal 1700, the first interface displayed by the display module 1701 may further display a first event and a second event; and the processing module 1702 displays, in the first interface displayed by the display module 1701, a vibration mode corresponding to the first event in response to an adjustment operation for a vibration mode adjustment control corresponding to the first event, and; and displays, in the first interface displayed by the display module 1701, a vibration mode corresponding to the second event in response to an adjustment operation for a vibration mode adjustment control corresponding to the second event.

Optionally, the display module 1701 displays a second interface, where the second interface is a setting interface of a second application installed on the mobile terminal 1700, and the second interface includes an amplitude adjustment control, a frequency adjustment control, and a vibration mode adjustment control; and the processing module 1702 generates a second vibration alerting mode in response to an adjustment operation for at least one of the amplitude adjustment control, the frequency adjustment control, and the vibration mode adjustment control.

Optionally, the second interface displayed by the display module 1701 further includes a ringing adjustment control, and the processing module 1702 displays an adjusted ringing volume in the second interface displayed by the display module 1701 in response to an adjustment operation for the ringing adjustment control.

Optionally, when the vibration mode adjustment control is a function selection icon, the processing module 1702 displays a third interface by using the display module 1701 in response to an adjustment operation for the function selection icon, and, where the third interface includes a selection icon of a vibration mode: and the processing module 1702 displays a selected vibration mode in the first interface displayed by the display module 1701 in response to a touch instruction for a selection icon of the vibration mode.

Optionally, when the vibration mode adjustment control is a function button icon, the processing module 1702 displays a selected vibration mode in the first interface displayed by the display module 1701 in response to an adjustment operation for the function button icon.

According to this embodiment, the mobile terminal adjusts an amplitude parameter, a frequency parameter, and a vibration mode of a vibration alerting mode by adjusting the amplitude adjustment control, the frequency adjustment control, and the vibration mode adjustment control of the mobile terminal. This implements diversity of vibration alerting modes of the mobile terminal, and meets vibration requirements of the mobile terminal in different environments.

Figure 18:
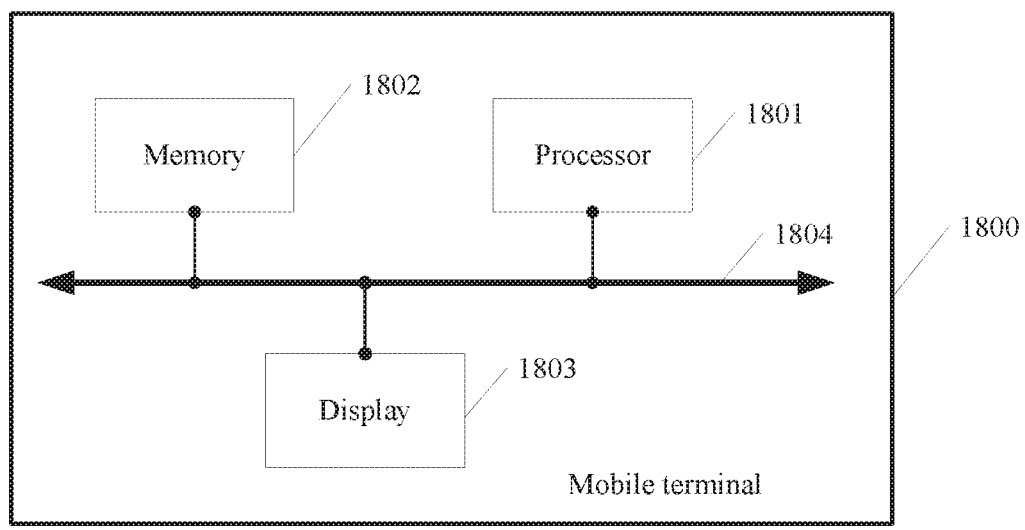
FIG. 18 is a schematic diagram of another embodiment of a mobile terminal according to an embodiment of this application.

Specifically referring to FIG. 18, an embodiment of a mobile terminal 1800 according to an embodiment of this application includes:

one or more processors 1801, a memory 1802, and a display 1803, where the mobile terminal 1800 further includes a bus 1804: and the processor 1801, the memory 1802, and the display 1803 are connected by using the bus 1804.

The bus 1804 may be a peripheral component interconnect (peripheral component interconnect, PCI for short) bus, an extended industry standard architecture (extended industry standard architecture, LISA for short) bus, or the like.

The bus may be categorized as an address bus, a data bus, a control bus, or the like. For ease of indication, the bus is marked by using only one bold line in FIG. 18. However, it does not indicate that there is only one bus or only one type of bus.

The processor 1801 may be a central processing unit (central processing unit, CPU for short), a network processor (network processor, NP for short), or a combination of a CPU and an NP.

The processor 1801 may further include a hardware chip. The hardware chip may be an application-specific integrated circuit (application-specific integrated circuit. ASIC for short), a programmable logic device (programmable logic device, PLD for short), or a combination thereof. The PLD may be a complex programmable logic device (complex programmable logic device, CPLD for short), a field programmable gate array (field programmable gate array, FPGA for short), a generic array logic (generic array logic, GAL for short), or any combination thereof.

The memory 1802 may include a volatile memory (volatile memory), for example, a random access memory (random access memory, RAM for short), or the memory may include a non-volatile memory (non-volatile memory), for example, a flash memory (flash memory), a hard disk (hard disk drive, HDD for short), or a solid state disk (solid-state drive, SSD for short). The memory 1802 may further include a combination of the foregoing types of memories.

Optionally, the memory 1802 is configured to store a program instruction. By invoking the program instruction stored in the memory 1802, the processor 1801 can perform one or more steps or an optional implementation in the embodiments shown in FIG. 2a to FIG. 16, to implement a function of the mobile terminal in the foregoing method.

Specific steps for executing a program by the processor 1801 are as follows:

controlling the display 1803 to display a first interface, where the first interface includes an amplitude adjustment control, a frequency adjustment control, and a vibration mode adjustment control;

responding to an adjustment operation for at least one of the amplitude adjustment control, the frequency adjustment control, and the vibration mode adjustment control, and generating a first vibration alerting mode; and alerting a user according to the first vibration alerting mode.

Optionally, the first interface displayed by the display 1803 further includes a ringing adjustment control, and the processor 1801 is further configured to: display an adjusted ringing volume in the first interface displayed by the display 1803 in response to an adjustment operation for the ringing adjustment control.

Optionally, if the first interface displayed by the display 1803 is a setting interface of a first application installed on the mobile terminal 1700, the first interface displayed by the display 1803 may further display a first event and a second event; and the processor 1801 displays, in the first interface displayed by the display 1803, a vibration mode corresponding to the first event in response to an adjustment operation for a vibration mode adjustment control corresponding to the first event; and displays, in the first interface displayed by the display 1803, a vibration mode corresponding to the second event in response to an adjustment operation for a vibration mode adjustment control corresponding to the second event.

Optionally, the display 1803 displays a second interface, where the second interface is a setting interface of a second application installed on the mobile terminal 1700, and the second interface includes an amplitude adjustment control, a frequency adjustment control, and a vibration mode adjustment control; and the processor 1801 generates a second vibration alerting mode in response to an adjustment operation for at least one of the amplitude adjustment control, the frequency adjustment control, and the vibration mode adjustment control.

Optionally, the second interface displayed by the display 1803 further includes a ringing adjustment control, and the processor 1801 displays an adjusted ringing volume in the second interface displayed by the display 1803 in response to an adjustment operation for the ringing adjustment control.

Optionally, when the vibration mode adjustment control is a function selection icon, the processor 1801 displays a third interface by using the display 1803 in response to an adjustment operation for the function selection icon, where the third interface includes a selection icon of a vibration mode; and the processor 1801 displays a selected vibration mode in the first interface displayed by the display 1803 in response to a touch instruction for a selection icon of the vibration mode.

Optionally, when the vibration anode adjustment control is a function button icon, the processor 1801 displays a selected vibration mode in the first interface displayed by the display 1803 in response to an adjustment operation for the function button icon.

According to this embodiment, the mobile terminal adjusts an amplitude parameter, a frequency parameter, and a vibration mode of a vibration alerting mode by adjusting the amplitude adjustment control, the frequency adjustment control, and the vibration mode adjustment control of the mobile terminal. This implements diversity of vibration alerting modes of the mobile terminal, and meets vibration requirements of the mobile terminal in different environments.

Figure 19:
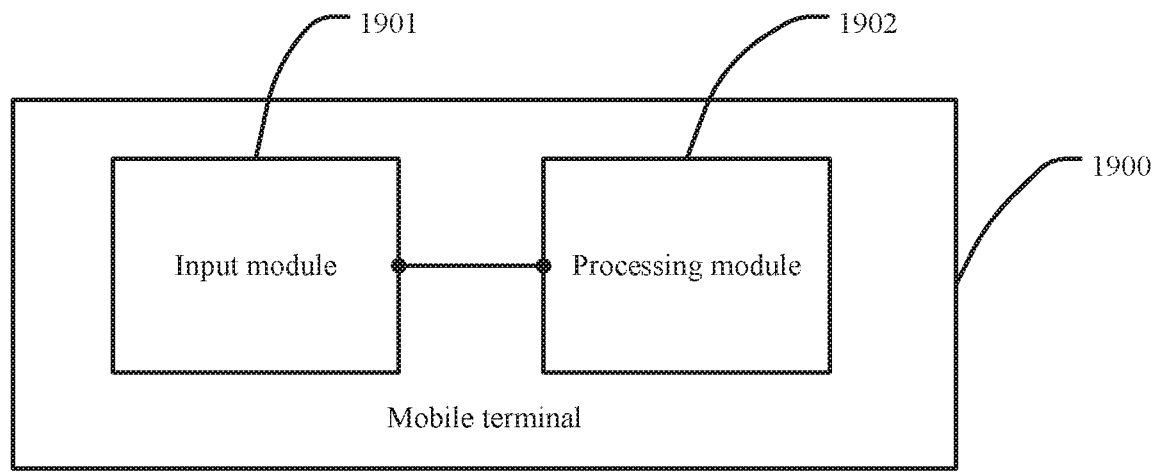
FIG. 19 is a schematic diagram of another embodiment of a mobile terminal according to an embodiment of this application.

Specifically referring to FIG. 19, an embodiment of a mobile terminal 1900 according to an embodiment of this application includes:

an input module 1901 obtains a first adjustment operation, then a processing module 1902 adjusts at least one vibration parameter for a first event according to the first adjustment operation, and generates a first vibration alerting mode, where the vibration parameter includes a vibration amplitude, a vibration frequency, and a vibration mode, and the vibration mode is used to indicate a change trend of the vibration amplitude and/or a change trend of the vibration frequency; and the input module 1901 obtains a second adjustment operation; and then the processing module 1902 adjusts at least one vibration parameter for a second event according to the second adjustment operation, and generates a second vibration alerting mode; and alerts a user according to the first vibration alerting mode when executing the first event, and alerts the user according to the second vibration alerting mode when executing the second event.

Optionally, when the first event and the second event conflict with each other, and a priority of the first event is higher than a priority of the second event, the processing module 1902 alerts the user according to the first vibration alerting mode.

Optionally, when the first event and the second event conflict with each other, and a priority of the first event is lower than a priority of the second event, the processing module 1902 alerts the user according to the second vibration alerting mode.

According to this embodiment, the mobile terminal adjusts an amplitude parameter, a frequency parameter, and a vibration mode of a vibration alerting mode by adjusting an amplitude adjustment control, a frequency adjustment control, and a vibration mode adjustment control of the mobile terminal, and can set different vibration alerting modes for different events. This implements diversity of vibration alerting modes of the mobile terminal, and meets vibration requirements of the mobile terminal in different environments.

Figure 20:
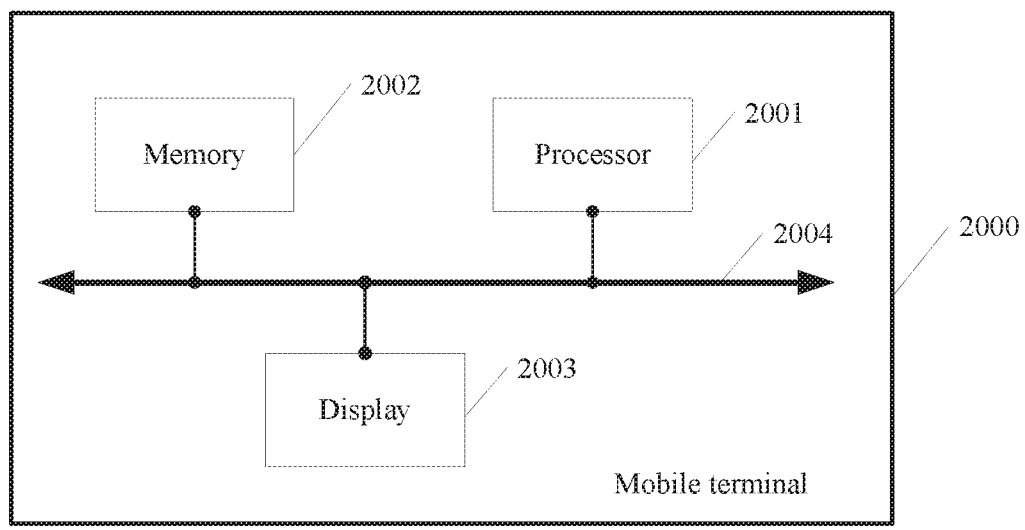
FIG. 20 is a schematic diagram of another embodiment of a mobile terminal according to an embodiment of this application.

Specifically referring to FIG. 20, an embodiment of a mobile terminal 2000 according to an embodiment of this application includes:

one or more processors 2001, a memory 2002, and a display 2003, where the mobile terminal 2000 further includes a bus 2004; and the processor 2001, the memory 2002, and the display 2003 are connected by using the bus 2004.

The bus 2004 may be a peripheral component interconnect (peripheral component interconnect, PCI for short) bus, an extended industry standard architecture (extended industry standard architecture, EISA for short) bus, or the like. The bus may be categorized as an address bus, a data bus, a control bus, or the like. For ease of indication, the bus is marked by using only one bold line in FIG. 20. However, it does not indicate that there is only one bus or only one type of bus.

The processor 2001 may be a central processing unit (central processing unit, CPU for short), a network processor (network processor, NP for short), or a combination of a CPU and an NP.

The processor 2001 may further include a hardware chip. The hardware chip may be an application-specific integrated circuit (application-specific integrated circuit, ASIC for short), a programmable logic device (programmable logic device, PLD for short), or a combination thereof. The PLD may be a complex programmable logic device (complex programmable logic device, CPLD for short), a field programmable gate array (field programmable gate array, FPGA for short), a generic array logic (generic array logic, GAL for short), or any combination thereof.

The memory 2002 may include a volatile memory (volatile memory), for example, a random access memory (random access memory, RAM for short), or the memory may include a non-volatile memory (non-volatile memory), for example, a flash memory (flash memory), a hard disk (hard disk drive, FIDD for short), or a solid state disk (solid-state drive, SSD for short). The memory 2002 may further include a combination of the foregoing types of memories.

Optionally, the memory 2002 is configured to store a program instruction. By invoking the program instruction stored in the memory 2002, the processor 2001 can perform one or more steps or an optional implementation in the embodiments shown in FIG. 2a to FIG. 16, to implement a function of the mobile terminal in the foregoing method.

Specific steps for executing a program by the processor 2001 are as follows:

the display 2003 obtains a first adjustment operation, then the processor 2001 adjusts at least one vibration parameter for a first event according to the first adjustment operation, and generates a first vibration alerting mode, where the vibration parameter includes a vibration amplitude, a vibration frequency, and a vibration mode, and the vibration mode is used to indicate a change trend of the vibration amplitude and/or a change trend of the vibration frequency; and the display 2003 obtains a second adjustment operation; and then the processor 2001 adjusts at least one vibration parameter for a second event according to the second adjustment operation, and generates a second vibration alerting mode; and alerts a user according to the first vibration alerting mode when executing the first event, and alerts the user according to the second vibration alerting mode when executing the second event.

Optionally, when the first event and the second event conflict with each other, and a priority of the first event is higher than a priority of the second event, the processor 2001 alerts the user according to the first vibration alerting mode.

Optionally, when the first event and the second event conflict with each other, and a priority of the first event is lower than a priority of the second event, the processor 2001 alerts the user according to the second vibration alerting mode.

According to this embodiment, the mobile terminal adjusts an amplitude parameter, a frequency parameter, and a vibration mode of a vibration alerting mode by adjusting an amplitude adjustment control, a frequency adjustment control, and a vibration mode adjustment control of the mobile terminal, and can set different vibration alerting modes for different events. This implements diversity of vibration alerting modes of the mobile terminal, and meets vibration requirements of the mobile terminal in different environments.

Figure 21:
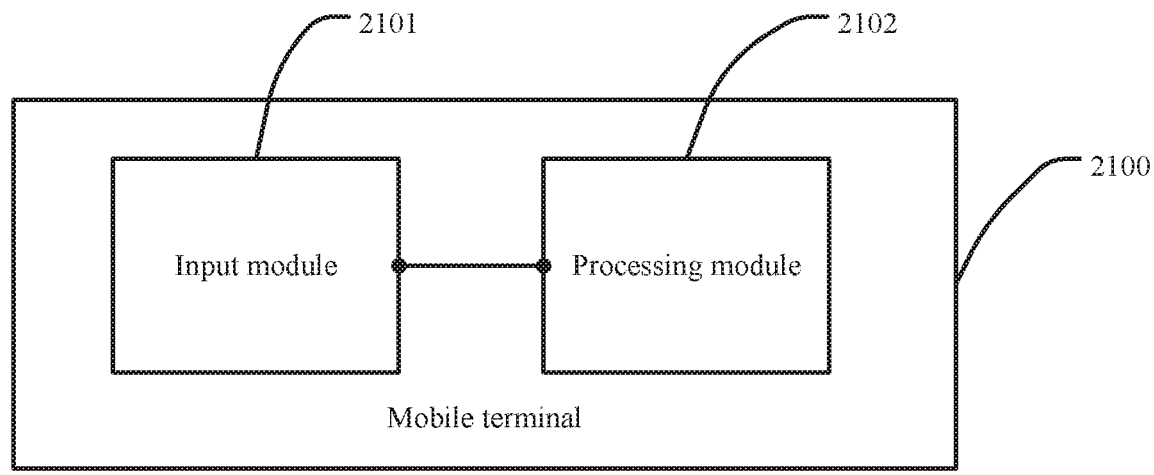
FIG. 21 is a schematic diagram of another embodiment of a mobile terminal according to an embodiment of this application.

Specifically referring to FIG. 21, an embodiment of a mobile terminal 2100 according to an embodiment of this application includes:

an input module 2101 obtains a first adjustment operation; and then a processing module 2102 adjusts, according to the first adjustment operation, at least one vibration parameter corresponding to a first application, and generates a first vibration alerting mode, where the vibration parameter includes a vibration amplitude, a vibration frequency, and a vibration mode, the vibration mode is used to indicate a change trend of the vibration amplitude and/or a change trend of the vibration frequency, and the first application is an application installed on the mobile terminal; and the input module 2101 obtains a second adjustment operation; and then the processing module 2102 is configured to: adjust, according to the second adjustment operation, at least one vibration parameter corresponding to a second application, and generate a second vibration alerting mode, where the second application is an application installed on the mobile terminal; and alert a user according to the first vibration alerting mode when executing an application corresponding to the first application, and alert the user according to the second vibration alerting mode when executing an application corresponding to the second application.

Optionally, the first adjustment operation is triggered in a setting interface of the mobile terminal, or the first adjustment operation is triggered in a setting interface of the first application; and the second adjustment operation is triggered in a setting interface of the mobile terminal; or the second adjustment operation is triggered in a setting interface of the second application.

According to this embodiment, the mobile terminal adjusts an amplitude parameter, a frequency parameter, and a vibration mode of a vibration alerting mode by adjusting an amplitude adjustment control, a frequency adjustment control, and a vibration mode adjustment control of the mobile terminal, and can set different vibration alerting modes for different applications. This implements diversity of vibration alerting modes of the mobile terminal, and meets vibration requirements of the mobile terminal in different environments.

Figure 22:
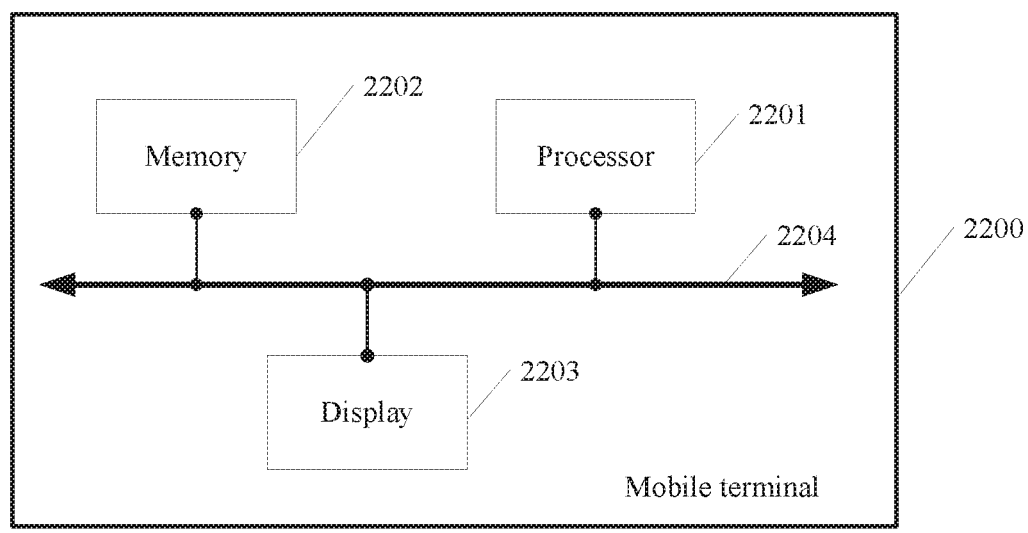
FIG. 22 is a schematic diagram of another embodiment of a mobile terminal according to an embodiment of this application.

Specifically referring to FIG. 22, an embodiment of a mobile terminal 2200 according to an embodiment of this application includes:

one or more processors 2201, a memory 2202, and a display 2203, where the mobile terminal 2200 further includes a bus 2204; and the processor 2201, the memory 2202, and the display 2203 are connected by using the bus 2204.

The bus 2204 may be a peripheral component interconnect (peripheral component interconnect, PCI for short) bus, an extended industry standard architecture (extended industry standard architecture, EISA for short) bus, or the like. The bus may be categorized as an address bus, a data bus, a control bus, or the like. For ease of indication, the bus is marked by using only one bold line in FIG. 22. However, it does not indicate that there is only one bus or only one type of bus.

The processor 2201 may be a central processing unit (central processing unit, CPU for short), a network processor (network processor, NP for short), or a combination of a CPU and an NP.

The processor 2201 may further include a hardware chip. The hardware chip may be an application-specific integrated circuit (application-specific integrated circuit, ASIC for short), a programmable logic device (programmable logic device, PLD for short), or a combination thereof. The PLD may be a complex programmable logic device (complex programmable logic device, CPLD for short), a field programmable gate array (field programmable gate array, FPGA for short), a generic array logic (generic array logic, GAL for short), or any combination thereof.

The memory 2202 may include a volatile memory (volatile memory), for example, a random access memory (random access memory, RAM for short), or the memory may include a non-volatile memory (non-volatile memory), for example, a flash memory (flash memory), a hard disk (hard disk drive, HDD for short), or a solid state disk (solid-state drive, SSD for short). The memory 2202 may further include a combination of the foregoing types of memories.

Optionally, the memory 2202 is configured to store a program instruction. By invoking the program instruction stored in the memory 2202, the processor 2201 can perform one or more steps or an optional implementation in the embodiments shown in FIG. 2a to FIG. 16, to implement a function of the mobile terminal in the foregoing method.

Specific steps for executing a program by the processor 2201 are as follows:

obtaining a first adjustment operation by using the display 2203; and then the processor 2201 adjusts, according to the first adjustment operation, at least one vibration parameter corresponding to a first application, and generates a first vibration alerting mode, where the vibration parameter includes a vibration amplitude, a vibration frequency, and a vibration mode, the vibration mode is used to indicate a change trend of the vibration amplitude and/or a change trend of the vibration frequency, and the first application is an application installed on the mobile terminal; and obtaining a second adjustment operation by using the display 2203; and then the processor 2201 is configured to: adjust, according to the second adjustment operation, at least one vibration parameter corresponding to a second application, and generate a second vibration alerting mode, where the second application is an application installed on the mobile terminal; and alert a user according to the first vibration alerting mode when executing an application corresponding to the first application, and alert the user according to the second vibration alerting mode when executing an application corresponding to the second application.

Optionally the first adjustment operation is triggered in a setting interface of the mobile terminal; or the first adjustment operation is triggered in a setting interface of the first application; and the second adjustment operation is triggered in a setting interface of the mobile terminal; or the second adjustment operation is triggered in a setting interface of the second application.

According to this embodiment, the mobile terminal adjusts an amplitude parameter, a frequency parameter, and a vibration mode of a vibration alerting mode by adjusting an amplitude adjustment control, a frequency adjustment control, and a vibration mode adjustment control of the mobile terminal, and can set different vibration alerting modes for different applications. This implements diversity of vibration alerting modes of the mobile terminal, and meets vibration requirements of the mobile terminal in different environments.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented. In the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A mobile terminal, comprising:
   a display;
   a memory configured to store a program; and
   a processor configured to execute the program to cause the mobile terminal to control the display to:
   display a first interface comprising an amplitude adjustment control, a frequency adjustment control, a vibration mode adjustment control, and a setting interface of a first application installed on the mobile terminal;
   display a first event and a second event of the first application in the first interface;
   display a vibration mode corresponding to the first event in the first interface in response to an adjustment operation for a vibration mode adjustment control corresponding to the first event;
   display a vibration mode corresponding to the second event in the first interface in response to an adjustment operation of a vibration mode adjustment control corresponding to the second event; and
   wherein the processor further causes the mobile terminal to:
   generate a first vibration alerting mode in response to an adjustment operation, wherein the adjustment operation comprises activation of at least one of the amplitude adjustment control, the frequency adjustment control, and the vibration mode adjustment control; and
   alert a user according to the first vibration alerting mode.

2. The mobile terminal of claim 1, wherein the processor is further configured to execute the program to cause the mobile terminal display to:
   display a third interface in response to an adjustment operation for the function selection icon, wherein the third interface comprises a function selection icon of a vibration mode; and
   display a selected vibration mode in the first interface in response to a selection operation of the function selection icon of the vibration mode.

3. The mobile terminal of claim 1, wherein the processor is further configured to execute the program to cause the mobile terminal to display a selected vibration mode in the first interface in response to an adjustment operation of a function selection icon.

4. The mobile terminal of claim 1, wherein the processor is further configured to execute the program to cause the mobile terminal to:

obtain a trigger instruction, wherein the trigger instruction comprises at least one of: a user-input adjustment operation, a preset trigger time, a preset trigger geographic location, a preset trigger action mode, or a preset trigger time, wherein the preset trigger time comprises a preset time period and a preset moment; and display the first interface according to the trigger instruction.

5. The mobile terminal of claim 1, wherein the vibration mode is configured to change a trend of a vibration amplitude or a vibration frequency at which the mobile terminal vibrates.

6. The mobile terminal of claim 1, wherein the processor is further configured to execute the program to cause the mobile terminal to:

obtain a first adjustment operation from a touchscreen;

adjust a vibration parameter for a first event according to the first adjustment operation, and generate the first vibration alerting mode, wherein the vibration parameter comprises a vibration amplitude, a vibration frequency, and a vibration mode, and the vibration mode is used to change a trend of the vibration amplitude and/or change a trend of the vibration frequency;

obtain a second adjustment operation;

adjust at least one vibration parameter for a second event according to the second adjustment operation, and generate a second vibration alerting mode;

alert a user according to the first vibration alerting mode when executing the first event; and alert the user according to the second vibration alerting mode when executing the second event.

7. The mobile terminal of claim 6, wherein the processor is further configured to execute a program to cause the mobile terminal to alert the user according to a priority ranking of the first and second events.

8. The mobile terminal of claim 1, wherein the processor is further configured to execute the program to cause the mobile terminal to:

obtain a first adjustment operation from a touchscreen;

adjust, according to the first adjustment operation, a vibration parameter corresponding to a first application, and generating the first vibration alerting mode, wherein the vibration parameter comprises a vibration amplitude, a vibration frequency, or a vibration mode to a change trend of the vibration amplitude and/or a change trend of the vibration frequency;

obtain a second adjustment operation;

adjust, according to the second adjustment operation, a vibration parameter corresponding to a second application, and generate a second vibration alerting mode;

alert a user according to the first vibration alerting mode when executing an application corresponding to the first application; and alert a user according to the second vibration alerting mode when executing an application corresponding to the second application.

9. The mobile terminal of claim 8, wherein the first adjustment operation is triggered in a setting interface of the mobile terminal or in a setting interface of the first application, and wherein the second adjustment operation is triggered in a setting interface of the mobile terminal, or in a setting interface of the second application.

10. The mobile terminal of claim 1, wherein the processor is further configured to execute the program to further cause the mobile terminal to:

obtain a target song;

obtain a to-be-converted song from the target song, wherein a duration of the to-be-converted song comprises a whole or partial duration of the target song; and perform conversion to a vibration amplitude in a customized vibration mode based on a tone of the to-be-converted song, and perform conversion to a vibration frequency in the customized vibration mode based on a rhythm of the to-be-converted song.

11. The mobile terminal of claim 1, wherein the processor is further configured to execute the program to further cause the mobile terminal to:

obtain a target record;

obtain a to-be-converted record from the target record, wherein duration of the to-be-converted record comprises a whole or partial duration of the target record; and perform conversion to a vibration amplitude in a customized vibration mode based on a tone of the to-be-converted record, and perform conversion to a vibration frequency in the customized vibration mode based on a rhythm of the to-be-converted record.

12. A non-transitory computer-readable medium comprising computer-executable instructions that, when executed by a processor, cause an apparatus to:

control a display comprising a touchscreen to display a first interface, wherein the first interface comprises an amplitude adjustment control, a frequency adjustment control, and a vibration mode adjustment control;

obtain a first adjustment operation from the touchscreen;

adjust, according to the first adjustment operation, a vibration parameter corresponding to a first application, and generate a first vibration alerting mode, wherein the vibration parameter comprises a vibration amplitude, a vibration frequency, or a vibration mode to a change trend of the vibration amplitude and/or a change trend of the vibration frequency, and wherein the first adjustment operation comprises activation of at least one of the amplitude adjustment control, the frequency adjustment control, and the vibration mode adjustment control;

generate a first vibration alerting mode in response to the first adjustment operation, wherein the first adjustment operation comprises activation of at least one of the amplitude adjustment control, the frequency adjustment control, and the vibration mode adjustment control;

obtain a second adjustment operation;

adjust, according to the second adjustment operation, a vibration parameter corresponding to a second application, and generating a second vibration alerting mode;

alert a user according to the first vibration alerting mode when executing an application corresponding to the first application; and alert a user according to the second vibration alerting mode when executing an application corresponding to the second application.

13. The non-transitory computer-readable medium of claim 12, wherein the first adjustment operation is triggered in a setting interface of the apparatus or in a setting interface of the first application, and wherein the second adjustment operation is triggered in a setting interface of the apparatus, or in a setting interface of the second application.

14. The non-transitory computer-readable medium of claim 12, wherein the instructions further cause the apparatus to:
- obtain a target song;
- obtain a to-be-converted song from the target song, wherein duration of the to-be-converted song comprises a whole or partial duration of the target song; and
- perform conversion to a vibration amplitude in a customized vibration mode based on a tone of the to-be-converted song, and perform conversion to a vibration frequency in the customized vibration mode based on a rhythm of the to-be-converted song.

15. A vibration alerting method for a mobile terminal comprising:
- controlling a display comprising a touchscreen to display a first interface, wherein the first interface comprises an amplitude adjustment control, a frequency adjustment control, and a vibration mode adjustment control;
- obtaining a first adjustment operation from the touchscreen;
- adjusting, according to the first adjustment operation, a vibration parameter corresponding to a first application, and generating a first vibration alerting mode, wherein the vibration parameter comprises a vibration amplitude, a vibration frequency, or a vibration mode to a change trend of the vibration amplitude and/or a change trend of the vibration frequency, and wherein the first adjustment operation comprises activation of at least one of the amplitude adjustment control, the frequency adjustment control, and the vibration mode adjustment control;
- generating a first vibration alerting mode in response to the first adjustment operation, wherein the first adjustment operation comprises activation of at least one of the amplitude adjustment control, the frequency adjustment control, and the vibration mode adjustment control;
- obtaining a second adjustment operation;
- adjusting, according to the second adjustment operation, a vibration parameter corresponding to a second application, and generating a second vibration alerting mode;
- alerting a user according to the first vibration alerting mode when executing an application corresponding to the first application; and
- alerting a user according to the second vibration alerting mode when executing an application corresponding to the second application.

16. The vibration alerting method for a mobile terminal of claim 15, wherein the first adjustment operation is triggered in a setting interface of a computer or in a setting interface of the first application, and wherein the second adjustment operation is triggered in a setting interface of a computer, or in a setting interface of the second application.

17. The vibration alerting method for a mobile terminal of claim 15, further comprising:
- obtaining a target song;
- obtaining a to-be-converted song from the target song, wherein duration of the to-be-converted song comprises a whole or partial duration of the target song; and
- performing conversion to a vibration amplitude in a customized vibration mode based on a tone of the to-be-converted song, and performing conversion to a vibration frequency in the customized vibration mode based on a rhythm of the to-be-converted song.

18. The vibration alerting method for a mobile terminal of claim 15, further comprising:
- obtaining a trigger instruction, wherein the trigger instruction comprises at least one of: a user-input adjustment operation, a preset trigger time, a preset trigger geographic location, a preset trigger action mode, or a preset trigger time, wherein the preset trigger time comprises a preset time period and a preset moment; and
- displaying the first interface according to the trigger instruction.

19. The vibration alerting method for a mobile terminal of claim 15, wherein adjusting a vibration parameter comprises changing a trend of a vibration amplitude or a vibration frequency at which the mobile terminal vibrates.

20. The vibration alerting method for a mobile terminal of claim 15, further comprising:
- obtaining a target record;
- obtaining a to-be-converted record from the target record, wherein duration of the to-be-converted record comprises a whole or partial duration of the target record; and
- performing conversion to a vibration amplitude in a customized vibration mode based on a tone of the to-be-converted record, and performing conversion to a vibration frequency in the customized vibration mode based on a rhythm of the to-be-converted record.

* * * * *